(12) United States Patent
Fu et al.

(10) Patent No.: US 12,185,019 B2
(45) Date of Patent: Dec. 31, 2024

(54) SMART TELEVISION AND METHOD FOR DISPLAYING GRAPHICAL USER INTERFACE OF TELEVISION SCREEN SHOT

(71) Applicant: HISENSE VISUAL TECHNOLOGY CO., LTD., Qingdao (CN)

(72) Inventors: Yansong Fu, Qingdao (CN); Hu Song, Qingdao (CN); Shanjuan Bao, Qingdao (CN); Yanmei Yu, Qingdao (CN); Sitai Gao, Qingdao (CN); Zhitao Yu, Qingdao (CN); Shan Zhou, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 18/366,007

(22) Filed: Aug. 7, 2023

(65) Prior Publication Data
US 2023/0379428 A1 Nov. 23, 2023

Related U.S. Application Data

(63) Continuation of application No. 18/067,575, filed on Dec. 16, 2022, which is a continuation of application
(Continued)

(30) Foreign Application Priority Data

Dec. 20, 2017 (CN) .......................... 201711381692.9
Feb. 11, 2018 (CN) .......................... 201810141211.5
(Continued)

(51) Int. Cl.
*H04N 5/44* (2011.01)
*H04N 21/431* (2011.01)
(Continued)

(52) U.S. Cl.
CPC ....... *H04N 5/4448* (2013.01); *H04N 21/4312* (2013.01); *H04N 21/4668* (2013.01); *H04N 21/47815* (2013.01); *H04N 21/4782* (2013.01)

(58) Field of Classification Search
CPC ............. H04N 5/4448; H04N 21/4312; H04N 21/4668; H04N 21/47815; H04N 21/4782;
(Continued)

(56) References Cited

U.S. PATENT DOCUMENTS 7,231,419 B1 6/2007 Gheorghe et al.
8,456,293 B1 6/2013 Trundle et al.
(Continued)

FOREIGN PATENT DOCUMENTS

CN 101535927 A 9/2009
CN 101819600 A 9/2010
(Continued)

OTHER PUBLICATIONS

Chinese Second Office Action, dated Sep. 4, 2019, from Chinese App. No. 201711381674.0.
(Continued)

*Primary Examiner* — Michael E Teitelbaum
(74) *Attorney, Agent, or Firm* — ANOVA LAW GROUP, PLLC

(57) ABSTRACT

The present disclosure is intended to provide a smart television and a method for displaying a graphical user interface of a television screen shot. The method includes while a display device is displaying currently-played content, in response to receiving an input instruction for capturing a screen shot, acquiring a screen shot image comprising at least one object; and while the display device continues playing, displaying a screen shot content display layer on the display device. The screen shot content display layer is
(Continued)

configured to present the screen shot image. The method further includes in response to receiving an input for selecting an object or a keyword matched with the object, displaying recommended content related to the object; in response to receiving a selection for a different object on the screen shot image by moving a focus frame, updating presentation of recommended content based on the selected different object.

20 Claims, 62 Drawing Sheets

Related U.S. Application Data

No. 17/380,385, filed on Jul. 20, 2021, now Pat. No. 11,558,578, which is a continuation of application No. 16/872,660, filed on May 12, 2020, now Pat. No. 11,102,441, which is a continuation of application No. PCT/CN2018/115482, filed on Nov. 14, 2018.

(30) Foreign Application Priority Data

Feb. 11, 2018 (CN) .................. 201810141949.1
Feb. 11, 2018 (CN) .................. 201810141968.4

(51) Int. Cl.
  *H04N 21/466* (2011.01)
  *H04N 21/478* (2011.01)
  *H04N 21/4782* (2011.01)

(58) Field of Classification Search
  CPC ........... H04N 21/47214; H04N 21/478; H04N 21/4122; H04N 5/64; H04N 21/4438; H04N 21/4826; H04N 21/8166
  See application file for complete search history.

(56) References Cited

U.S. PATENT DOCUMENTS

| | | | |
|---|---|---|---|
| 9,082,018 B1 | 7/2015 | Laska et al. | |
| 9,218,366 B1 | 12/2015 | Li et al. | |
| 9,277,250 B2 | 3/2016 | Mariadoss | |
| 9,411,896 B2 | 8/2016 | Frank | |
| 9,635,195 B1 | 4/2017 | Green et al. | |
| 9,667,584 B2 | 5/2017 | Archibong et al. | |
| 9,756,295 B2 | 9/2017 | Patel | |
| 9,830,526 B1 | 11/2017 | Lin et al. | |
| 9,980,002 B2 | 5/2018 | Yan | |
| 10,057,636 B1 | 8/2018 | Nijim et al. | |
| 10,140,827 B2 | 11/2018 | Laska et al. | |
| 10,217,185 B1 | 2/2019 | Cabanero et al. | |
| 10,440,432 B2 | 10/2019 | Strickland et al. | |
| 10,607,116 B1 | 3/2020 | Omer | |
| 10,721,536 B2 | 7/2020 | Thomas et al. | |
| D893,508 S | 8/2020 | Laska et al. | |
| 10,796,157 B2 | 10/2020 | Chan et al. | |
| 10,831,268 B1 | 11/2020 | Golard et al. | |
| 2005/0097479 A1 | 5/2005 | Takabe et al. | |
| 2005/0289582 A1 | 12/2005 | Tavares et al. | |
| 2006/0116987 A1 | 6/2006 | Bernard | |
| 2008/0066135 A1 | 3/2008 | Brodersen et al. | |
| 2008/0092156 A1 | 4/2008 | Ferrone | |
| 2008/0109841 A1 | 5/2008 | Heather et al. | |
| 2008/0109851 A1 | 5/2008 | Heather et al. | |
| 2010/0077428 A1* | 3/2010 | Arnold ............... | H04N 21/4532 725/34 |
| 2010/0228742 A1 | 9/2010 | Vandelle et al. | |
| 2010/0331041 A1 | 12/2010 | Liao et al. | |
| 2011/0032423 A1 | 2/2011 | Jing et al. | |
| 2011/0047163 A1 | 2/2011 | Chechik et al. | |
| 2011/0069940 A1 | 3/2011 | Shimy et al. | |
| 2011/0138805 A1 | 6/2011 | Barthelet | |
| 2011/0282906 A1 | 11/2011 | Wong | |
| 2012/0023131 A1 | 1/2012 | Downey et al. | |
| 2012/0060176 A1 | 3/2012 | Chai et al. | |
| 2012/0121187 A1 | 5/2012 | Lee et al. | |
| 2012/0166951 A1 | 6/2012 | Steelberg et al. | |
| 2013/0006625 A1 | 1/2013 | Gunatilake et al. | |
| 2013/0027613 A1 | 1/2013 | Kim et al. | |
| 2013/0057717 A1 | 3/2013 | Chou et al. | |
| 2013/0091515 A1 | 4/2013 | Sakata et al. | |
| 2013/0098982 A1 | 4/2013 | Adams | |
| 2013/0173765 A1 | 7/2013 | Korbecki | |
| 2013/0198766 A1 | 8/2013 | Yoon et al. | |
| 2013/0205311 A1 | 8/2013 | Ramaswamy et al. | |
| 2013/0298146 A1 | 11/2013 | Conrad et al. | |
| 2014/0053191 A1 | 2/2014 | Selim | |
| 2014/0095626 A1 | 4/2014 | Hsi | |
| 2014/0147020 A1 | 5/2014 | Baldwin | |
| 2014/0181863 A1 | 6/2014 | Shin et al. | |
| 2014/0214846 A1 | 7/2014 | Robert et al. | |
| 2014/0223548 A1 | 8/2014 | Wässingbo et al. | |
| 2014/0229990 A1 | 8/2014 | Lee et al. | |
| 2014/0245335 A1 | 8/2014 | Holden | |
| 2014/0306833 A1 | 10/2014 | Ricci | |
| 2014/0359647 A1 | 12/2014 | Shoemake et al. | |
| 2015/0012952 A1 | 1/2015 | Sato et al. | |
| 2015/0055855 A1 | 2/2015 | Rodriguez et al. | |
| 2015/0078726 A1 | 3/2015 | Shakib et al. | |
| 2015/0169166 A1 | 6/2015 | Kim et al. | |
| 2015/0248918 A1 | 9/2015 | Tang | |
| 2015/0264299 A1 | 9/2015 | Leech et al. | |
| 2015/0268822 A1 | 9/2015 | Waggoner et al. | |
| 2015/0281325 A1* | 10/2015 | Takaichi ............... | A63F 13/86 709/204 |
| 2015/0296250 A1 | 10/2015 | Casper | |
| 2015/0382047 A1* | 12/2015 | Van Os ............... | H04N 21/482 725/38 |
| 2015/0382079 A1 | 12/2015 | Lister et al. | |
| 2016/0021412 A1 | 1/2016 | Zito, Jr. | |
| 2016/0134938 A1 | 5/2016 | Miyazaki et al. | |
| 2016/0182948 A1 | 6/2016 | Shang et al. | |
| 2016/0269675 A1 | 9/2016 | Tsujimoto | |
| 2016/0295291 A1 | 10/2016 | Oh et al. | |
| 2016/0299911 A1 | 10/2016 | Grigoreva et al. | |
| 2016/0337710 A1 | 11/2016 | Badaan et al. | |
| 2016/0370956 A1 | 12/2016 | Penha et al. | |
| 2017/0191695 A1 | 7/2017 | Bruhn et al. | |
| 2017/0212670 A1 | 7/2017 | Shimizu | |
| 2017/0280200 A1 | 9/2017 | Sharma et al. | |
| 2017/0289596 A1 | 10/2017 | Krasadakis et al. | |
| 2017/0289619 A1 | 10/2017 | Xu et al. | |
| 2017/0289643 A1 | 10/2017 | Kachkova et al. | |
| 2018/0075289 A1 | 3/2018 | Zhang et al. | |
| 2018/0075593 A1 | 3/2018 | Wang et al. | |
| 2018/0089203 A1 | 3/2018 | Soni et al. | |
| 2018/0146231 A1 | 5/2018 | Saeedasr | |
| 2018/0192114 A1 | 7/2018 | Sirpal et al. | |
| 2018/0192127 A1 | 7/2018 | Sirpal et al. | |
| 2018/0192135 A1 | 7/2018 | Sirpal et al. | |
| 2018/0204111 A1 | 7/2018 | Zadeh et al. | |
| 2018/0232601 A1 | 8/2018 | Feng et al. | |
| 2018/0262362 A1 | 9/2018 | Goldstein et al. | |
| 2018/0301940 A1 | 10/2018 | Yeo et al. | |
| 2019/0034822 A1 | 1/2019 | Farré Guiu et al. | |
| 2019/0050666 A1 | 2/2019 | Kim et al. | |
| 2019/0065895 A1 | 2/2019 | Wang et al. | |
| 2019/0130580 A1 | 5/2019 | Chen et al. | |
| 2019/0138815 A1 | 5/2019 | Dai et al. | |
| 2019/0156122 A1 | 5/2019 | Lu | |
| 2019/0188876 A1 | 6/2019 | Song et al. | |
| 2019/0354601 A1 | 11/2019 | Depaz et al. | |
| 2019/0354603 A1 | 11/2019 | Selim et al. | |
| 2019/0354608 A1 | 11/2019 | Depaz et al. | |
| 2019/0356949 A1 | 11/2019 | Depaz et al. | |
| 2019/0356951 A1 | 11/2019 | Selim et al. | |
| 2019/0356952 A1 | 11/2019 | Leung et al. | |
| 2020/0026922 A1 | 1/2020 | Pekelny et al. | |
| 2020/0073417 A1 | 3/2020 | Tatera et al. | |
| 2020/0106984 A1 | 4/2020 | Fu et al. | |

(56) References Cited

U.S. PATENT DOCUMENTS

| | | | |
|---|---|---|---|
| 2020/0322689 | A1 | 10/2020 | Gao et al. |
| 2020/0351543 | A1 | 11/2020 | Kerofsky et al. |
| 2021/0209388 | A1 | 7/2021 | Ciftci et al. |
| 2021/0248356 | A1 | 8/2021 | Gu |

FOREIGN PATENT DOCUMENTS

| | | |
|---|---|---|
| CN | 101853299 A | 10/2010 |
| CN | 102106145 A | 6/2011 |
| CN | 102542299 A | 7/2012 |
| CN | 102938861 A | 2/2013 |
| CN | 103051934 A | 4/2013 |
| CN | 103051942 A | 4/2013 |
| CN | 103186538 A | 7/2013 |
| CN | 103198424 A | 7/2013 |
| CN | 103248943 A | 8/2013 |
| CN | 103425993 A | 12/2013 |
| CN | 103428571 A | 12/2013 |
| CN | 103544021 A | 1/2014 |
| CN | 103647989 A | 3/2014 |
| CN | 103828388 A | 5/2014 |
| CN | 103986973 A | 8/2014 |
| CN | 104184923 A | 12/2014 |
| CN | 104463177 A | 3/2015 |
| CN | 104516644 A | 4/2015 |
| CN | 104572804 A | 4/2015 |
| CN | 104699800 A | 6/2015 |
| CN | 104881287 A | 9/2015 |
| CN | 105373552 A | 3/2016 |
| CN | 105792010 A | 7/2016 |
| CN | 105959740 A | 9/2016 |
| CN | 105979382 A | 9/2016 |
| CN | 106020448 A | 10/2016 |
| CN | 106294770 A | 1/2017 |
| CN | 106604089 A | 4/2017 |
| CN | 106649710 A | 5/2017 |
| CN | 106708823 A | 5/2017 |
| CN | 106792101 A | 5/2017 |
| CN | 106921876 A | 7/2017 |
| CN | 107004122 A | 8/2017 |
| CN | 107105340 A | 8/2017 |
| CN | 107133576 A | 9/2017 |
| CN | 107315844 A | 11/2017 |
| CN | 107371066 A | 11/2017 |
| CN | 107392915 A | 11/2017 |
| CN | 107454305 A | 12/2017 |
| CN | 107480236 A | 12/2017 |
| CN | 107515715 A | 12/2017 |
| CN | 107563336 A | 1/2018 |
| CN | 107563897 A | 1/2018 |
| CN | 107590495 A | 1/2018 |
| CN | 107888985 A | 4/2018 |
| CN | 108040125 A | 5/2018 |
| CN | 108055589 A | 5/2018 |
| CN | 108062510 A | 5/2018 |
| CN | 108156522 A | 6/2018 |
| CN | 108259973 A | 7/2018 |
| CN | 108289236 A | 7/2018 |
| CN | 108322806 A | 7/2018 |
| CN | 108416018 A | 8/2018 |
| CN | 108848419 A | 11/2018 |
| CN | 109151502 A | 1/2019 |
| CN | 109168069 A | 1/2019 |
| CN | 109271982 A | 1/2019 |
| CN | 109271983 A | 1/2019 |
| CN | 109299326 A | 2/2019 |
| CN | 109388461 A | 2/2019 |
| CN | 109771936 A | 5/2019 |
| CN | 109858371 A | 6/2019 |
| CN | 109922363 A | 6/2019 |
| CN | 110245572 A | 9/2019 |
| CN | 111461097 A | 7/2020 |
| CN | 111818378 A | 10/2020 |
| CN | 112580625 A | 3/2021 |
| CN | 112601117 A | 4/2021 |
| EP | 3188107 A1 | 7/2017 |
| JP | 2005078590 A | 3/2005 |
| JP | 2010166212 A | 7/2010 |
| WO | 2017088340 A1 | 6/2017 |
| WO | 2018094201 A1 | 5/2018 |
| WO | 2019119800 A1 | 6/2019 |
| WO | 2020063095 A1 | 4/2020 |
| WO | 2020113020 A1 | 6/2020 |

OTHER PUBLICATIONS

Chinese First Office Action, dated Jul. 2, 2020, from Chinese App. No. 201811244228.X.
Chinese Fourth Office Action, dated Sep. 2, 2020, from Chinese App. No. 201711381674.0.
Chinese First Office Action, dated Apr. 23, 2019, from Chinese App. No. 201810141211.5.
Chinese Second Office Action, dated Jan. 9, 2020, from Chinese App. No. 201810141211.5.
Chinese First Office Action, dated Apr. 23, 2019, from Chinese App. No. 201810141949.1.
Chinese First Office Action, dated Apr. 23, 2019, from Chinese App. No. 201810141968.4.
Chinese Second Office Action, dated Jan. 1, 2020, from Chinese App. No. 201810141968.4.
Chinese Third Office Action, dated Mar. 4, 2020, from Chinese App. No. 201711381674.0.
International Search Report, dated Oct. 11, 2018, from PCT/CN2018/096528.
Chinese First Office Action, dated Feb. 28, 2019, from Chinese App. No. 201711381674.0.
International Search Report, dated Nov. 13, 2019, from PCT/CN2019/099631.
International Search Report, dated Nov. 1, 2019, from PCT/CN2019/098446.
The China National Intellectual Property Administration (CNIPA) The First Office Action for Chinese Application 201811132364.X dated Apr. 26, 2021 23 Pages (With Translation).
The China National Intellectual Property Administration (CNIPA) The First Office Action for Chinese Application 201811133159.5 dated Jan. 28, 2021 18 Pages (With Translation).
The China National Intellectual Property Administration (CNIPA) The First Office Action for Chinese Application 201910199952.3 dated Jan. 8, 2021 18 Pages (With Translation).
The European Patent Office (EPO) Supplementary Search Report for EP Application No. 18892605.9 dated Aug. 25, 2020 9 Pages.
The World Intellectual Property Organization (WIPO) International Search Report for PCT/CN2018/115482 dated Feb. 14, 2019 6 pages (including English translation).
United States Patent and Trademark Office Final Office Action for U.S. Appl. No. 16/530,233 dated Nov. 25, 2020 16 pages.
United States Patent and Trademark Office Non Final Office Action for U.S. Appl. No. 16/530,233 dated Aug. 11, 2020 23 pages.
United States Patent and Trademark Office Final Office Action for U.S. Appl. No. 16/905,332 dated Jul. 6, 2022 17 pages.

* cited by examiner

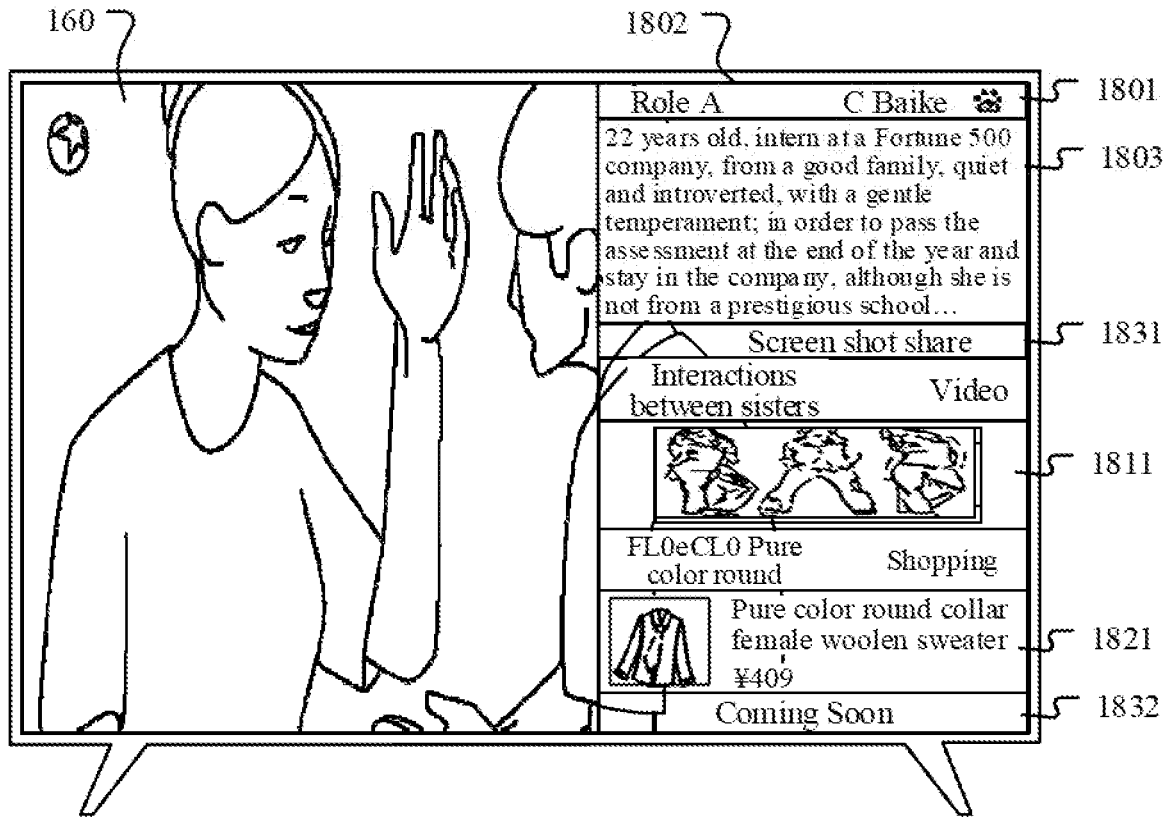

440

4401 — In response to an input for triggering screen shot operation and a command for image identification, display a graphical user interface including a currently-played content display layer, a screen shot content display layer and a function selection region on the display screen The screen shot content display layer is used to display a thumbnail image of a screen shot and recommended content related to content identified from the thumbnail image The function selection region includes an object selection tab for providing an access to an object in the thumbnail image, at least one content recommendation tab for accessing the recommended content, and/or a user input tab for control instructions in association with the screen shotcapturing function 4402 — In response to a selection of the object selection tab, display the object in the thumbnail image and the keyword matched with the object in the screen shot content display layer

```
┌─────────────────────────────────────────────────┐
│ In response to an input for triggering screen shot operation and │
│ a command for image identification, display a graphical user │
│ interface including a currently-played content display layer, │
│ a screen shot content display layer and a function selection │
│            region on the display screen          │
│ ┌─────────────────────────────────────────────┐ │
│ │  The screen shot content display layer is used to display │ │
│ │  a thumbnail image of a screen shot and recommended │ │
│ │  content related to the content identified from the │ │
│ │                thumbnail image              │ │
│ └─────────────────────────────────────────────┘ │
│ ┌─────────────────────────────────────────────┐ │
│ │ The function selection region includes an object selection │ │
│ │ tab for providing an access to an object in the thumbnail │ │
│ │    image, at least one content recommendation tab for │ │
│ │ accessing the recommended content, and/or a screen shot │ │
│ │        share tab for sharing the thumbnail image │ │
│ └─────────────────────────────────────────────┘ │
└─────────────────────────────────────────────────┘
```
— 4501

↓

```
┌─────────────────────────────────────────────────┐
│ In response to a selection of the object selection tab, display │
│  a sub-menu tab of the object selection tab in the function │
│  selection region, the sub-menu tab including a keyword │
│   matched with at least one object in the thumbnail image │
└─────────────────────────────────────────────────┘
```
— 4502

Fig. 45

SMART TELEVISION AND METHOD FOR DISPLAYING GRAPHICAL USER INTERFACE OF TELEVISION SCREEN SHOT

CROSS-REFERENCE TO RELATED APPLICATIONS

This application is a continuation of U.S. patent application Ser. No. 18/067,575, filed on Dec. 16, 2022, which is a continuation of U.S. patent application Ser. No. 17/380,385, filed on Jul. 20, 2021, now issued as U.S. Pat. No. 11,558,578 on Jan. 17, 2023, which is a continuation of U.S. patent application Ser. No. 16/872,660, filed on May 12, 2020, now issued as U.S. Pat. No. 11,102,441 on Aug. 24, 2021, which is a continuation of International Application No. PCT/CN2018/115482, filed on Nov. 14, 2018, which claims priority to Chinese Patent Application No. 201711381692.9, filed on Dec. 20, 2017 and entitled "Smart Television and Method for Displaying Graphical User Interface of Television Screen Shot", priority to Chinese Patent Application No. 201810141211.5, filed on Feb. 11, 2018 and entitled "Smart Television and Method for Displaying Graphical User Interface of Television Screen Shot", priority to Chinese Patent Application No. 201810141949.1, filed on Feb. 11, 2018 and entitled "Smart Television and Method for Displaying Graphical User Interface of Television Screen Shot", and priority to Chinese Patent Application No. 201810141968.4, filed on Feb. 11, 2018 and entitled "Smart Television and Method for Displaying Graphical User Interface of Television Screen Shot", all of which are hereby incorporated by reference in their entireties.

FIELD

The present disclosure relates to a display receiving terminal, and more particularly relates to a smart television and a method for displaying a graphical user interface of a television screen shot.

BACKGROUND

A smart television generally focuses on an online interactive media, an Internet television and an on-demand streaming media, instead of a traditional broadcast media, and it can provide users with sufficient content and services, and TV manufacturers are committed to developing various functions that are easy for use by users to enhance the use experience of a product.

Thus, it is particularly important to provide existing smart TVs with simpler and more intuitive features, and to seamlessly connect user interfaces and visual content links according to user habits to browse and/or perform various functions of smart television.

SUMMARY

The present disclosure provides a smart television to meet requirements for a more intuitive user interface and a seamless user interaction function. This content describes these improvement function demands through all its aspects, examples and/or configurations. In addition, although this content is described according to exemplary examples, it should be understood that claims can be made respectively to all the aspects of the present disclosure. This content can provide many advantages which are determined specifically according to specific aspects, examples and/or configurations.

First of all, the present disclosure provides a smart television, including: a display; a memory; and a processor in communication with the memory and the display. The processor is configured to: in response to an input instruction for capturing a screen shot, display a set of option bars while displaying the currently-played content on the display screen, wherein the option bars are used to display an image thumbnail of the screen shot and content-related recommended items identified on the basis of the image of the screen shot, and/or user input interfaces for operations in association with the screen shot.

Optionally, the recommended items include keywords matched with corresponding content identified on the basis of the image of the screen shot, recommended descriptions related to the keywords, and/or sources or types of the items.

Optionally, the option bar is associated with a service or application corresponding to a silo according to its content. The content of the option bar is selected to activate the service or application.

Optionally, the service or application is any one of a webpage application, a video application, a TV program application and a shopping application.

Optionally, any one of a webpage text content recommendation, a video on demand recommendation, a shopping webpage link and an application recommendation is available.

Secondly, the present disclosure provides a method for displaying a graphical user interface of a television screen shot. The method includes: in response to an input instruction for capturing a screen shot, displaying a set of option bars while displaying the currently-played content on the display screen, wherein the option bars are used to display an image thumbnail of the screen shots and content-related recommended items identified on the basis of the image of the screen shot, and/or user input interfaces for operations in association with the screen shot.

Optionally, the recommended items include keywords matched with corresponding content identified on the basis of the image of the screen shot, recommended descriptions related to the keywords, and/or sources or types of the items.

Optionally, the option bar is associated with a service or application corresponding to a silo according to its content. The content of the option bar is selected to activate the service or application.

Optionally, the service or application is any one of a webpage application, a video application, a TV program application and a shopping application.

Optionally, any one of a webpage text content recommendation, a video on demand recommendation, a shopping webpage link and an application recommendation is available.

Thirdly, the present disclosure provides a smart television, including a display; a memory; and a processor in communication with the memory and the display. The processor is configured to: in response to an input instruction for capturing a screen shot, display a graphical user interface that includes a currently-played content display layer and a screen shot content display layer on the display. The screen shot content display layer includes a screen shot display bar configured to display an image acquired from a current screen shot, a screen shot sharing instruction bar, and a display bar for QR code information generated from the screen shot.

Optionally, the screen shot sharing instruction bar is configured to share the screen shot to a terminal connected with the smart television.

Optionally, the QR code information and the screen shot are synchronously uploaded to a third-party server.

Optionally, the processor is further configured to: in response to an input instruction for sharing the screen shot, when it is determined that the terminal with which the television established connection is not connected with the smart television, the QR code information of the screen shot image is output, so that the terminal can scan the QR code information to acquire the screen shot image from the third-party server.

Optionally, the processor is further configured to: in response to an instruction for sharing the screen shot, when it is determined that the terminal connected with which the television established connection is connected with the smart television, the screen shot is transmitted to the terminal according to a transmission protocol between the terminal and the smart television.

Fourthly, the present disclosure provides a method for displaying a graphical user interface of a television screen shot. The method includes: in response to an input instruction for capturing a screen shot, displaying a graphical user interface that includes a currently-played content display layer and a screen shot content display layer on a display. The screen shot content display layer includes a screen shot display bar configured to display an image acquired from a current screen shot, and a plurality of option bars for indicating inputting control instructions in association with the screen shot for a user.

Optionally, the method further comprises: in response to an instruction for selecting a screen shot images, displaying images acquired from a plurality of continuous screen shots. In response to a selection of an image among the images, the selected screen shot image is stored in a preset image storage region.

Optionally, in response to a control instruction for sharing a screen shot, when it is determined that the television device is connected with an electronic terminal through a network, the television device sends information that indicates a screen shot is available for push to the electronic terminal.

In response to an instruction that the electronic terminal is acknowledged to receive the screen shot, the television device sends the screen shot to the electronic terminal.

Optionally, in response to a control instruction for sharing a screen shot, when it is determined that the television device is not connected with an electronic terminal through a network, the television device displays QR code information of the screen shot image.

Optionally, after the electronic terminal scans the QR code information, the screen shot image is obtained from a third-party server where the television device uploads the screen shot image.

Fifthly, the present disclosure provides a method for displaying a graphical user interface of a television screen shot. The method includes: in response to an input instruction for capturing a screen shot, displaying a graphical user interface that includes a currently-played content display layer and a screen shot content display layer on a display. The screen shot content display layer includes a plurality of option bars for displaying an image acquired from a current screen shot, and a webpage recommended text and/or images related to the content identified on the basis of the image of the screen shot.

Optionally, the content displayed by the option bars of webpage recommendations includes an identifier of a search source, a description of the recommended text and/or images, and/or a subject or keyword of a search result.

Optionally, in response to a selection for an option bar among the option bars of webpage recommendations from a user, one or more information windows float above of the screen shot content display layer. The information window is configured to display detailed content of the selected option bar.

Optionally, in response to a selection for an option bar among the option bars of webpage recommendations from a user, a plurality of information windows float above the screen shot content display layer. The plurality of information windows are configured to display a plurality of different pieces of webpage information.

Optionally, in response to a user's selection for an information window among the information windows, an information child window floats on the plurality of information windows, and the child window is configured to display detailed content of the selected information window.

Sixthly, the present disclosure provides a method for displaying a graphical user interface of a television screen shot. The method includes: in response to an input instruction for capturing a screen shot, displaying a graphical user interface that includes a currently-played content display layer and a screen shot content display layer on a display. The screen shot content display layer includes a plurality of option bars used to display webpage recommendation profiles related to the content identified on the basis of the image of screen shot.

Optionally, the webpage recommendation profiles include texts and/or images.

Optionally, in response to a user's selection for an option bar among the option bars, at least one information window floats above the screen shot content display layer. The information window is configured to display detailed content of the selected option bar.

Optionally, the content displayed in the information window contains a website logo bar that indicates a content source, a related keyword bar, an entry detail bar, and/or an album bar for recommending related pictures.

Optionally, the entry detail bar includes a keyword overview, basic information and a text.

Seventhly, the present disclosure provides a method for displaying a graphical user interface of a television screen shot. The method includes: in response to an input instruction for capturing a screen shot, displaying a graphical user interface that includes a currently-played content display layer and a screen shot content display layer on a display. The screen shot content display layer includes a plurality of option bars, at least one of which is configured to display a program guide of TV program channels identified on the basis of the image of the screen shot.

Optionally, the content displayed in the program guide option bar includes: names or TV station logos that mark TV program channels, and a thumbnail image of the program guide.

Optionally, in response to a user's selection of the program guide option bar, at least one information window floats above the screen shot content display layer. The information window is configured to display a detailed list of the program guide.

Optionally, at least one program in the detailed list of the program guide include an icon for scheduling programs. In response to a selection on the icon, a program is scheduled.

Optionally, in response to a user's selection for a program in the detailed list, the video on demand application is activated, and the presentation of the information window is updated or a child information window is displayed overlaying on the information window, so as to present available previous or related episodes of the selected program on the video on demand application.

Optionally, in response to a user's selection for a program among the previous or related episodes, the currently-played content display layer is switched to play the selected program from the video on demand.

Eighthly, the present disclosure provides a method for displaying a graphical user interface of a television screen shot. The method includes: in response to an input instruction for capturing a screen shot, displaying a graphical user interface on a display which includes a currently-played content display layer and a screen shot content display layer. The screen shot content display layer includes a plurality of option bars, at least one of which is configured to display related video recommendations of TV programs identified on the basis of the image of the screen shot.

Optionally, the content displayed in the option bar for video recommendation includes: names of videos, and content profile image of the videos.

Optionally, in response to a user's selection for an option bar for video recommendation, at least one information window is displayed. The information window is configured to display a detailed introduction of a selected recommendation video.

Optionally, in response to a user's selection for an option bar for video recommendation, the video on demand application is activated, and the currently-played content display layer is switched to display a corresponding selected recommendation video in the video on demand.

Ninthly, the present disclosure provides a method for displaying a graphical user interface of a television screen shot. The method includes: in response to an input instruction for capturing a screen shot, displaying a graphical user interface that includes a currently-played content display layer and a screen shot content display layer on a display. The screen shot content display layer includes a plurality of option bars, at least one of which is configured to display commodity shopping information recommendations related to objects identified on the basis of the image of the screen shot.

Optionally, in response to a user's selection for an option bar for the shopping information recommendation, the shopping application is activated to display at least one window configured to display webpage content of the shopping application.

Optionally, in response to a user's selection for an option bar for the shopping information recommendation, at least one shopping information list window is displayed, and the content displayed in the window includes a sub-option bar for related commodity description, and a sub-option bar for activation of the shopping application.

Optionally, in response to a user's selection for the sub-option bar for activation of the shopping application, the corresponding shopping application is activated.

Optionally, after the shopping application is activated, the currently-played content display layer is switched to a page related to a commodity in the selected shopping application.

Optionally, in response to a user's selection for the option bar for the shopping related information recommendation, at least one shopping information list window is displayed, and the content displayed in the window includes a sub-option bar for description of a related commodity, a sub-option bar for activation of the shopping application, and a sub-option bar for the QR code information.

Optionally, the QR code information indicates a webpage of the corresponding commodity in the shopping application.

Optionally, in response to a user's selection for the sub-option bar for the QR code information, the QR code information is presented in a magnified manner such that other electronic terminals is able to scan it to acquire the page of the corresponding commodity in the shopping application.

Optionally, in response to a user's selection for the sub-option bar for description of the commodity, details of the commodity are displayed, and include one or more commodity information, such as dimension, size, color and specification.

Tenthly, the present disclosure provides a smart television, including: a display device; a memory; and a processor in communication with the memory and the display device. The processor is configured to: while the display device is playing content, in response to an input instruction for capturing a screen shot, display a thumbnail image of a screen shot, wherein the thumbnail image contains at least one object; and in response to a selection for an object among the at least one object or an input keyword matched with an object among the at least one object, display related recommended content on the basis of the object.

Optionally, the recommended content includes: at least one type of content recommendation related to the object, a content profile related to a first type of the at least one type of content recommendation, and one or more content sources of the first type of content recommendation.

Optionally, in response to a user input for selecting the first type of content recommendation, the service or application corresponding to the silo related to the first type of content recommendation is activated.

Optionally, the service or application is any one of a webpage application, a video application, a TV program application and a shopping application.

Optionally, the recommended content is any one of a webpage text recommendation, a video on demand recommendation, a shopping webpage link recommendation and an application recommendation.

Eleventhly, the present disclosure provides a method for displaying a graphical user interface of a television screen shot, including: in response to an input instruction for capturing a screen shot from a user, displaying a graphical user interface that includes a currently-played content display layer and a screen shot content display layer. The screen shot content display layer includes a screen shot display bar configured to display thumbnail images of screen shots, a keyword option bar for displaying a keyword matched with an object in response to a user's input selection for different objects in the screen shot display bar, and a recommended content display bar for at least one kind of content recommendation related to the objects. The thumbnail image contains at least one object.

Optionally, in response to a user input for selecting a keyword in keyword option bar, different kinds of content recommendations related to a selected keyword in the keyword option bar are displayed in the at least one recommended content display bar.

Optionally, the screen shot content display layer further includes a display bar for input interfaces of control instructions in association with a screen shot.

Optionally, the display bar for input interfaces of control instructions includes a screen shot share display bar. In response to a user input for selecting the screen shot share display bar, a QR code image is output, so that a terminal can scan it to acquire the thumbnail image.

Optionally, the upper surface of the thumbnail image further includes a QR code image configured to display information of the thumbnail image. The thumbnail image and the QR code image are simultaneously uploaded to a third-party server such that the terminal scans the QR code image to acquire the thumbnail image from a third-party server.

Twelfthly, the present disclosure provides a smart television, including: a display device; a memory; and a processor in communication with the memory and the display device. The processor is configured to: while the display device is playing content, in response to an input instruction for capturing a screen shot, display a thumbnail image of a screen shot, wherein the thumbnail image contains at least one object; and in response to a selection for an object among the at least one object or a keyword matched with an object among the at least one object, displaying a focus frame selection indicator for a selected object and recommended content related to a selected object.

Optionally, before responding to the selection for an object, the selection for the object is received on the basis of a first position coordinate of the object in the thumbnail image and a preset input order of the object.

Optionally, the first position coordinate is obtained according to a second position coordinate of the object in an image displayed in the currently-played current display layer and a ratio of the image displayed in the currently-played current display layer to the thumbnail image.

Optionally, before responding to the selection for the keyword matched with the object, the selection of the keyword matched with the object is received on the basis of a direction movement indicator.

Optionally, after displaying the thumbnail image of the screen shot in response to the input instruction for capturing a screen shot, a QR code image containing information of the thumbnail image and user prompt information are also displayed. In response to a selection for the user prompt information, an information window displayed in a floating manner, and is configured to display the QR code image in a magnified manner to facilitate sharing the thumbnail image to a terminal.

Optionally, the QR code image and the user prompt information are displayed above the thumbnail image.

Thirteenthly, the present disclosure provides a method for displaying a graphical user interface of a television screen shot, including: in response to an input instruction for capturing a screen shot, displaying a graphical user interface that includes a currently-played current display layer and a screen shot content display layer. The screen shot content display layer includes a screen shot display bar configured to display a thumbnail image of a screen shot, and a recommended content display bar configured to display recommended content related to the content identified on the basis of the picture thumbnail image. The thumbnail image contains at least one object. In response to a selection for an object among the at least one object, a focus frame selection indicator for a selected object is displayed in the screen shot display bar, and the recommended content related to the selected object is displayed in the recommended content display bar.

Optionally, the recommended content display bar includes: one or more of a webpage text and/or image recommendation option bar, a TV program related video recommendation option bar and a commodity shopping information recommendation option bar.

Optionally, in response to a selection for any one of the option bars, at least one information window floats above the screen shot content display layer. The information window is configured to display information related to the content in the option bar.

Optionally, a transitional animation is used while the information window is displayed, and the transitional animation includes ways how the information window comes into display.

Fourteenthly, the present disclosure provides a method for displaying a graphical user interface of a television screen shot, including: in response to an input instruction for capturing a screen shot, displaying a graphical user interface that includes a currently-played current display layer, a screen shot content display layer and a function selection region. The screen shot content display layer is configured to display a thumbnail image of a screen shot and content-related recommended content related to the content identified on the basis of the thumbnail image. The function selection region includes an object selection tab for accessing an object in the thumbnail image, at least one content recommendation tab for accessing the recommended content, and/or a screen shot share tab for sharing the thumbnail image.

Optionally, in response to a selection for the object selection tab, different objects of the thumbnail image and/or keywords matched with the different objects are displayed in the screen shot content display layer.

Optionally, in response to a selection for a keyword, an object corresponding to the keyword is displayed in the screen shot content display layer.

Optionally, in response to a selection for a keyword, the at least one content recommendation tab is configured to provide an access to the recommended content related to an object corresponding to the keyword.

Optionally, in response to a selection for a content recommendation tab, the detailed content related to the content recommendation tab is displayed in the screen shot content display layer.

Optionally, when the detailed content related to the content recommendation tab is displayed in the screen shot content display layer, the function selection region has three states: hidden, displayed, and partially hidden and partially displayed.

Optionally, before the content of the thumbnail image is identified, the screen shot share tab in the function selection region is in a selectable state, and the object selection tab and the at least one content recommendation tab are in a non-selectable state.

Optionally, the screen shot content display layer and the function selection region are arranged in the left-right direction or in the up-down direction.

Fifteenthly, the present disclosure provides a method for displaying a graphical user interface of a television screen shot, including: in response to an input instruction for capturing a screen shot, displaying a graphical user interface that includes a currently-played current display layer, a screen shot content display layer and a function selection region. The screen shot content display layer is configured to display a thumbnail image of a screen shot and recommended content related to the content identified on the basis of the thumbnail image. The function selection region includes an object selection tab for accessing an object in the thumbnail image, at least one content recommendation tab for accessing the recommended content, and/or a screen shot share tab for sharing the thumbnail image. In response to a selection for the object selection tab, a sub-menu tab of the object selection tab is displayed in the function selection region. The sub-menu tab includes a keyword matched with an object of the at least one object in the thumbnail image.

Optionally, in response to a selection for a keyword, an object corresponding to the keyword is displayed in the screen shot content display layer.

Optionally, after the object corresponding to the keyword is displayed in the screen shot content display layer, in response to a selection for the at least one content recommendation tab, recommended content related to the object corresponding to the keyword are displayed in the screen shot content display layer.

Optionally, the content recommendation tab is configured to provide one or more recommended content accesses to a webpage text and/or thumbnail image, a TV program related video and commodity shopping information.

Sixteenthly, the present disclosure provides a smart television, including a display; a memory; and a processor in communication with the memory and the display. The processor is configured to perform: the method for displaying a graphical user interface of a television screen shot of any one of the second, fourth to ninth, eleventh, and thirteenth to fifteenth aspects.

The present disclosure describes another embodiment of a smart television. The smart television includes a display device configured to display a user interface; a memory storing instructions; and a processor in communication with the display device and the memory. When the processor executes the instructions, the processor is configured to perform: while the display device is displaying currently-played content, in response to receiving an input instruction for capturing a screen shot, acquiring a screen shot image comprising at least one object, while the display device continues playing, displaying a screen shot content display layer on the display device, wherein the screen shot content display layer is configured to present the screen shot image associated with the at least one object, in response to receiving an input for selecting an object among the at least one object or a keyword matched with the object, displaying recommended content based on the object, and in response to receiving a selection for a different object on the screen shot image by moving a focus frame to indicate the selection on the different object, updating presentation of recommended content based on the selected different object indicated by the focus frame.

The present disclosure describes another embodiment of a method of displaying a graphical user interface for a television screen shot. The method include while a display device is displaying currently-played content, in response to receiving an input instruction for capturing a screen shot, acquiring, by an apparatus comprising the display device, a memory storing instructions, and a processor in communication with the display device and the memory, a screen shot image comprising at least one object; while the display device continues playing, displaying, by the apparatus, a screen shot content display layer on the display device, wherein the screen shot content display layer is configured to present the screen shot image associated with the at least one object; in response to receiving an input for selecting an object among the at least one object or a keyword matched with the object, displaying, by the apparatus, recommended content related to the object; and in response to receiving a selection for a different object on the screen shot image by moving a focus frame to indicate the selection on the different object, updating, by the apparatus, presentation of recommended content based on the selected different object indicated by the focus frame.

The above is a brief summary of the present disclosure to explain certain aspects of this application. This summary is not an extensive or exhaustive overview of this application and its various aspects, examples and/or configurations. The purpose is neither to determine the primary or critical elements of this application, nor to describe the scope of this application, but to briefly introduce some of the concepts of the application as an introduction to the detailed description below. It should be understood that other aspects, examples, and/or configurations of the present disclosure may utilize one or more of the features set forth above or as detailed below, either singly or in combination.

BRIEF DESCRIPTION OF THE DRAWINGS

FIG. 12 illustrates another example GUI for selecting and triggering a screen shot;

FIG. 13 illustrates an example GUI for selecting a screen shot picture option bar;

FIG. 44 is another flow diagram illustrating a method for displaying a GUI of a screen shot of a currently-played content on a display according to some embodiments;

FIG. 45 is another flow diagram illustrating a method for displaying a GUI of a screen shot of a currently-played content on a display according to some embodiments.

Figure 1A:
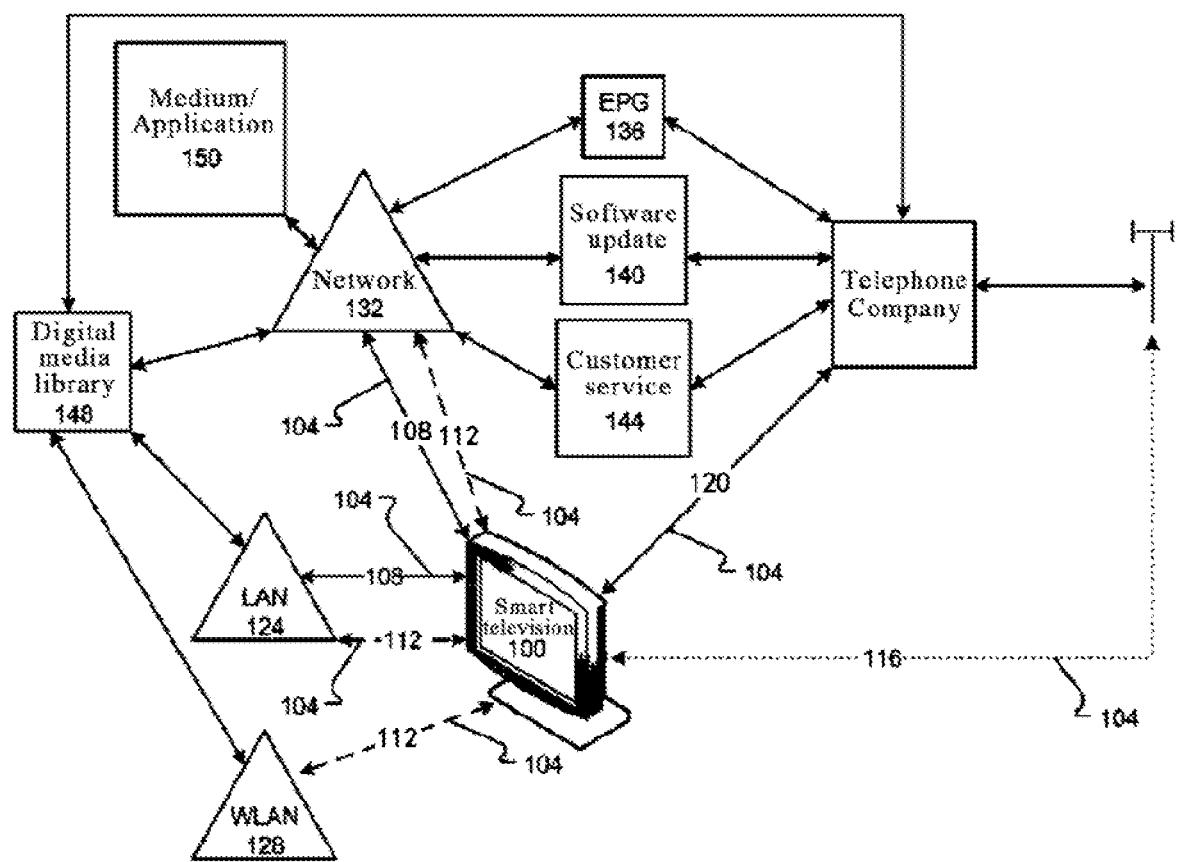
FIG. 1A illustrates a first view of an environment or smart television example.

In these drawings, similar components and/or features may have the same reference label. Moreover, various components of the same type can be distinguished from other similar components by reference to the letters in the labels. If only the first reference label is used in the specification, this description is applicable to any similar component with the same first reference label, regardless of whether the second reference label is the same.

DETAILED DESCRIPTION OF THE EMBODIMENTS

In the following descriptions, a large number of specific details are described to provide clearer illustrations of the embodiments of the present disclosure. However, it is apparent for those skilled in the art that these specific details may not be used during implementation of the embodiments of the present disclosure.

The term "live television" used in the present disclosure refers to real-time television production broadcastings or television production broadcastings basically synchronized with an event occurrence moment.

The term "Video on Demand" (VOD) used in the present disclosure refers to a system and process for allowing a user to select and watch/listen content of videos or audios on demand. A VOD system may shunt a content, so that the content is watched in real time or the content is downloaded to a storage medium for watching later.

The term "display screen" refers to a portion of one or more screens, and is configured to display content output by a computer to a user. The display (or display screen) can be a single-screen display or a multi-screen display (known as a composite display). A single actual screen can contain multiple displays that are managed as separate logical displays. Therefore, different content can be displayed on the separate displays, even though it is in a certain part of the same actual screen.

The term "remote controller" refers to a component of an electronic device (most commonly a television receiver, DVD player, and/or home theater system) that typically wirelessly controls the device over a short line of sight. The remote controller typically uses infrared and/or radio frequency (RF) signals that may include WiFi, a wireless USB, Bluetooth™ connection and a motion sensor to initiate function and/or voice control. A touch screen remote controller is a handheld remote control apparatus that replaces most of physical built-in hard keys in a traditional remote control apparatus with a touch screen user interface.

The term "display image" as used in the present disclosure refers to an image content formed on a display. A typical display image is a television broadcast content. The display image will take up all or part of the display.

The term "panel" as used in the present disclosure may refer to a user interface that is displayed at least in a portion of the display. Panels can be interactive (such as accepting user inputs) or only providing information (such as not accepting the user inputs), and can be semitransparent, so it becomes blurry, but does not obscure the content on the display screen. The panel can be changed based on a user input from a button or a remote controller interface.

The term "silo" as used in the present disclosure may be a logical representation of an input, source, or application. The input can be an electronic device (such as a DVD and a video recorder) that is connected to a television via a port (such as an HDMI and a video/audio input port) or a network (such as local and wide area networks). Unlike a device, the input can be connected to one or more devices as an electrical or physical connection configuration. The source, especially a content source, can be a data service (such as a media center and file system) that provides content. The application can be a software service (such as a live television, video on demand, a user application and picture displaying) that provides a specific function type. The silo, as a logical representation, can have other related definitions or attributes, such as setting, function, or other characteristics.

The terms "determining," "calculating," and "computer computing," and variations thereof, as used in the present disclosure, are used interchangeably and include any type of methodology, process, mathematical operation, or skill.

Thereafter, when user interface elements in "select", "selected" "will select" or "being selecting" graphical user interfaces (GUIs) are mentioned in the present disclosure, these belongings should be understood as including use of a mouse or other input devices to click or "hover" over at least one of the user interface elements, or use of one or more fingers or styluses to touch a screen, tap the screen, or make a gesture on at least one of the user interface elements. The user interface elements can be virtual buttons, menu buttons, selectors, switches, sliders, erasers, knobs, thumbnail images, links, icons, single-click buttons, check boxes, and any other mechanisms that receive inputs from users.

Figure 1B:
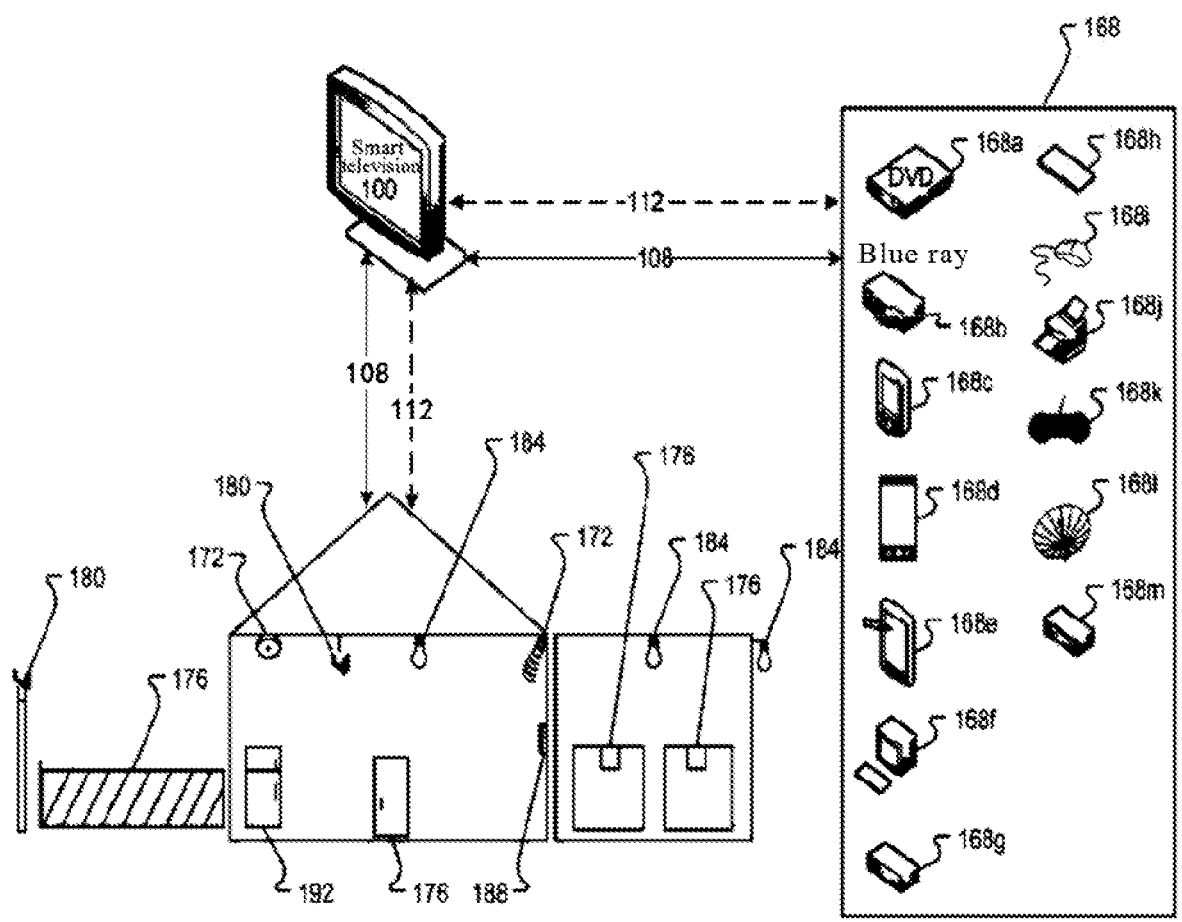
FIG. 1B illustrates a second view of an environment or smart television example.

Smart Television (TV) Environment:

referring to some embodiments of a smart TV 100 as shown in FIGS. 1A and 1B, the smart TV may be used for enhancing the user interaction experience, either at home or in a working place.

In some examples, the smart TV 100 may receive and comprehend various user and/or device inputs via configuration. For example, a user can interact with the smart TV 100 through one or more physical or electronic controls that may include a button, a switch, a touch screen/region and/or other controls associated with the smart TV 100. On some circumstances, the smart TV 100 may contain one or more interactive controls that may be associated with a remote controller. The remote controller may communicate with the smart TV 100 through a wired and/or wireless signal.

Optionally, the smart TV 100 may be controlled with a smart phone, a flat computer, a computer, a notebook computer, a netbook and other smart devices. For example, the smart TV 100 is controlled by using an application operated on a smart device. The application can be configured to provide various control functions of the smart TV 100 to a user in an intuitive user interface (UI) on a screen associated with the smart TV 100.

The smart TV 100 may be configured to receive inputs through various input devices. For example, the user can talk to the smart TV 100 in a session way. The smart TV 100 may have a role similar to a smart personal assistant for smart devices and a voice-activated navigation application to receive and understand voice commands.

In addition, the smart TV 100 can be configured as a communication device that can establish network connections 104 and use a telephone line 120 to connect to a telephone network operated by a telephone company in many different manners (including a wired 108 or wireless 112 mode, and a cellular network 116). These connections 104 enable the smart TV 100 to access one or more communication networks. The Internet is an example of the communication networks 132.

In some examples, the smart TV 100 can be equipped with a variety of communication tools. The variety of communication tools may allow the smart TV 100 to communicate with a local area network (LAN) 124, a wireless local area network (WLAN) 128, and other networks 132. These networks can act as redundant connections to ensure network accesses. In other words, if one connection is broken, the smart TV 100 will re-establish and/or maintain the network connections 104 by using another connection path. Moreover, the smart TV 100 also uses these network connections 104 to send and receive information, and to interact with an electronic program guide (EPG) 136, receive software updates 140, contact customer services 144 (such as get help or services) and/or access a remotely stored digital media library 148.

The smart TV 100 can create and save screen shots of media, images and data which are displayed on the associated screen of the smart TV 100.

As shown in FIG. 1B, the smart TV 100 may interact with other electronic devices 168 via the wired 108 and/or wireless 112 connection. As described in the present disclosure, the components of the smart TV 100 allow the device 100 to be connected to the devices 168, including, but not limited to, a DVD player 168*a*, a Blue-ray player 168*b*, a portable digital media device 168*c*, a smart phone 168*d*, a tablet device 168*e*, a personal computer 168*f*, an external junction box 168*g*, a keyboard 168*h*, a positioning device 168*i*, a printer 168*j*, a game controller and/or gamepad 168*k*, a satellite dish 168*l*, an external display device 168*m* and other universal serial buses (USBs), an LAN, Bluetooth™, a high definition multimedia interface (HDMI) component device and/or a wireless device. When connected to the external junction box 168*g* or satellite dish 168*l*, the smart TV 100 can access more media content.

Moreover, as detailed below, the smart TV 100 can receive digital and/or analog signal broadcasts from a TV station. It can work as one or more cable TVs, Internet TVs, Internet protocol TVs, satellite TVs, web TVs and/or smart TVs. The smart TV 100 can also be configured to control and interact with other smart components, such as a security system 172, an entrance guard/gate controller 176, a remote video camera 180, a lighting system 184, a thermostat controller 188, a refrigerator 192 and other apparatuses.

Figure 2:
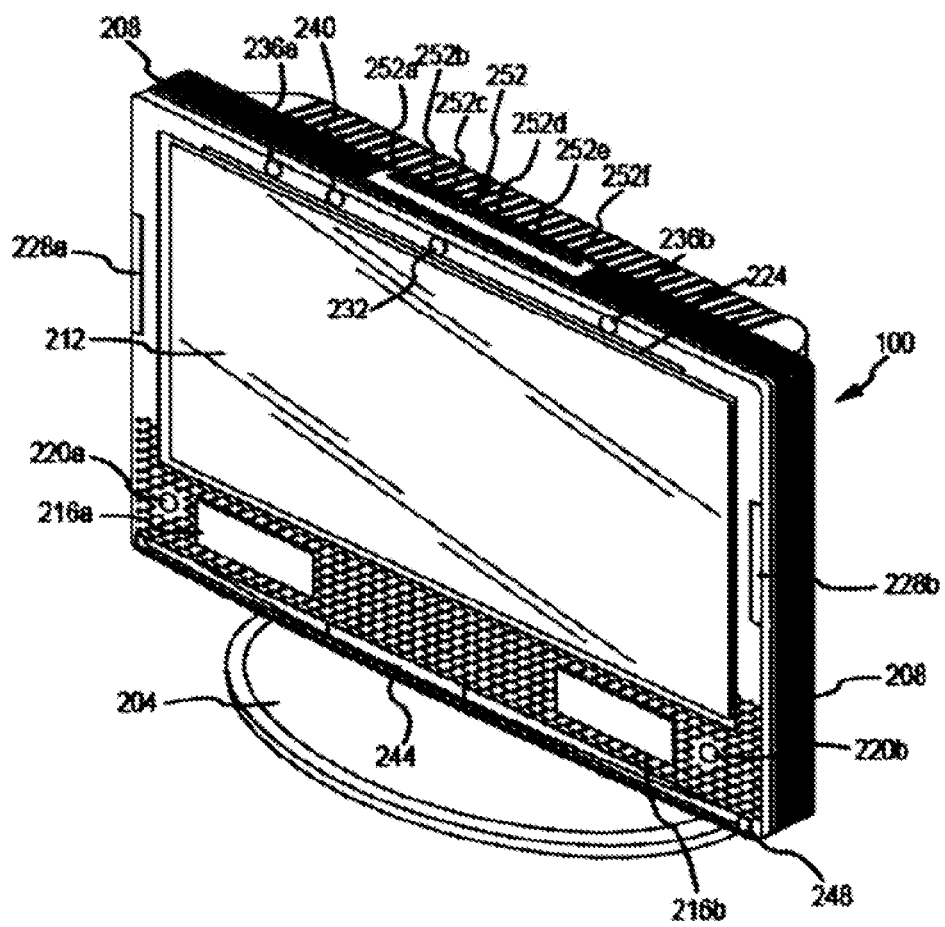
FIG. 2 illustrates a first view of a smart television example.

Smart TV:

FIG. 2 illustrates components of the smart TV 100. As shown in FIG. 2, the smart TV 100 may be supported by a movable base or bracket 204 that is connected to a framework 208. The framework 208 surrounds the edge of a display 212 without covering its front side. The display 212 may include a liquid crystal display (LCD), a plasma screen, a light emitting diode (LED) screen, or other type of screens.

The smart TV 100 may contain an integrated loudspeaker 216 and at least one microphone 220. In some examples, a first region of the framework 208 includes a horizontal gesture capturing region 224, and a second region includes a vertical gesture capturing region 228. The gesture capturing regions 224 and 228 contain regions that can receive inputs by identifying user gestures. In some examples, users do not need to actually touch the surface of the screen 212 of the smart TV 100 at all. However, the gesture capturing regions 224 and 228 do not contain pixels that can perform display functions or capabilities.

In some examples, one or more image capturing devices 232 (such as a camera) are added to capture still and/or video images. The image capturing devices 232 may include or be connected with other elements, such as a flashlight or other light sources 236 and a ranging device 240 to assist in focusing of the image capturing devices. In addition, the smart TV 100 can also identify the respective users by using the microphone 220, the gesture capturing regions 224 and 228, the image capture devices 232 and the ranging device 240. Additionally or alternatively, the smart TV 100 can learn and remember the preferences of the respective users. In some examples, learning and memorizing (such as identifying and calling stored information) may be related to user identification.

In some examples, an infrared transmitter and receiver 244 can also be provided and connected to the smart TV 100 via a remote control device (not shown here) or other infrared devices. Additionally or alternatively, the remote control device can transmit wireless signals by other manners in addition to RF, light and/or infrared rays.

In some examples, an audio jack 248 is hidden behind a foldable or movable panel. The audio jack 248 contains a cuspidal round sleeve or tip-ring-sleeve (TRS) connector that allows, for example, a user to use headphones, a headset, or other external audio devices.

In some examples, the smart TV 100 also includes a plurality of buttons 252. For example, FIG. 2 shows the buttons 252 at the top of the smart TV 100, which can also be located at other positions. As shown in the figure, the smart TV 100 contains six buttons 252 (from a to f) that can be configured for particular inputting. For example, the first button 252 can be configured to be an on/off button for controlling system power of the entire smart TV 100. The buttons 252 can be configured together or separately to control multiple aspects of the smart TV 100. Some non-restrictive examples include, but not limited to, an overall system volume, brightness, image capturing devices, microphones, and holding/ending of video conferences. Different from the independent buttons, two buttons can be combined into one rocker button. This rocker button is very useful in certain situations, such as performing functions of controlling the volume or brightness.

In some examples, one or more buttons 252 can be used to support different user commands. For example, the duration of a normal press is generally less than 1 second, similar to fast input. The duration of a medium press is generally 1 second or longer, but no more than 12 seconds. The duration of a long press is generally 12 seconds or longer. This function of the button generally depends on an application activated on the smart TV 100. For example, in a video conference application, the normal, medium, or long press may mean ending a video conference, increasing or decreasing the volume, increasing the input response speed, and switching the microphone mute according to specific buttons. The normal, medium, or long press can also control the image capturing devices 232 to be zoomed in and zoomed out, take pictures or record videos according to specific buttons.

Figure 3:
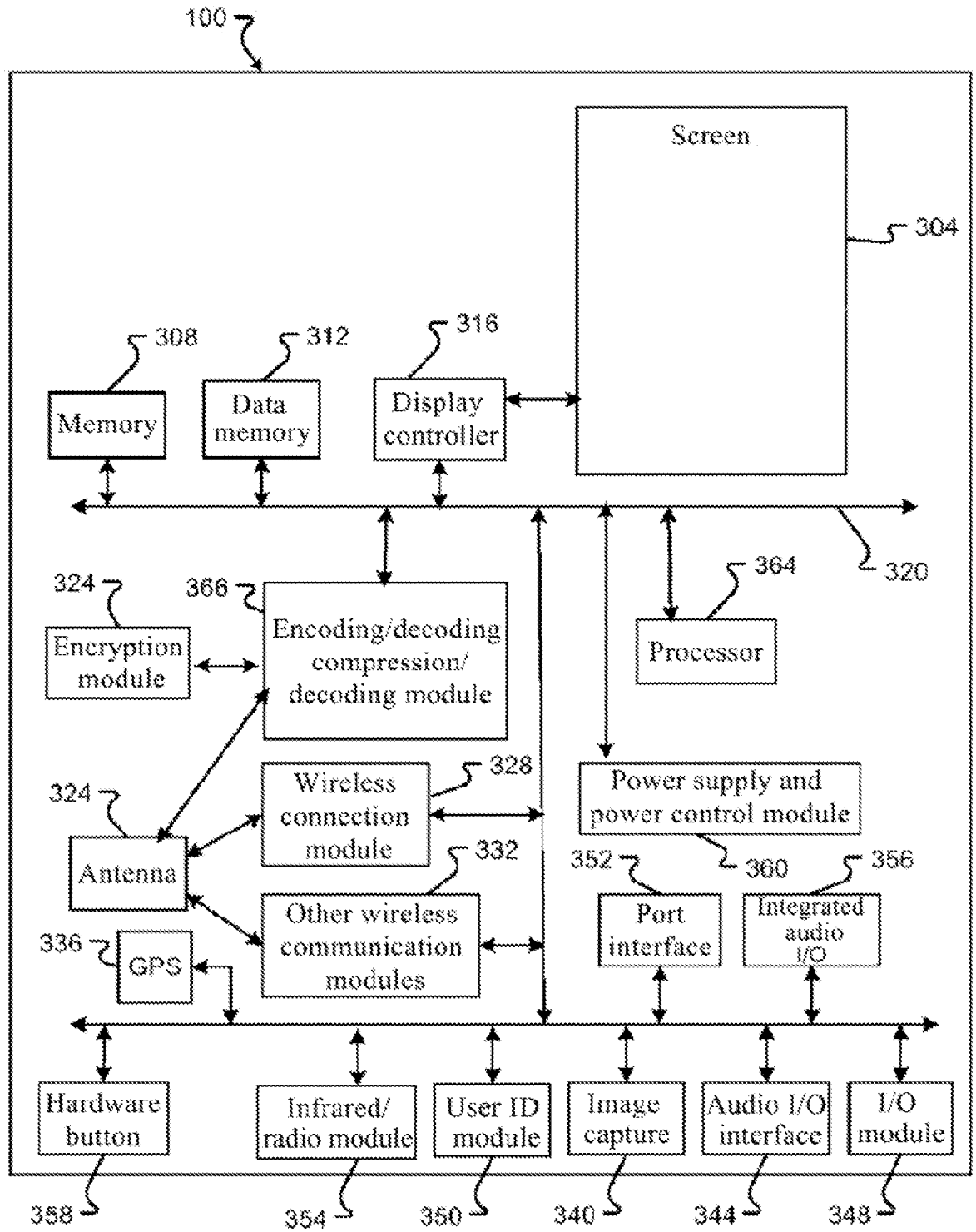
FIG. 3 illustrates a block diagram of a smart television hardware example.

Hardware Functions:

FIG. 3 illustrates some components of the smart TV 100 according to the example of the present disclosure. The smart TV 100 includes a display or a screen 304.

One or more display controllers 316 may be used to control the operation of the screen 304. The display controller 316 may control the operation of the screen 304, including input and output (display) functions. The display controller 316 may also control the operation of the screen 304 and interact with other inputs, such as infrared and/or radio input signals (e.g., an entrance guard/door controller and an alarming system component). According to some other examples, the function of the display controller 316 may be possibly added into other components such as a processor 364.

The processor 364 may contain a universal programmable processor or controller for performing application design or instructions. According to at least some examples, the processor 364 contains a plurality of processor cores and/or executes a plurality of virtual processors. According to some other examples, the processor 364 may possibly include a plurality of physical processors. As a specific example, the processor 364 may include a particularly configured application-specific integrated circuit (ASIC) or other integrated circuits, a digital signal processor, a controller, a hard-wired electronic or logic circuit, a programmable logic device or gate array, a special-purpose computer and the like. The processor 364 is generally used to operate program codes or instructions to execute various functions of the smart TV 100.

In order to support a connection function or capacity, the smart TV 100 may include an encoding/decoding and/or compression/decompression module 366 to receive and manage digital TV information. The encoding/decoding and/or compression/decompression module 366 may decompress and/or decode analog and/or digital information sent from a public TV link or in a private TV network and received through an antenna 324, an I/O module 348, a wireless connection module 328 and/or other wireless communication modules 322. The TV information may be sent to the screen 304 and/or an affiliated loudspeaker that receives an analog or digital receiving signal. Any encoding/decoding and compression/decompression may be executed on basis of various formats (such as audio, video and data). An encryption module 324 communicates with the encoding/decoding and/or compression/decompression module 366 such that all data received or sent by a user or supplier are kept confidential.

In some examples, the smart TV 100 includes extra or other wireless communication modules 332. For example, the other wireless communication modules 332 may include Wi-Fi, Bluetooth™, WiMax, infrared or other wireless communication links. A wireless communication module 328 and the other wireless communication modules 332 may be connected with one shared or dedicated antenna 324 and one shared or dedicated I/O module 348.

In some examples, in order to support the communication function or capacity, the smart TV 100 may include the wireless connection module 328. For example, the wireless connection module 328 may include a global system for mobile communications (GSM), a code division multiple access (CDMA), a frequency division multiple access (FDMA) and/or an analog cellular phone transceiver, and can transmit voices, multimedia and/or data through a cellular network.

The I/O module 348 and associated ports can be added, so as to support communication with other communication devices, servers and/or peripherals through a wired network or a link. The I/O module 348 includes an Ethernet port, a universal serial bus (USB) port or other interfaces.

An audio input/output interface/device 344 can be added to output an analog audio to the loudspeaker or other devices connected thereto, and receive an analog audio input from the microphone or other devices connected thereto. For example, the audio input/output interface/device 344 may include an associated amplifier and an analog-to-digital converter. Alternatively or additionally, the smart TV 100 may include an integrated audio input/output device 356 and/or an audio jack connected to an external loudspeaker or microphone. A port interface 352 may be added, and includes a peripheral or universal port which provides a support to connection of the device 100 to other devices or components (such as a dock). After mutual connection, these devices or components may possibly or may not possibly provide extra or different functions to the device 100. A docking port and/or the port interface 352 may further supply power to the device 100 or output power from the device 100 in addition to supporting exchange of communication signals between the device 100 and other devices or components. The port interface 352 further includes a smart element which includes a docking module for controlling the communication or other interaction between the smart TV 100 and the device or element connected thereto.

The smart TV 100 may further include a memory 308 which facilitates the processor 364 to execute the application design or instruction and is used to store program instructions and/or data temporarily or for a long time. For example, the memory 308 may include a random access memory (RAM), a dynamic random access memory (DRAM), a synchronous dynamic random access memory (SDRAM) or other solid-state memories. In some examples, a data memory 312 is added. Similar to the memory 308, the data memory 312 may include one or more solid-state memories. In some examples, the data memory 312 may include one hard disk driver or other RAMs.

For example, a hardware button 358 may be applied to certain control operations. One or more image capturing interfaces/devices 340 (such as a camera) can be added to capture still and/or video images. In some examples, the image capturing interfaces/devices 340 may include a scanner, a code reader, or an action sensor. The image capturing interfaces/devices 340 may include or be connected with other elements such as a flashlight or other light sources. The image capturing interfaces/devices 340 may interact with a user ID module 350 that helps to identify the identity of a user of the smart TV 100.

The smart TV 100 may also include a global positioning system (GPS) receiver 336. According to some examples of the present disclosure, the GPS receiver 336 may further include a GPS module to provide absolute positioning information to other components of the smart TV 100. Therefore, it can be understood that other satellite positioning system receivers can be replaced or used in conjunction with a GPS.

The components of the smart TV 100 may be powered by a main power supply and/or a power control module 360. For example, the power control module 360 includes a battery, an AC to DC converter, a power control logic and/or a port that interconnects the smart TV 100 with an external power supply.

Figure 4:
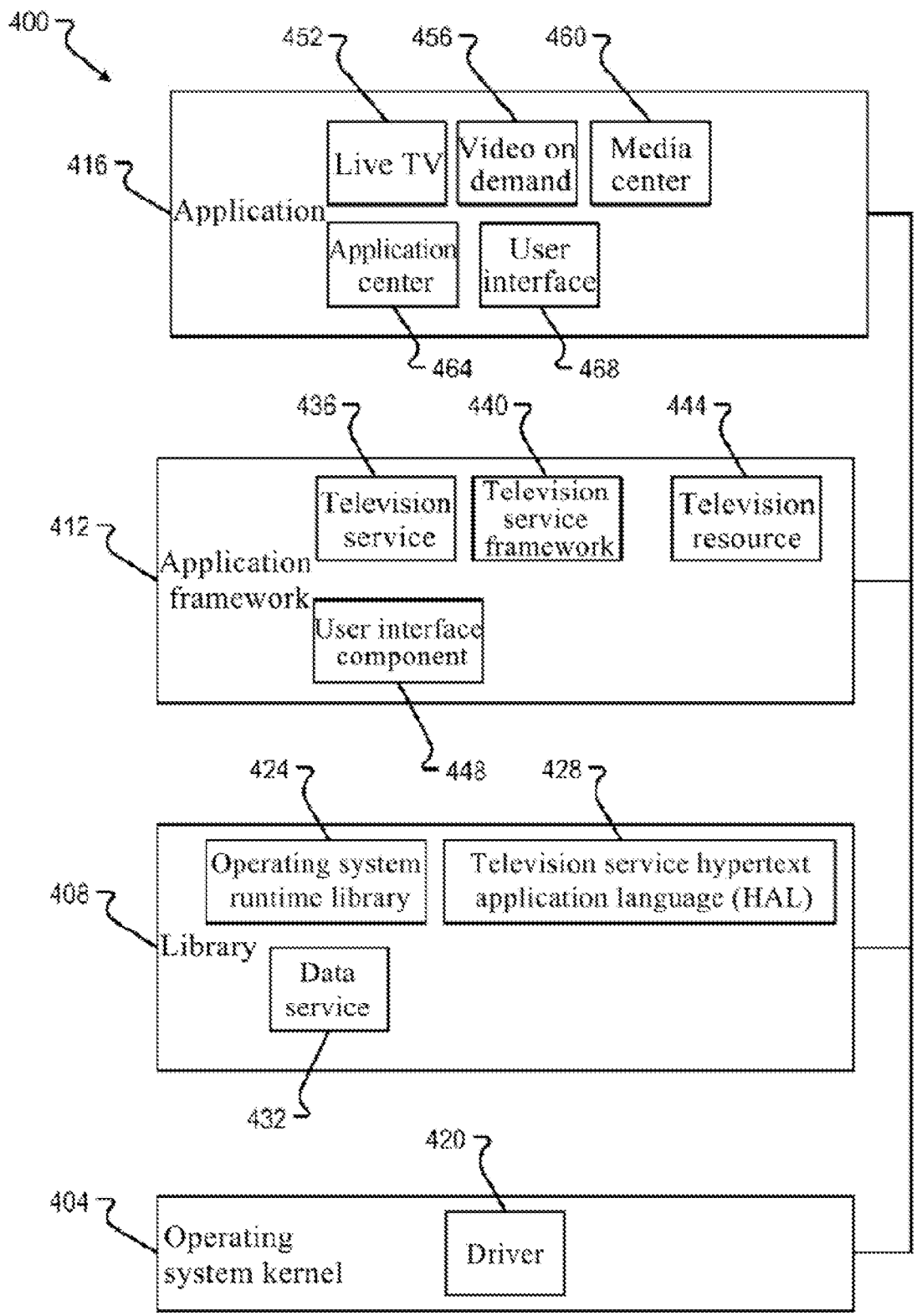
FIG. 4 illustrates a block diagram of a smart television software and/or firmware example.

Firmware and Software:

FIG. 4 illustrates an example of a software system component and module 400. The software system 400 possibly includes one or more layers, including, but not limited to, an operating system (OS) kernel 404, one or more libraries 408, an application framework 412 and one or more applications 416. One or more layers 404 to 416 may communicate with each other to execute the functions of the smart TV 100.

The OS kernel 404 contains a main function that allows software and hardware associated with the smart TV 100 to interact with each other. The kernel 404 may contain a series of software for managing computer hardware resources and servicing other computer programs or software codes. The OS kernel 404 is a main component of an OS and acts as an intermediary between an application and data processing completed by a hardware component. Part of the OS kernel 404 may include one or more device drivers 420. The device driver 420 may be any code in the OS to assist in the operation or control of devices or hardware connected to or associated with the smart TV. The driver 420 may contain a code for operating videos, audios and/or multimedia components of other smart TVs 100. Examples of the drivers include a display and a camera.

The libraries 408 may contain codes or other components that are accessed and executed during operation of the software system 400, and possibly contain, but not limited to, one or more OS runtime libraries 424, a TV system hypertext application language (HAL) library 428, and/or a data service library 432. The OS runtime library 424 may possibly contain codes required by the OS kernel 404 and other OS functions that are executed during the operation of the software system 400. This library may contain a code that is launched during the operation of the software system 400.

The TV service HAL 428 may contain a code required by a TV service and executed by the application framework 412 or the application 416. The TV service HAL library 428 is specific to controlling the operation of the smart TVs 100 with different smart TV functions. In addition, the TV service HAL library 428 may also be comprised of other types of application languages in addition to an HAL or instances of different code types or code formats.

Figure 6:
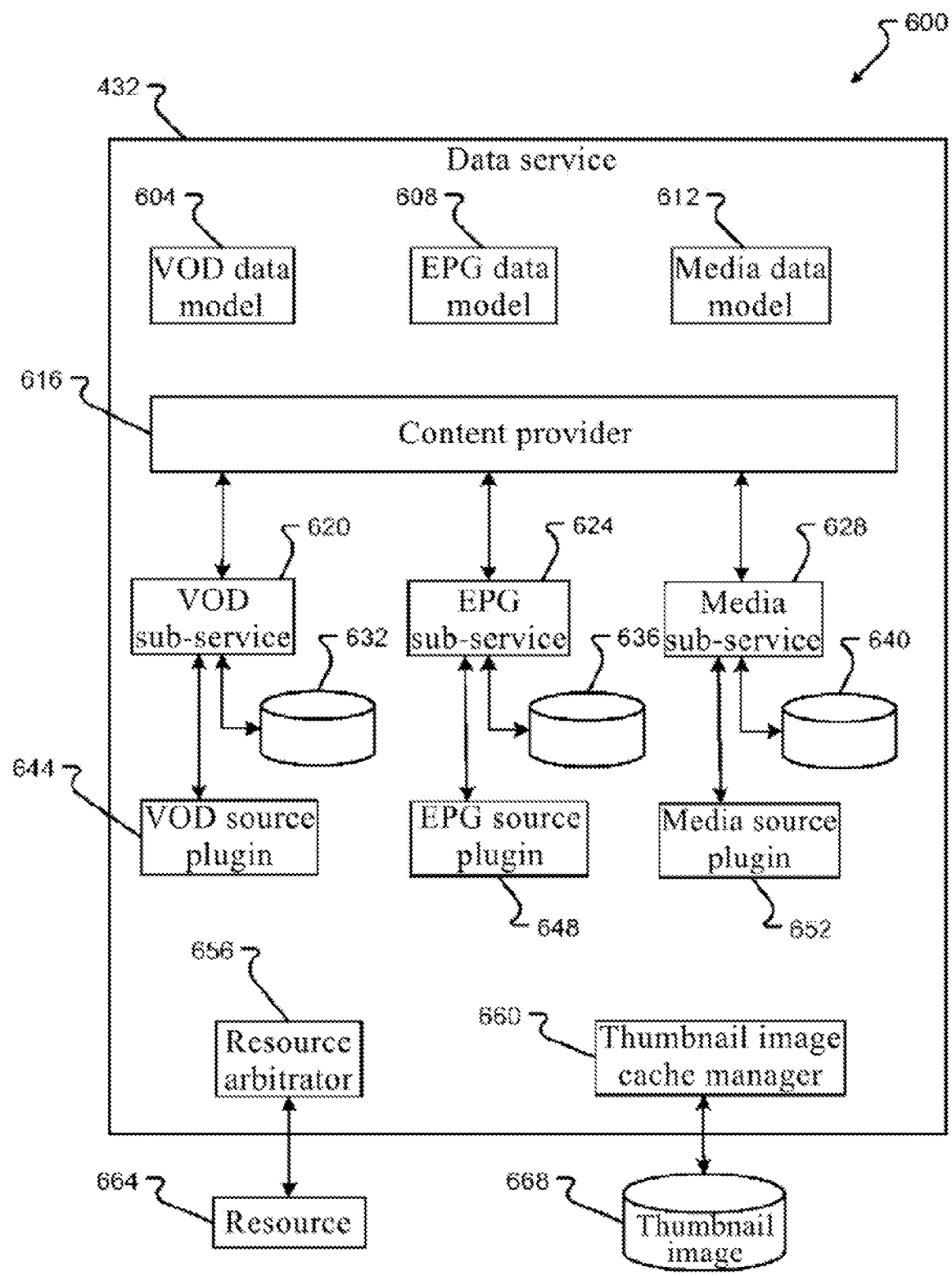
FIG. 6 illustrates a third block diagram of a smart television software and/or firmware example.

The data service library 432 may contain one or more components or codes, and is used for executing components that realize data service functions. The data service functions can be executed in the application framework 412 and/or the application layer 416. FIG. 6 illustrates examples of a data service function and a component type.

The application framework 412 may contain a general abstract concept of a provided function. The function may be selected through one or more applications 416, so as to provide specific application functions or software to these applications. Therefore, the framework 412 may contain one or more different services, or provide other applications having general functions on two or more applications through an access to the applications 416. For example, this function includes management of one or more windows or panels, planes, activities, content and resources. The application framework 412 may contain, but not limited to, one or more TV services 434, TV service frameworks 440, TV resources 444 and user interface components 448.

The TV service framework 440 may provide extra abstract concepts to different TV services. The TV service frameworks 440 allow regular accesses to and operations of services related to TV functions. The TV services 436 are general services provided in the TV service framework 440 that can access the applications in the application layers 416. The TV resources 444 provide codes for accessing TV resources. These resources include any type of stored content, videos, audios or functions provided by other smart TVs 100. The TV resources 444, the TV services 436 and the TV service framework 440 are to execute TV function services of the smart TV 100.

Figure 5:
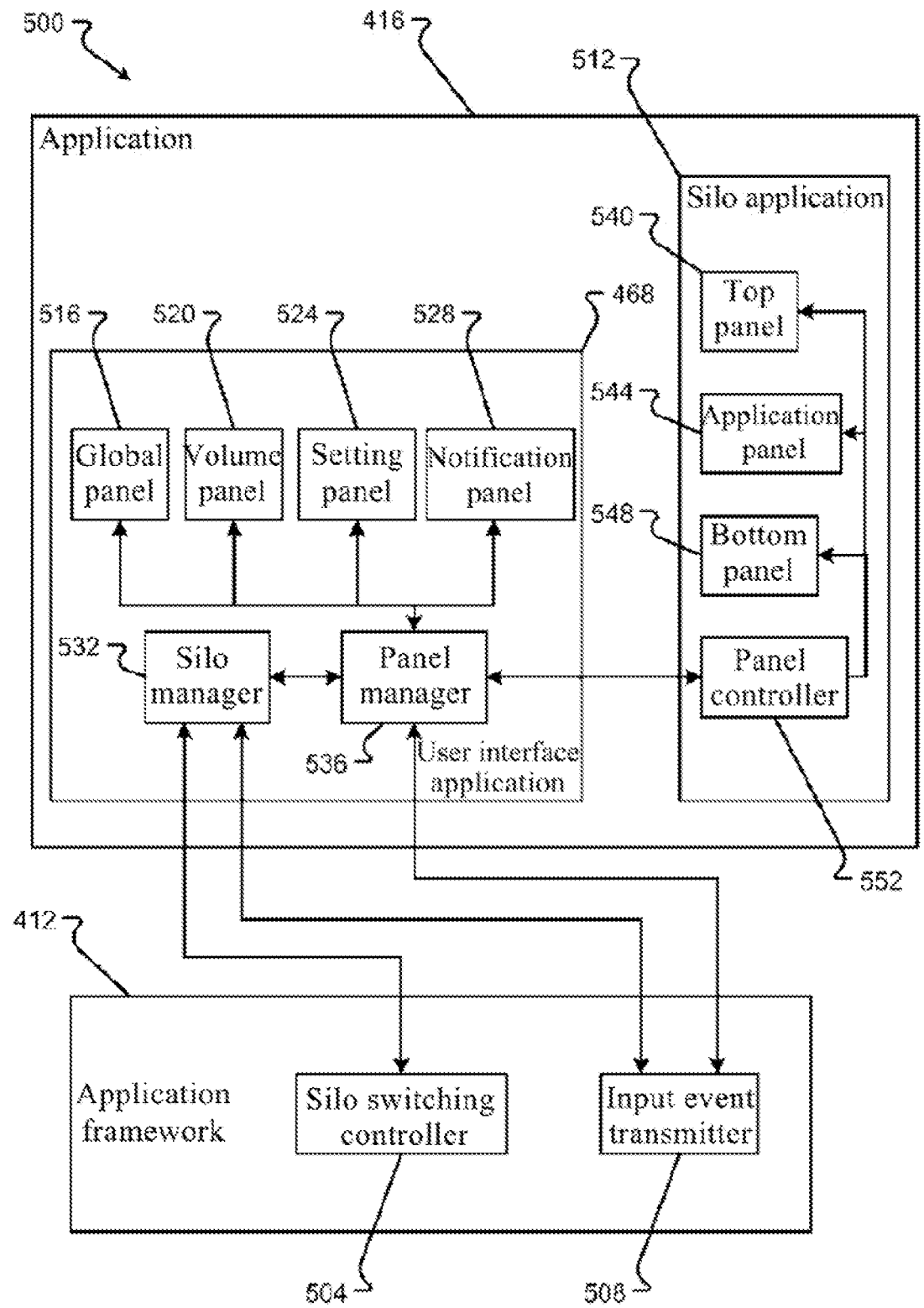
FIG. 5 illustrates a second block diagram of a smart television software and/or firmware example.

One or more user interface components 448 may provide general components for displaying of the smart TV 100. The user interface components 448 may act as general components that are accessed by various applications provided by the application framework 412. The user interface components 448 can be accessed to provide services to the panel and silo as shown in FIG. 5.

The application layer 416 may contain and execute the applications related to the smart TV 100. The application layer 416 possibly contains, but not limited to, one or more live TV applications 452, video on demand applications 456, media center applications 460, application centers 464 and user interface applications 468. The live TV applications 452 can provide live TVs through different signal sources. For example, the live TV applications 452 can use inputs from a wired TV, an air broadcast, a satellite service or other types of live TV services to provide the TVs. Then, the live TV applications 452 can display multimedia presentations or video and audio presentations of live TV signals on the display of the smart TV 100.

The video on demand applications 456 can provide videos from different storage sources. Different from the live TV applications 452, the video on demand applications 456 display videos from some storage sources. Video on demand sources can be associated with users or smart TVs or some other types of services. For example, the video on demand 456 can be provided by the iTunes library stored by a cloud technology, a local hard disk memory that contains stored video programs or some other sources.

The media center applications 460 can provide applications required by various media presentations. For example, the media center 460 can provide services for displaying of images or audios that are different from live TV or video on demand but still can be accessed by users. The media center 460 can acquire media displayed on the smart TV 100 by accessing different sources.

The application center 464 can provide, store and use the applications. The applications can be games, productivity applications or some other applications that are generally related to a computer system or other devices and can be operated in the smart TV. The application center 464 can acquire these applications from different sources, store them in a local memory, and execute these applications for the user on the smart TV 100.

The user interface applications 468 can provide services for specific user interfaces associated with the smart TV 100. These user interfaces can contain the silos and panels in FIG. 5. One example of user interface software 500 is as shown in FIG. 5. The application framework 412 herein contains one or more code components that may help control user interface events. Meanwhile, one or more applications in the application layer 416 affect the use of the user interfaces of the smart TV 100. The application framework 412 may contain one silo switching controller 504 and/or an input event transmitter 508. The code components in the application framework 412 are possibly more or less than those as shown in FIG. 5. The silo switching controller 504 contains a code and language for managing switching between one or more silos. The silos can be vertical user interface functions on the smart TV, and contain user available information. The switching controller 504 can manage switching between two silos when a user interface has an event. The input event transmitter 508 can receive event information of the user interface. The event information is from the OS, and then transmitted to the input event transmitter 508. The event information may contain button selections on the remote controller or the TV, or other types of user interface inputs. Then, the input event transmitter can transmit the event information to a silo manager 532 or a panel manager 536 (depending on the type of the event). The silo switching controller 504 can interact with the silo manager 532 to affect changing of the silos.

The application framework 416 can contain a user interface application 468 and/or a silo application 512. The user interface applications which are contained in the application framework 416 and necessary to the smart TV 100 can be more or less than those as shown in FIG. 5. The user interface applications may contain the silo manager 532, the panel manager 536 and one or more panels 516 to 528. The silo manager 532 manages displaying and/or functions of the silos. The silo manager 532 can receive or transmit information from the silo switching controller 504 or the input event transmitter 508, so as to change a displayed silo and/or determine an input type received by a silo.

The panel manager 536 can display the panels in the user interfaces, so as to manage switching between these panels or affect user interface inputs received in the panels. Therefore, the panel manager 536 can communicate with different user interface panels, such as a global panel 516, a volume panel 520, a setting panel 524 and/or a notification panel 528. The panel manager 536 can display these types of panels, specifically depending on inputs from the input event transmitter 508. The global panel 516 possibly contains information related to a home screen or highest-level information of a user. Information displayed on the volume panel 520 is related to an audio volume control or other volume settings. Information displayed on the setting panel 524 is related to audio or video settings or other settable characteristics of the smart TV 100. The notification panel 528 may provide information related to user notifications. These notifications may be possibly related to video on demand displaying, collection, currently-provided programs and the like or other information. The content of the notifications is related to media or some types of settings or operations or the smart TV 100. The panel manager 536 can communicate with a panel controller 552 of the silo application 512.

The panel controller 552 may control some panels in the above-mentioned several types. Therefore, the panel controller 552 can communicate with a top panel application 540, an application panel 544 and/or a bottom panel 548. The several panels are different when displayed in the user interfaces of the smart TV 100. Therefore, the panel control may be determined on basis of a system configuration or the type of a currently-used display. The panels 516 to 528 are set to in a certain display direction (depending on the top panel application 540, the application panel 544 or the bottom panel application 548).

FIG. 6 is an example of a data service 432 and a data management operation. Data management 600 may contain one or more code components associated with different types of data. For example, the data service 432 may contain a plurality of code components used to execute video on demand, electronic program guide or media data functions and related to these functions. The component types of the data service 432 may be possibly more or less than those as shown in FIG. 6. Each of different types of data may possibly contain data models 604 to 612. These data models determine types of information to be stored in the data service and ways to store the information. Therefore, the data models can manage any data, no matter where they come from and how they will be received and managed in a smart TV system. Thus, the data models 604, 608, and/or 612 can provide the transform capacity or the capacity of affecting the transformation of data from one form into another form available for the smart TV 100.

A variety of different data services (video on demand, electronic program guides and media) each have a data sub-service 620, 624 and/or 628 for communication with one or more internal and/or external content providers 616. The data sub-services 620, 624 and 628 communicate with the content providers 616 to acquire data and then store the data in databases 632, 636 and 640. The sub-services 620, 624 and 628 can communicate with the content providers by initiating or enabling one or more source plugins 644, 648 and 652. The source plugins 644, 648 and 652 are also different for each content provider 616. Thus, if the data have a plurality of content sources, each of the data sub-services 620, 624 and 628 can decide to enable or initiate different source plugins 644, 648 and/or 652. In addition, the content provider 616 can also provide information to a resource arbiter 656 and/or a thumbnail image cache manager 660. The resource arbiter 656 can communicate with a resource 664 outside the data service 432. Thus, the resource arbiter 656 can communicate with a cloud memory, a network memory, or other types of external memories in the resource 664. The information will then be provided to the data sub-services 620, 624 and 628 by the content provider module 616. Similarly, the thumbnail image cache manager contains thumbnail image information from one of the data sub-services 620, 624 and 628 and stores the information in a thumbnail image database 666. Moreover, the thumbnail image cache manager 660 can also extract or retrieve information from the thumbnail image database 666 to provide the information to one of the data sub-services 620, 624 and 628.

Figure 7:
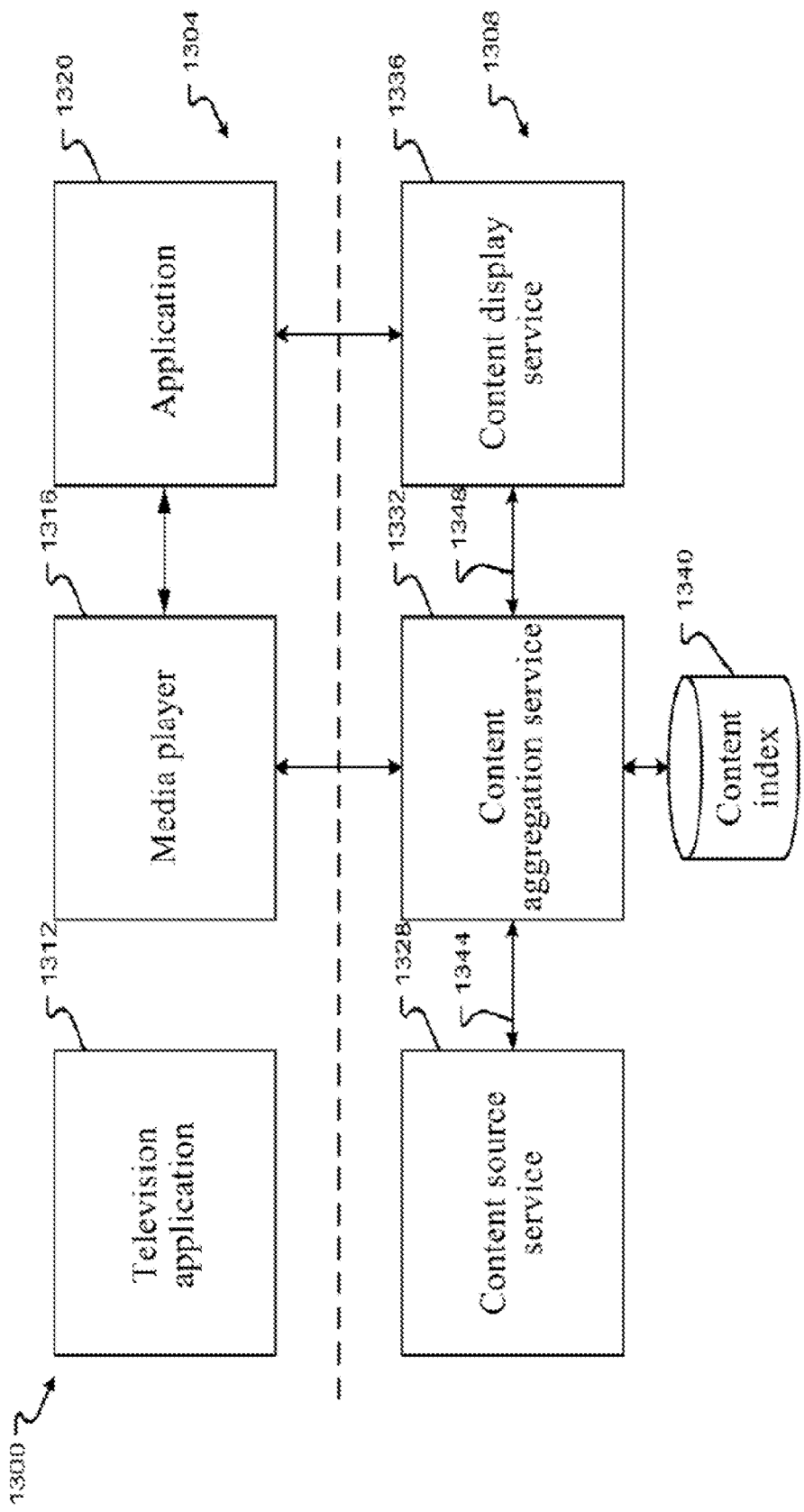
FIG. 7 illustrates a block diagram of a content real data service example.

FIG. 7 illustrates an exemplary content aggregation architecture 1300. The structure may include a user interface layer 1304 and a content aggregation layer 1308. The user interface layer 1304 may include a TV application 1312, a media player 1316, and an application 1320. The TV application 1312 allows audiences to watch channels received via appropriate transmission media (such as a cable, a satellite, and/or an Internet). The media player 1316 can allow the audiences to watch other types of media received via an appropriate transmission medium (such as an Internet). The application 1320 includes other TV-related (pre-installed) applications, such as content checking, content search, device checking and setup algorithms, and can also cooperate with the media player 1316 to provide information to the audiences.

The content source layer 1308, as a data service, includes a content source service 1328, a content aggregation service 1332 and a content presentation service 1336. The content source service 1328 manages a content source investigator, including a local and/or network file system, a digital network device manager (which discovers handheld or non-handheld devices (such as a digital media server, a player, a renderer, a controller, a printer, an uploader, a downloader, a network connection function and an interoperation unit) by a known technique such as multichannel broadcast universal plug-and-play or UPnP discovery technique), and retrieves, analyzes and encrypts device descriptors for each discovered device, informs content source services of the newly discovered devices, and provides information related to previously discovered devices, such as indexes, Internet protocol TV or IPTV, digital TV or DTV (including high definition and enhanced TVs), third-party services (services as quoted above) and applications (such as Android applications).

The content source investigator can track a content source which is generally configured as binary. The content source service 1328 can initiate the content source investigator and maintain an open and persistent communication channel. Communication includes inquiries or commands and response pairs. The content aggregation service 1332 manages a content metadata acquirer, such as a video, audio, and/or image metadata acquirer. The content presentation service 1336 provides a content indexing interface, such as an Android application interface and a digital device interface.

The content source service 1328 may transmit and receive communications 1344 to and from the content aggregation service 1332. The communication contains notifications on the latest and deleted digital devices and/or content and search inquiries and results. The content aggregation service 1332 can transmit and receive communications 1348 to and from the content presentation service 1336, including device and/or content search notifications, consultations and notifications of content of interest, and search inquiries and results.

During searching, particularly when a user is searching or browsing a content, the content presentation service 1336 can receive a user request from the user interface layer 1300, thereby turning on a socket and transmitting the request to the content aggregation service 1332. The content aggregation service 1332 firstly returns a result from a local database 1340. The local database 1340 contains an index or data model and indexed metadata. The content source service 1328 further issues search and browse requests for all content source investigators and other data management systems. The result will be transmitted to the content aggregation service 1332 to update the database 1340 to reflect a further search result, and an original content aggregation database search result and a data updated result reflecting more content source service search results are provided to the content presentation service 1336 through the previously turned on socket. The content presentation service 1336 then provides the results to one or more components of the user interface layer 1304 for presentation to the audiences. When the search phase is ended (e.g., the search phase is ended by a user or an operation of the user), the user interface layer 1304 will turn off the socket. As shown in the figure, the media can be provided directly from the content aggregation service 1332 to the media player 1316 for displaying to the user.

Figure 8:
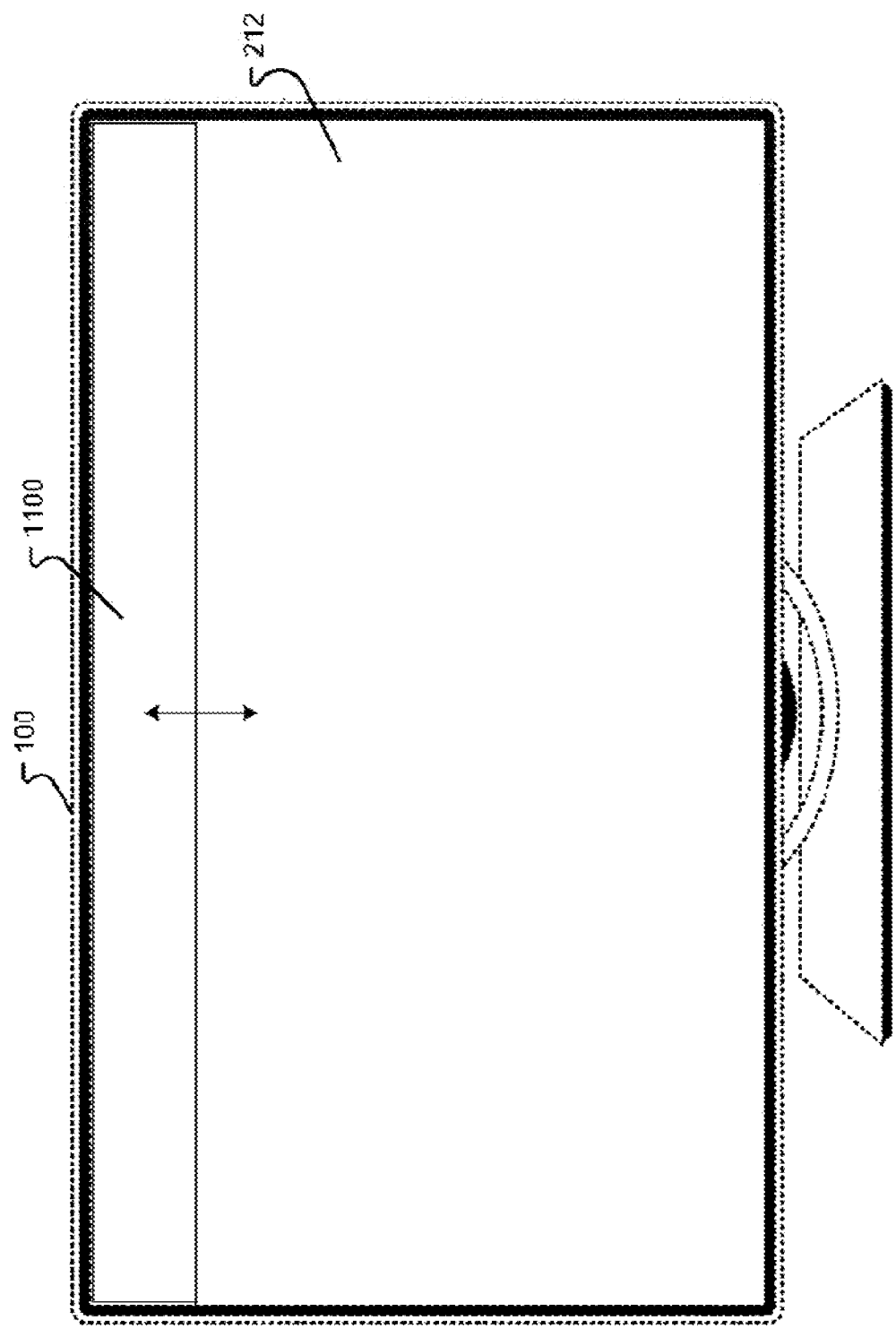
FIG. 8 illustrates a front view of a smart television screen example.

As shown in FIG. 8, the video content (such as TV programs, videos and TVs) is displayed on the front face of the screen 212. The window 1100 covers a portion of the screen 212, and the remaining portion displays the video content. The portion, which displays the video content, of the screen 212 may also be enabled to move up or down and/or be compressed as the height of the window 1100 changes. Furthermore, the window 1100 is superimposed on the video content, so that the height change of the window 1100 does not affect a display position of the video content.

The window 1100 may include one or more pieces of information, such as a panel navigation bar related to a currently-displayed image and/or content, details (e.g., the title, the date/time, an audio/video indicator, a rating and the style), a hot key bar, and a browse request and/or search request related information input bar.

In some examples, the window 1100 contains content-related appropriate information (such as name, duration and/or remaining content browsing time), setup information, TV or system control information, application (activation)

icons (e.g., pre-installed and/or downloaded applications), the application center, the media center, a web browser and input source information.

Figure 9:
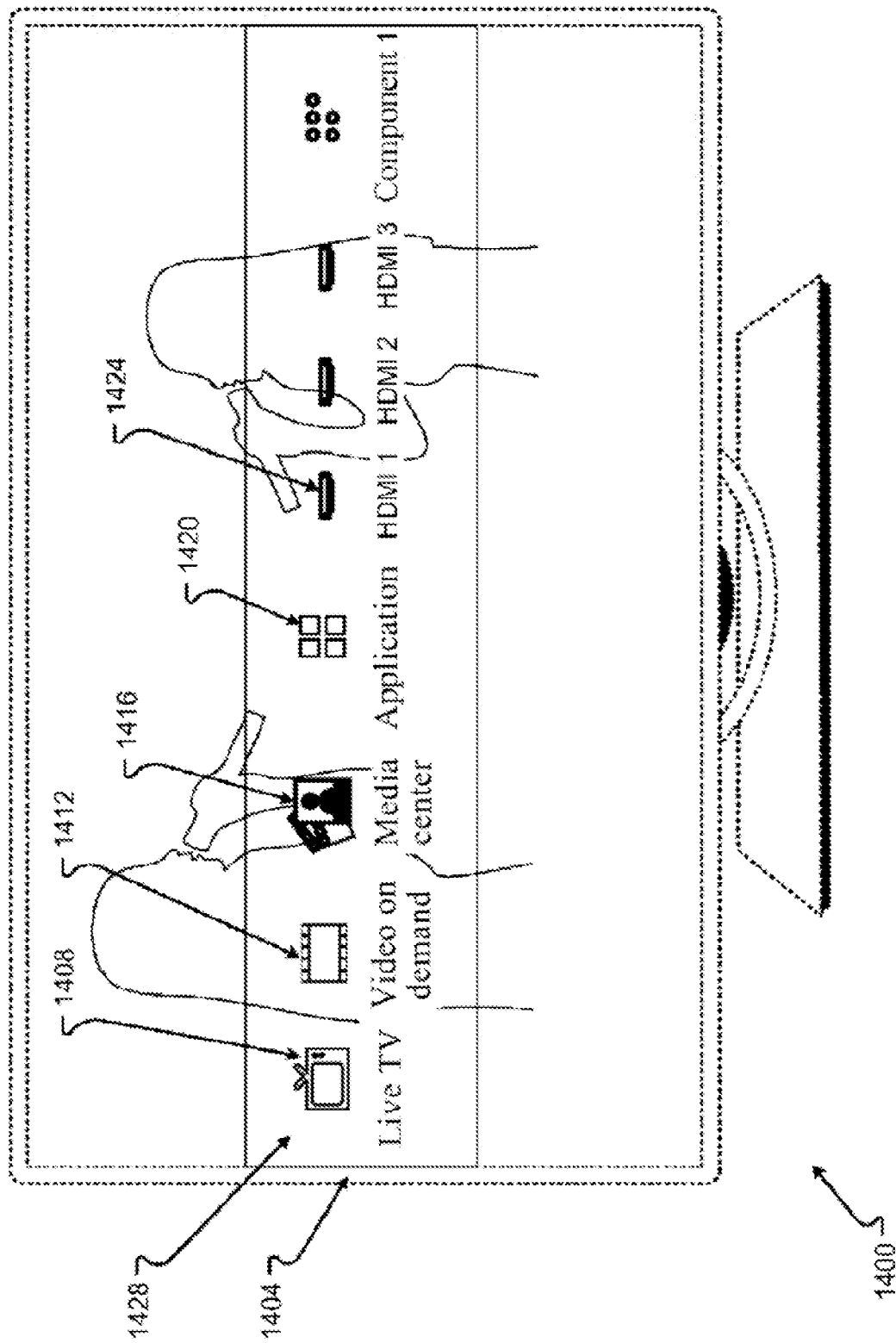
FIG. 9 illustrates an audio-visual image example of a user interface for a content/silo selector.
Figure 10:
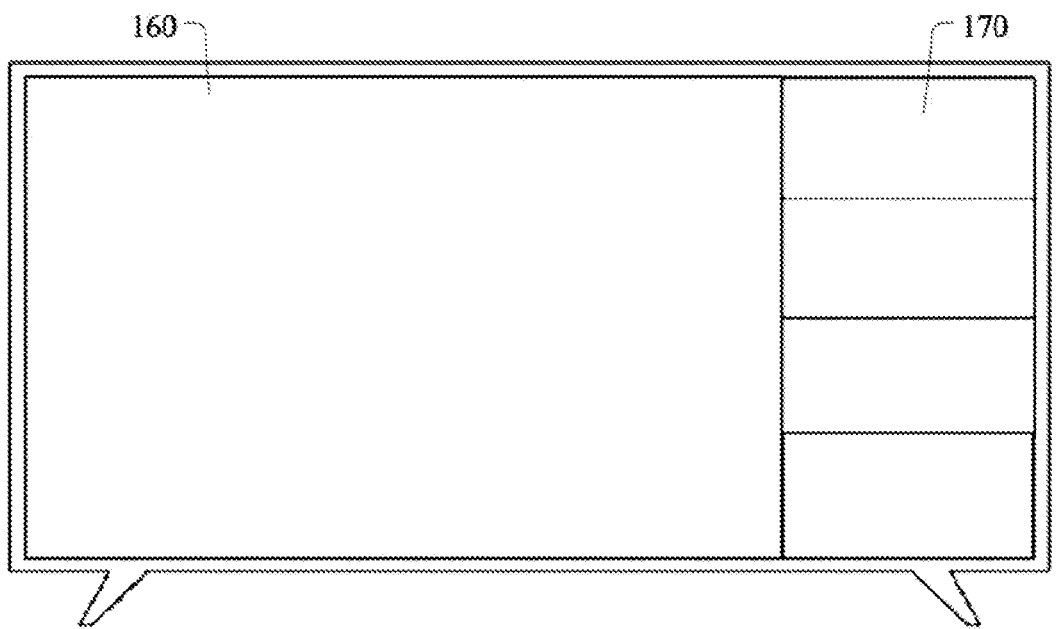
FIG. 10 illustrates a Graphical User Interface (GUI) of an example I for selecting and triggering a screen shot.

FIG. 9 is an audio-visual image example of a user interface for a content/silo selector. The audio-visual image 1400 includes a content source selector 1404. The content source selector 1404 includes icons 1428 of one or more silos 1408 to 1424.

The content source selector 1404 may include two or more icons 1408 to 1424 that represent different silos. For example, the icons 1408 to 1420 represent different content application silos. The different content application silos may include a live TV silo represented by the icon 1408. The live TV silo is a logical representation form of a broadcast TV signal application that provides TV content to a user of the TV 100. A video on demand (VOD) silo is represented by the icon 1412. The VOD silo provides a path to access videos that can be selected and available to the user on demand or other types of media. The media center silo is represented by the icon 1416, and it includes an application that provides images and/or films developed or stored by the user. The media center provides a way for the user to store their media by using the smart TV 100. The application silo is represented by the icon 1420, and it provides games and other user applications that can be accessed and used on the TV. The input source silo 1424 can be any type of device that is connected to the TV 100 via an input port or other electrical connection modes, or other storage mechanisms such as other input interfaces, e.g. an HDMI, or an input interface collection silo.

Embodiment I

FIGS. 10 to 19 illustrate an exemplary graphical user interface (GUI) I when a user triggers a screen shot operation. When video is being played on the display, after a screen shot instruction is triggered by clicking the remote controller, touching the screen or making a gesture and the like, a GUI is presented on the display, and the GUI includes a currently-played content display layer 160 and a screen shot content display layer 170. The currently-played content display layer 160 continues playing video content, and the screen shot content display layer 170 includes a set of option bar, and the option bars include a screen shot display bar for displaying a thumbnail of the screen shot, a recommended content display bar for displaying recommended contents related to the items identified in the screen shot, and/or a user control instruction display bar for presenting a input interface associated with the screen shot for receiving a user's selection input.

The screen shot content display layer 170 is displayed in a screen edge region, such as the right side or the lower side, and may be superimposed on the video content being played. The currently-played content display layer 160 may only display a portion, which is not covered by the screen shot content display layer 170, of the video content, or the video content is moved up or left and displayed in the currently-played content display layer 160 in a compressed manner.

In some examples, the screen shot content display layer 170 is displayed by default at the right edge of the display, and can be moved to the left edge, be moved to a lower side, or change a layout direction based on a user's selection. In some examples, the user can also set it at any available position by system configuration.

In some examples, no matter what content is displaying on the screen, a screen shot operation can always be performed to acquire an image which is identical with the content displayed on the screen. Alternatively, the screen shot operation may be performed only when a picture or video is displayed on the screen. Otherwise, the screen shot operation cannot be performed. A difference between these two screen shot operations in that the former screen shot is done after the source content and the On Screen Display (OSD) are synthesized, but the later screen shot is done before the source content and the On Screen Display (OSD) are synthesized, that is to say, just capturing the image of the content source.

Figure 11:
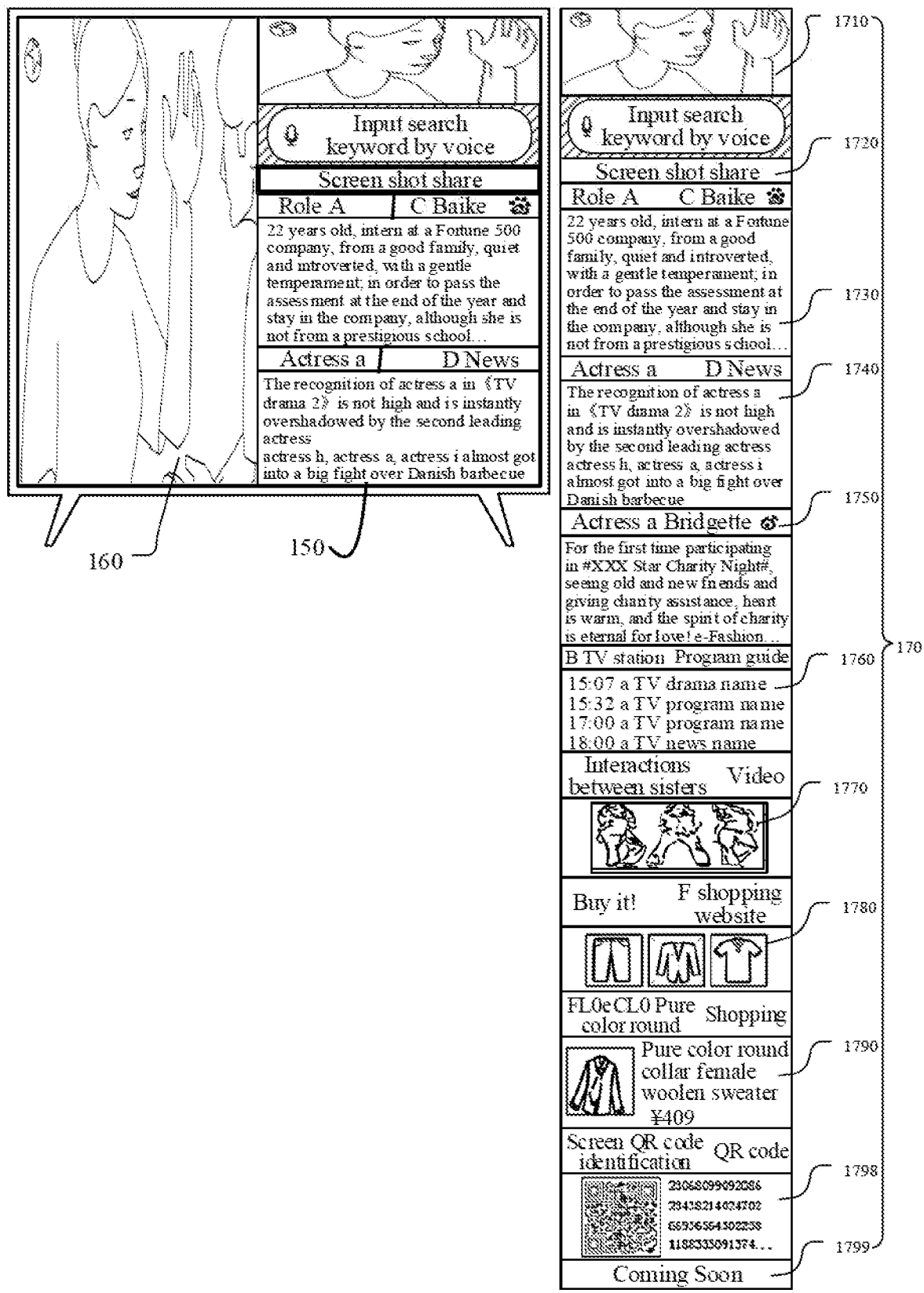
FIG. 11 illustrates another example GUI for selecting and triggering a screen shot.

FIG. 11 illustrates another exemplary GUI when a user triggers a screen shot operation. In the illustrated embodiment, the GUI includes a currently-played content display layer 160 and a screen shot content display layer 170.

As shown in FIG. 11, the screen shot display bar 1710 includes a thumbnail of the current screen shot, and related control instruction display bars include a "Screen shot share" 1720 for providing indications for a user to share the thumbnail of the screen shot in the screen shot display bar 1710 accordingly, and a prompt bar "Input a search keyword by voice" for instructing a user to input a keyword for voice search.

A plurality of recommended content display bars 1730 to 1790 are used to display one or more of the following options: keywords identified or determined from the thumbnail of the screen shots, other content profiles related to the keywords, sources or types of the content profiles.

In an example, when the currently-played content display layer 160 is playing a TV drama 1, a screen shot instruction from a user is received, and a screen shot of a currently-played scene is successfully captured, so that the screen shot display bar 1710 presents a thumbnail of the captured screen shot. Furthermore, keywords related to the thumbnail are acquired by performing identification processing on the thumbnail, such as a character keyword "Role A", a keyword "Actress a" portraying "Role A", a keyword "B TV station" obtained by identifying the TV station logo of the "B TV station", a keyword "interactions between sisters", obtained by identifying a drama's setting, and a keyword "Pure color round collar female woolen sweater" obtained by identifying the clothing of the characters in the screen shot. It is noted that the above-mentioned image identification process can be performed locally or by a third-party server to acquire those keywords.

According to the above keywords, the recommended content display bars 1730 to 1790 are respectively used to display the keywords, such as "Role A", "Actress a", "B TV station", "interactions between sisters" and "Pure color round collar female woolen sweater", in the above example, content profiles related to these identified keywords, and the sources or types of the content profiles. For example, if the keyword "Role A" is displayed in the recommended content display bar 1730, the content profile includes a webpage recommended content for introducing "Role A" from a C website, and the icon of the "C" website represents the source of the recommended content, which is specifically as follows:

the keyword "Actress a" is displayed in the recommended content display bar 1740, and the content profiles includes a webpage recommended content for introducing "Actress a"" from "D News".

The website icon of the "D News" represents the source of the recommended content. For another example, in the recommended content display bar 1750, the content profile is from a webpage recommended content of the E Weibo.

If the keyword "B TV station" is displayed in the recommended content display bar 1760, the content profile includes recommended information of a program preview list like "15:07 a TV drama name . . . ", and the word "Program guide" represents the type of the recommended information.

If the keyword "interactions between sisters" is displayed in the recommended content display bar 1770, the content profiles includes recommended information of stills of a TV drama named after "interactions between sisters", and the word "Video" represents the type of the recommended information.

The recommended content display bar 1780 is configured to display a keyword "Buy It!", and the content profile includes recommended photos of similar costumes, and the website icon "F Online shopping website" represents the source of the recommended photos.

The keyword "Pure color round collar female woolen sweater" is displayed in the recommended content display bar 1790, and the content profile includes recommended photos, price information and the like of similar costumes, and the website icon "Shopping" represents the source of the recommended photos.

The option bars in the screen shot content display layer in FIG. 11 are each associated with a service or application corresponding to a silo. For example, the recommended content display bar and/or the associated control instruction display bar are each correspondingly associated with a related service or application. When the user selects an option bar, the corresponding service or application of the option bar is activated in response to the user selection. For another example, the recommended content display bars 1730 to 1759 and 1780 to 1790 are associated with applications of the browser. The recommended content display bar 1760 is associated with the live TV service application of the silo "Live TV"; the recommended content display bar 1770 is associated with the video on demand application of the silo "Video on demand"; the "Screen shot share" display bar 1720 is associated with a share function application; and the "Input a search keyword by voice" display bar is associated with a voice recognition application.

The screen shot content display layer 170 provides access interfaces for users without interfering the currently-played content display layer 160. That is, when the screen shot content display layer 170 is displayed, the user can still watch the content in the currently-played content display layer 160. For example, the screen shot content display layer 170 may be semitransparent to show (namely the user can still watch) the content displayed in the currently-played content display layer 160. The screen shot content display layer 170 allows the user to quickly enter a core function of the smart TV 100, so that the user can see the content activated by triggering the screen shot in the currently-played content display layer 160 all the time. Furthermore, the screen shot content display layer 170 can provide a consistent user experience of all the applications and contain important context content.

The plurality of option bars in the screen shot content display layer 170 can be sorted based on functions and content, including: webpage text content recommendations, such as: C Baike (or wikipedia) 1730, D News 1740, E Weibo (or blog) 1750, and Video on demand recommendation 1770; and shopping webpage or application recommendations, such as: F Online shopping 1780, Built-in application shopping 1790 and screen QR code 1798, and New function introduction 1799 displayed on the bottommost layer. The screen shot content display layer 170 can be represented by an icon, a text or shortcut, respectively, to describe content found from different media applications.

The search content includes texts that include, but not limited to, names (if the search is for identified items brands or similar brands thereof are displayed), titles and main bodies.

In some examples, the user can set the number of lines of a body through the system configuration, such as: not more than four lines. The user can select the option bars in the list to navigate to corresponding content.

The position selected or pre-selected by a user is displayed in a focus frame 150 in the screen shot content display layer 170. For example, the focus frame 150 contains a square frame located around the screen shot. Although the square frame is used in the description, other methods or configurations can also be used to select and/or identify the icons. For example, in addition to the square frame, the focus frame 150 may also adjust the icons of 1720 and the like and the backgrounds of the texts to make the colors, shadows or hues different. Alternatively or additionally, the focus frame 150 may contain magnified icons or texts.

In some examples, the content of the plurality of option bars can be displayed on basis of the user selection in a moving (such as: rolling or sliding) manner. Each option corresponds to a searched or recommended content source, and the type of the content source includes webpage, video, TV program, shopping or QR code.

The content in the option bars is presented as a scrolling or sliding cyclic list, so that the user can search content of interest conveniently, such as: browsing forward or backward. When the last option bar has been browsed through, the page either keeps still or automatically skips to the first option bar.

For the GUI which is presented in response to a screen shot instruction from a user, search results include webpage applications, video applications, TV program applications, shopping applications and the like, and specifically, the search result comprises one or more of the recommended items mentioned above. The types of recommended items can also be configured by a user. For example, the user can decide which type or types of recommended items to display.

Exemplarily, the webpage content source recommendations are generated based on search of a third-party, and a webpage content recommendation related to the screen shot content is displayed by identifying the screen shot content, such as: one or more of following sources: BD Baike 1730, News&Gossip 1740 and Weibo 1750.

In the TV program content recommendations, a third-party application performs image identification on a TV station logo in a video screen shot to display the program guide 1760 of a TV source under this TV station logo.

The video content recommendation is presented in the video recommended content option bar 1770, and a video recommendation related to the screen shot content may be displayed by the third-party application by identifying the screen shot content. A video that is ultimately found for presentation may be a TV drama, a movie or a short webpage video associated with the video content or a currently-played content.

In the shopping content recommendation, the third-party application identifies the screen shot content to display online shopping information of commodities related to the screen shot content. The online shopping information includes one or more of the following items: an F shopping application, a built-in shopping application (such as Juxianggou, amazon, or the like), or a TV shopping channel, and the like.

For QR code displaying, the third-party application generates a corresponding QR code for the screen shot content, and QR code information and a thumbnail of the screen shot are synchronously uploaded to the third-party server, so that the user can identify the QR code by scanning, download pictures from the third-party server to the client, or perform other user operations.

The present disclosure will take an example of playing the TV drama 1 to describe the GUI displayed by the user operation of triggering the screen shot in detail below.

For example, when the video content of "Role A" in the drama is played, the screen shot operation is triggered by clicking the remote controller or touching the screen or making a gesture, thus presenting the screen shot content to the GUI of the display device. The currently-played content display layer 160 still plays the content of the next moment of the video, and a plurality of option bar lists appear in the screen shot content display layer 170 on the right.

Then, the first option bar displays a thumbnail of the screen shot 1710.

The second option bar displays the control instruction display bar 1720 "Share screen shot".

The third option bar is a search option bar 1730 for displaying "C Baike"-related content provided by the third-party application. This option bar is divided into two bars. "Role A" is displayed on the left of the first bar, and the LOGO of the search source "C Baike" is displayed on the right. Search content (such as basic introduction, personality and temperament and current living conditions) is displayed in the second bar. The option bar may not display full searched content. For example, the body includes not more than four lines, and the remaining portions are hidden.

The fourth option bar is a News & Gossip option bar 1740 for displaying D News-related content provided by the third-party application. The option bar is divided into two bars. The first bar displays "Actress a" on the left, and displays the LOGO of the search source "D News" on the right. The second bar displays entries of search content.

The fifth option bar is a TV program option bar 1760 for displaying "B TV station"-related content, which is searched by the third-party application by identifying the TV station logo of the video play source or the content display layer. This option bar is divided into two bars. The first bar displays "B TV station" on the left, and displays the search source "Program guide" on the right. The second bar displays the details of the program guide, including, but not limited to, a time list and titles of programs played at corresponding time points.

The sixth option bar is a video content option bar 1770 for displaying "Video"-related content in which this role involves, which is searched by the third-party application by identifying a role in the played video. This option bar is divided into two bars. The first bar displays another popular video in which this role participates on the left, and displays the search source "Video" on the right. The second bar displays video pictures.

The seventh option bar is a shopping option bar 1780 for displaying "F online shopping website"-related content, which is searched by the third-party application by identifying clothes and jewels of the role in the video and same or similar to the clothes and jewels of the character. This option bar is divided into two bars. The first bar displays "Buy It" on the left, and displays the LOGO of the search source "F online shopping website" on the right. The second bar displays commodity pictures.

The eighth option bar is a built-in shopping application option bar 1790 for searching content which are the same or similar to the clothes and jewels of the role in the video in related option bars based on the shopping application. This option bar is divided into two bars. The first bar displays a commodity name which is the same or similar to the clothes and jewels of the role on the left, and displays the search source "Juxianggou" on the right side. The second bar displays a commodity cover picture on the left, and displays the commodity name and the commodity price on the right.

The ninth option bar is a screen QR code option bar 1798 provided by the third-party application and used for converting a screen shot into a screen QR code. This option bar is divided into two bars. The first bar displays "Identify screen QR code" on the left, and displays the search source "QR code". The second bar displays a QR code screen shot.

The tenth option bar is a new function introduction option bar 1799 "Coming Soon", which indicates a new function is coming soon.

As mentioned above, the content displayed in the option bars on the screen shot content display layer 170 depend on the content acquired from the screen shot. The plurality of option bars also provide customized information of the respective applications. The screen shot content display layer 170 is formed by combining application option bars, such as: one or more function option bars and one or more content option bars. There is one function option bar, namely a function indication bar, such as: Screen shot share 1720 and Input a search keyword by voice. There are at least two content option bars. The first bar is a navigation bar configured to display an icon of an application and an application name, and the user can select to activate the application, such as C Baike, D News and E Weibo. The second bar is a content region that displays related recommended content found in the above application. The content region can be updated.

Further, in some examples, as shown in FIG. 12, the content displayed in the option bars of the screen shot content display layer 170 includes at least one type of the following items: plain text, images and both text and image.

For example, for option bars in plain text, each text option bar can be divided into an upper bar and a lower bar. The name 1801 of the search source is displayed on the right of the first bar, such as: C Baike, D News, E Weibo and F shopping, and the title, theme or search keyword 1802 of a search result is displayed on the left of the first bar. The second bar displays a searched body 1803. The body is generally in a text form, and includes not more than four lines. The exceeding part is expressed by ellipsis at the end of the fourth line. The user can set the number of lines, font, color and the size of the body text in the system. This display mode is more suitable for C Baike presentation and E Weibo presentation.

For another example, for option bars in images, the option bar can be divided into an upper bar and a lower bar. The name 1801 of the search source is displayed on the right of the first bar, such as: C Baike, D News, E Weibo and F shopping, and the title, theme or keyword 1802 of a search result is displayed on the left of the first bar. The second bar displays not more than three found pictures 1811.

For another example, for option bars in both image and text, the option bar can be divided into an upper bar and a lower bar. The name 1801 of the search source is displayed on the right of the first bar, such as: C Baike, D News, E Weibo and F shopping, and the title, theme or keyword 1802 of a search result is displayed on the left of the first bar. The second bar displays searched pictures and picture introductions 1821. If it is displayed that the entry is from F shopping, F shopping is displayed on the right side of the first bar, and the title of F shopping is displayed on the left side; and a picture of a F shopping commodity is displayed on the left of the second bar, and basic information (such as size, color and price) of the commodity is displayed on the right side of the second bar.

In some examples, the option bars of the screen shot content display layer 170 also display function option bars. As shown in FIG. 12, the function option bar card is half the height of the content option bar, is plain text by default, has a size consistent with the size of the title of the content option bar (such as Screen shot share 1831 and New function introduction icon "Coming Soon" 1832), and can also be freely designed (such as Input a search keyword by voice).

As previously described, the GUI can present a display object with an option bar. The user selects the option bar to browse various types of search content, and when the option bar is selected through the remote controller, the gesture or the touch on the screen, information of the selected information type in the current option bar is presented to the user. For example, when selected, the option bar makes a list of a description, a summary and a related text or a picture descriptor. The content profile is displayed in the content display layer, and the user can move the focus frame of the option bar onto an icon or a user interface pattern through the remote controller, the gesture or the touch on the screen. When moving the focus frame, the user can select the content corresponding to the option bar through the remote controller, gesture or touch on the screen again, and will read more detailed content associated therewith, as shown in FIGS. 15A to 15D.

As shown in FIG. 13, when the user moves the focus frame to select the screen shot display bar 1710, the screen shot is displayed on the screen shot content display layer 170, and three continuously captured shot thumbnails spread and extend from right to left to the currently-played content display layer 160 for user selection, and the user can also pre-configure the number of continuously captured thumbnail images. On one hand, the user can re-select one of the above multiple screen shot pictures for the search operation again, so that the user can accurately obtain a desired image during the screen shot operation. On the other hand, the user can watch, access, and/or post social content related to the selected screen shot from his/her social network.

When the user selects the "Screen shot share" option bar 1720, the screen shot can be transmitted to other clients through "intranet" and "external network", such as: a mobile phone and a tablet computer.

The user installs an application associated with the smart TV 100 on another client, for example, the Hisense assistant APP is downloaded and installed on another client, and then the "intranet" performs transmission through a network link between the client and the smart TV. At this time, a detail page of screen shot on the client provides prompts such as "if your phone and the TV are in the same network, you can directly open the application, such as a TV micro assistant associated with the smart TV" for the user to obtain the screen shot. If the application of the mobile phone is running in the background, the mobile will pop a prompt for the user upon receiving a push notification from the TV. If the application is not running in the background, the user needs to open the application. If the TV is connected, the mobile phone can request for the screen shot information on its own initiative and determines whether this information "has been read" by the user. If NO, a prompt is popped out to the user.

Figure 14:
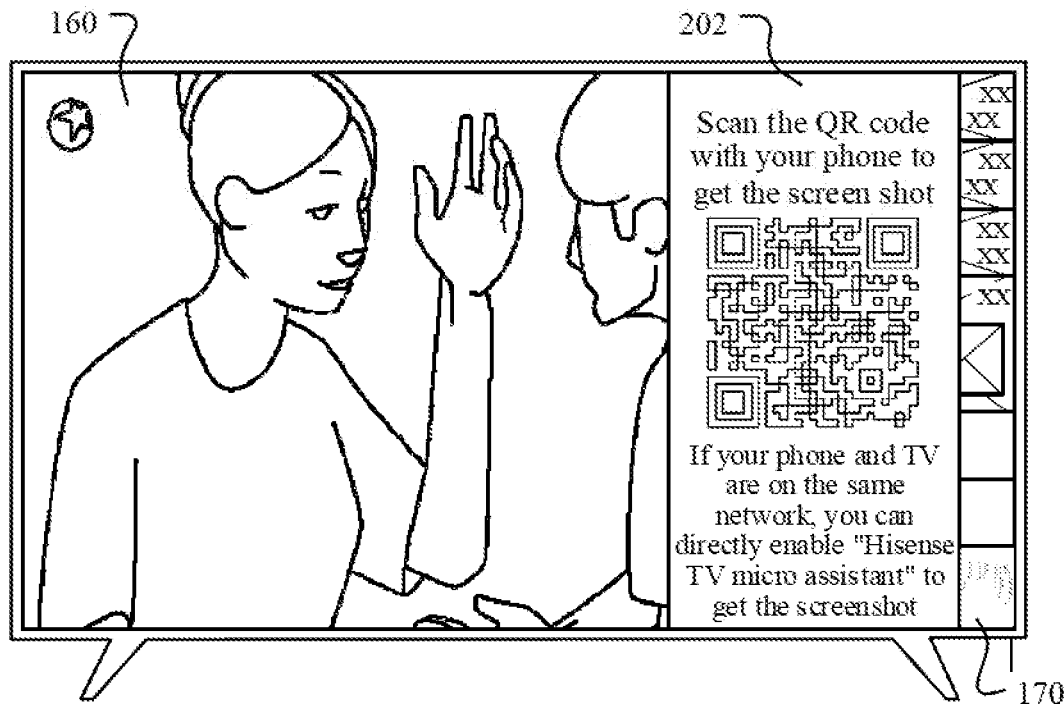
FIG. 14 illustrates an example GUI for selecting a "Screen shot share" option bar under an external network.

By the "external network", images are uploaded to a server, and a user obtains a screen shot by opening a webpage with this screen shot. The opening of the webpage can be realized by scanning a corresponding QR code. FIG. 14 illustrates an exemplary GUI for selecting the "Screen shot share" option bar through the external network. When the user selects the "Screen shot share" option bar, the "external network" uploads the images to the server, and the GUI includes the currently-played content display layer 160, the screen shot content display layer 170, and a QR code window 202 overlaying on the option bar. The QR code window displays a QR code of webpage where the screen shots store, and the user obtains the screen shots by opening the webpage with the QR code information. If the client is a mobile phone running Android system, the user can directly align a scanning region with the QR code in the display layer for scanning to download the images. If it is a mobile phone running iOS system, the scanning region is aligned with the display layer of the TV and a long press is made, thereby realizing the purpose of downloading the images.

For the window information 202, the user will be required to connect any type of device to the TV 100 or a TV 100-associated network, so as to extract stored or established media such as images and videos to the TV 100. Once the scanning is done, the mobile phone can store the content displayed through the media center silo.

Figure 15A:
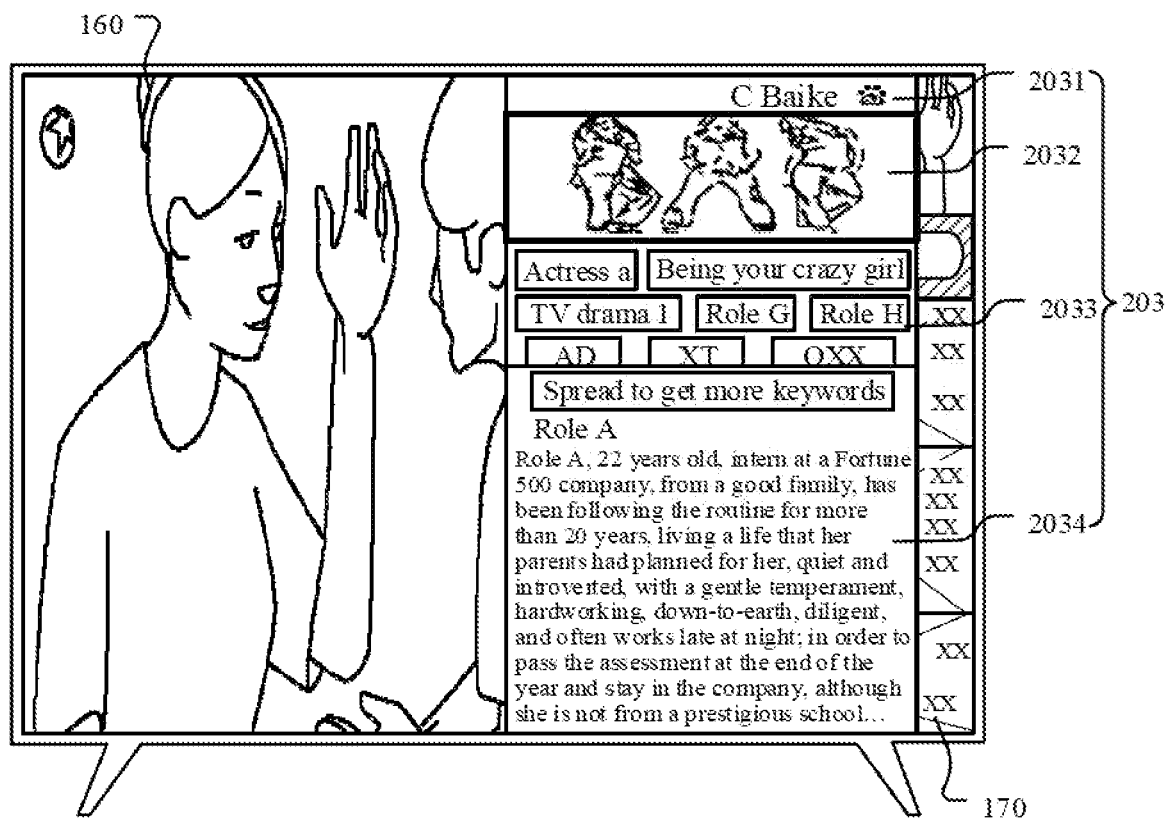
FIG. 15A illustrates an example GUI for selecting a "Baidu Baike" option bar.
Figure 15B:
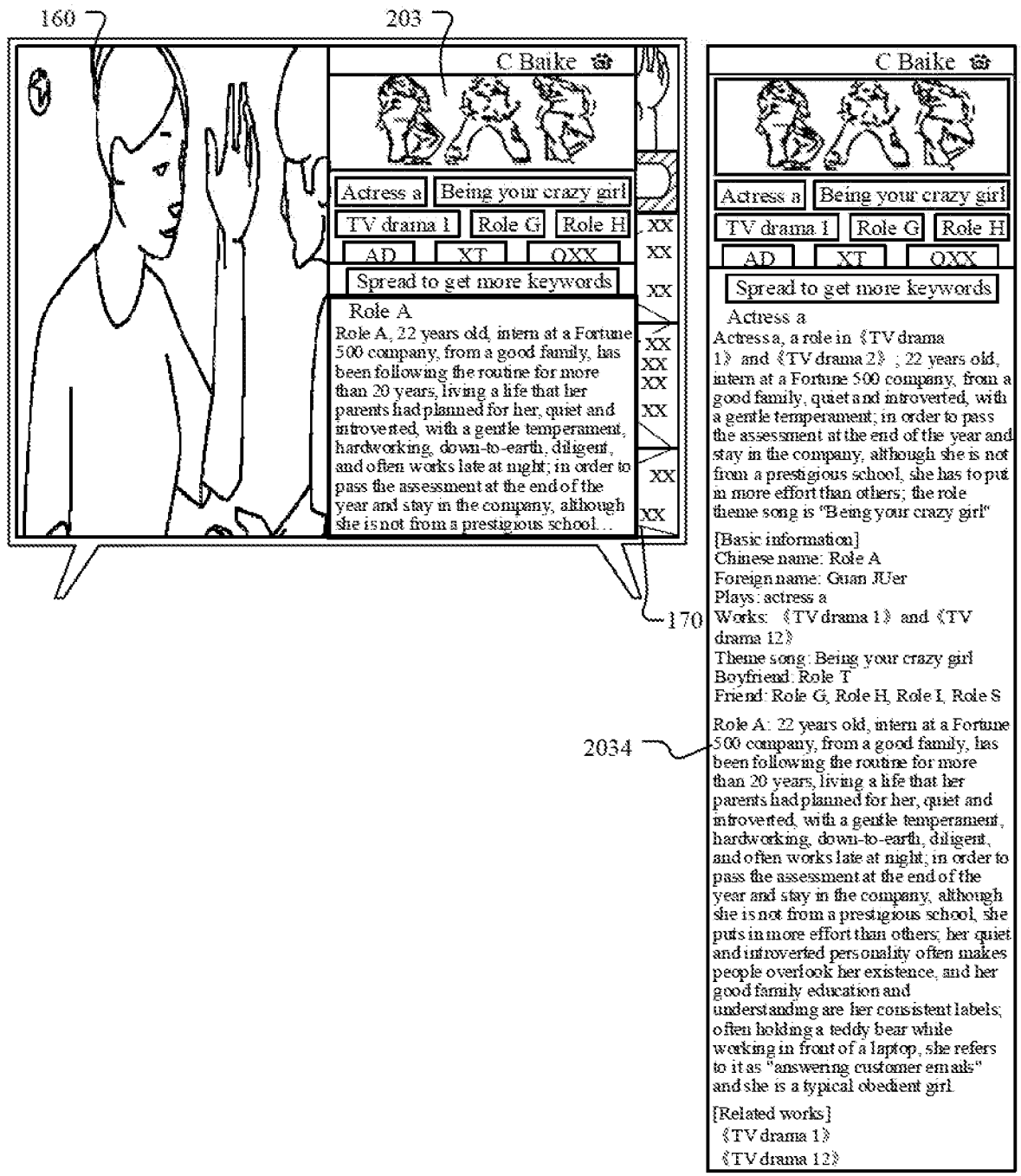
FIG. 15B illustrates an example GUI for selecting a description bar under the "Baidu Baike" option bar.

FIG. 15A illustrates an example GUI for selecting the "C Baike" option bar by the user. In the illustrated embodiment, a C Baike information window 203 is displayed on the option bars in the screen shot content display layer 170. The C Baike information window 203 overlays the screen shot content display layer 170, such as: a Logo bar 2031, an album bar 2032, an associated word bar 2033 and an entry detail bar 2034. The Logo bar 2031 displays the C Baike Logo, and the album bar 2032 displays screen shots, item pictures and albums. The associated word bar 2033 displays a tag or a meaning item, and content not completely displayed in the detail bar 2034 at the bottom of the screen are replaced with an ellipsis. When the user selects the detail bar 2034, a text introduction for introducing the screen shot and related information is displayed. As shown in FIG. 15B, the user can browse content of interest in a sliding manner by clicking the remote controller, making a gesture or touching the screen.

Displaying the associated word bar 2033 during playing of the video of the TV drama 1 is taken as an example, such as: TV drama 1, role G, role H, role I, role J and role K. The entry detail bar 2034 includes an overview, basic information and the body of the entry. The user obtains relatively comprehensive introduction information from a screen shot page to learn more related resources.

Figure 15C:
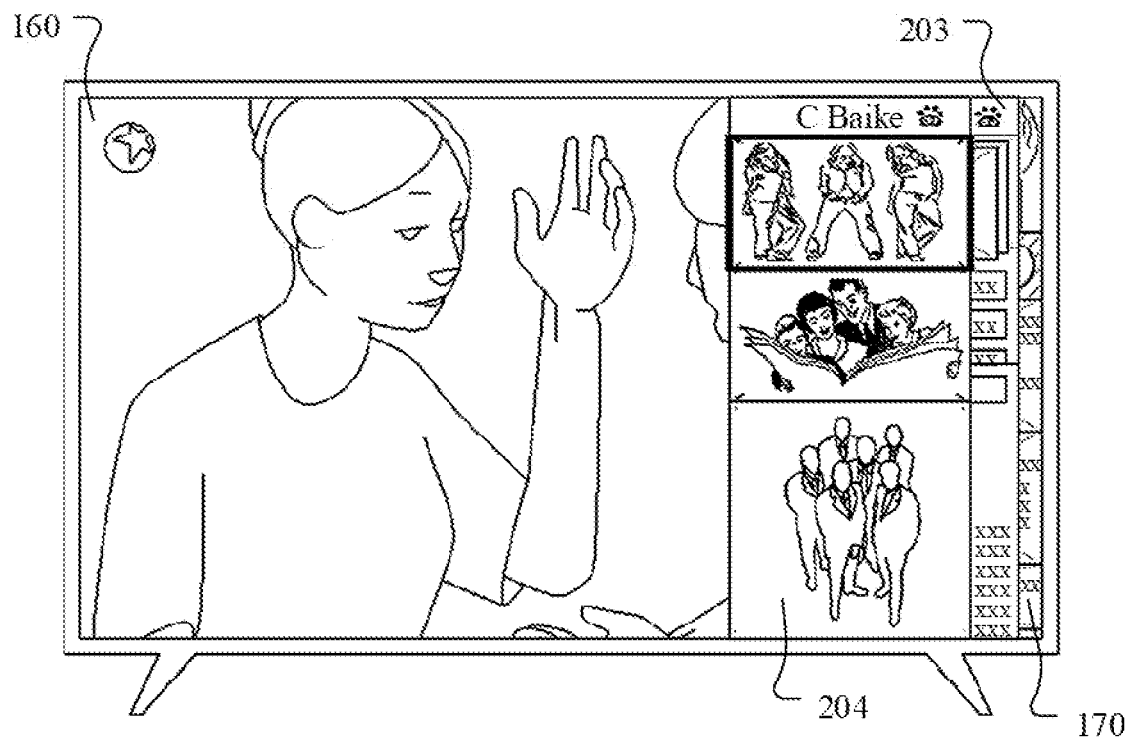
FIG. 15C illustrates an example GUI for selecting an album bar under the "Baidu Baike" option bar.
Figure 15D:
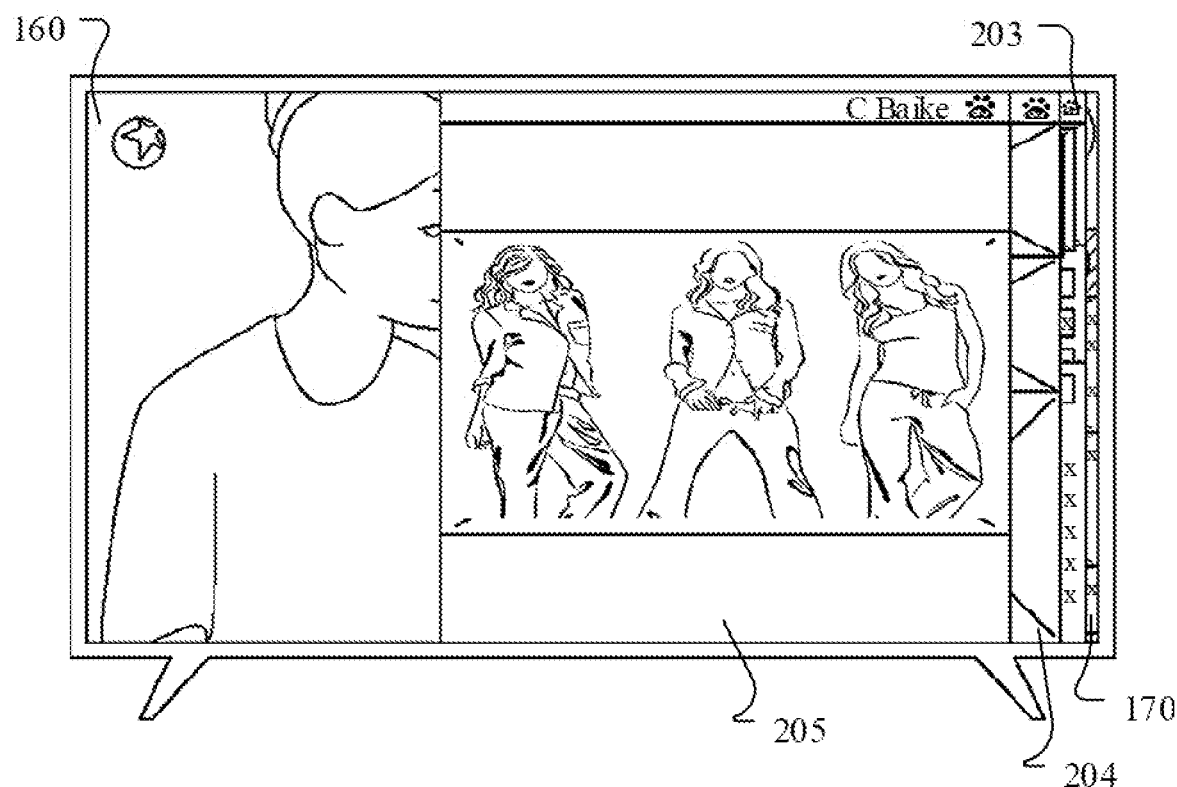
FIG. 15D illustrates an example GUI for selecting a picture in the album bar under the "Baidu Baike" option bar.

FIG. 15C illustrates a scenario where a user moves the focus frame to the album bar 2032, and selects the album bar 2032, and a new image list window 204 overlays on the C Baike information window 203 for displaying related image lists, and the focus frame can be moved up and down in the image list window 204 to select pictures that you want to view further. Once the user focuses on any of the pictures in the picture list window 204, another GUI for interacting with the selected picture is provided to the user, and an image window 205 covers part of the image list window 204 and displays a single image. If the image is displayed in its entirety, it is viewed as a full-screen square, as described with reference to FIG. 15D.

In some embodiments, in a scenario where content in Baike is not complete, the content may not include any one or more of the album bar, the keyword bar, the Logo bar and the entry detail bar. For example, no albums and keywords are displayed, and only the entry detail bar is displayed, or no related word bar is displayed, and the album bar and the entry detail bar are displayed.

Figure 16A:
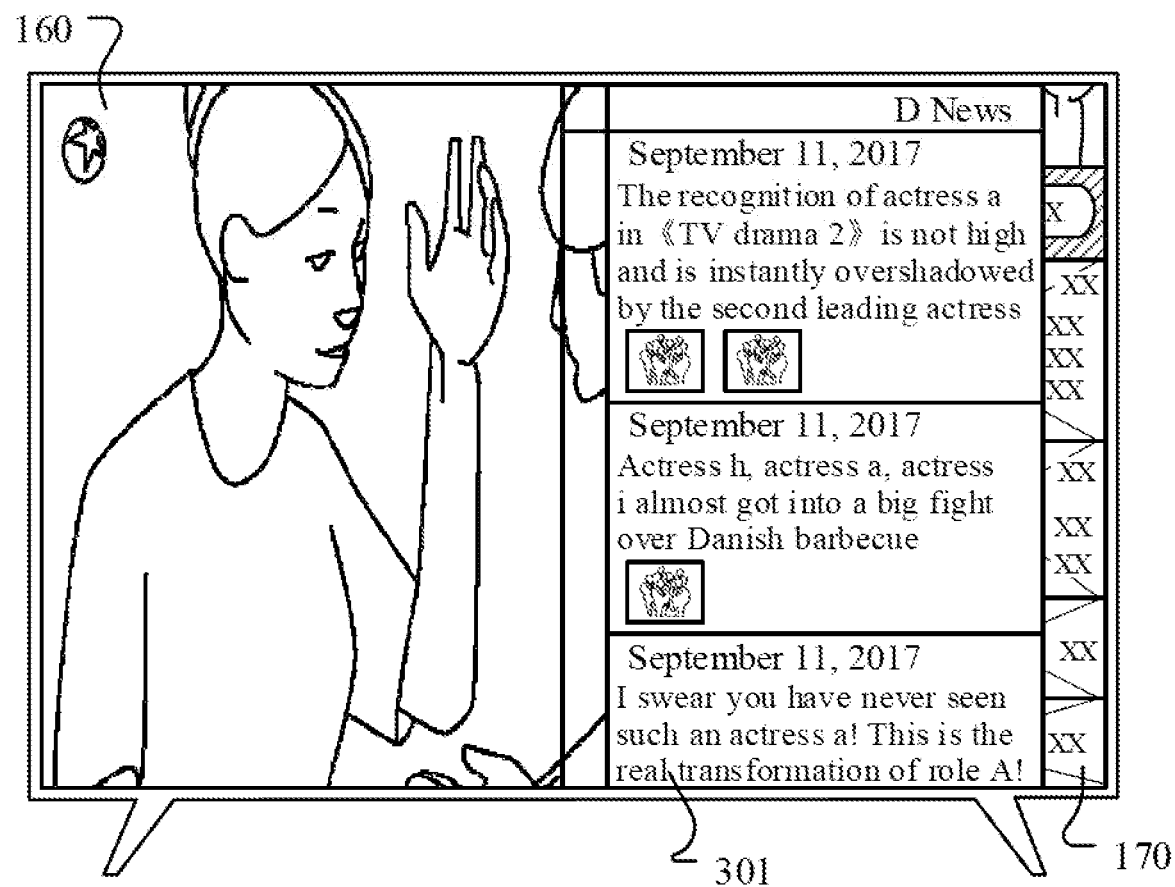
FIG. 16A illustrates an example GUI for selecting a "News" option bar.

FIG. 16A illustrates a GUI example where the news option bar 1740 is selected by the user. In the example, the GUI comprises a news event list window 301, which floats above the screen shot content display layer 170. Furthermore, the news event list includes a plurality of news event option bars, each of which describes a news event, including a date, a title (for example: the title is set to include no more than five lines, portions beyond the five lines of the title are hidden, and " . . . " is used at the end of the fifth line to indicate that the title is hidden), and a picture (for example: you can select to display or not display a picture in setting configuration, and if you select to display a picture, three pictures can be displayed in the form of thumbnail at most).

Figure 16B:
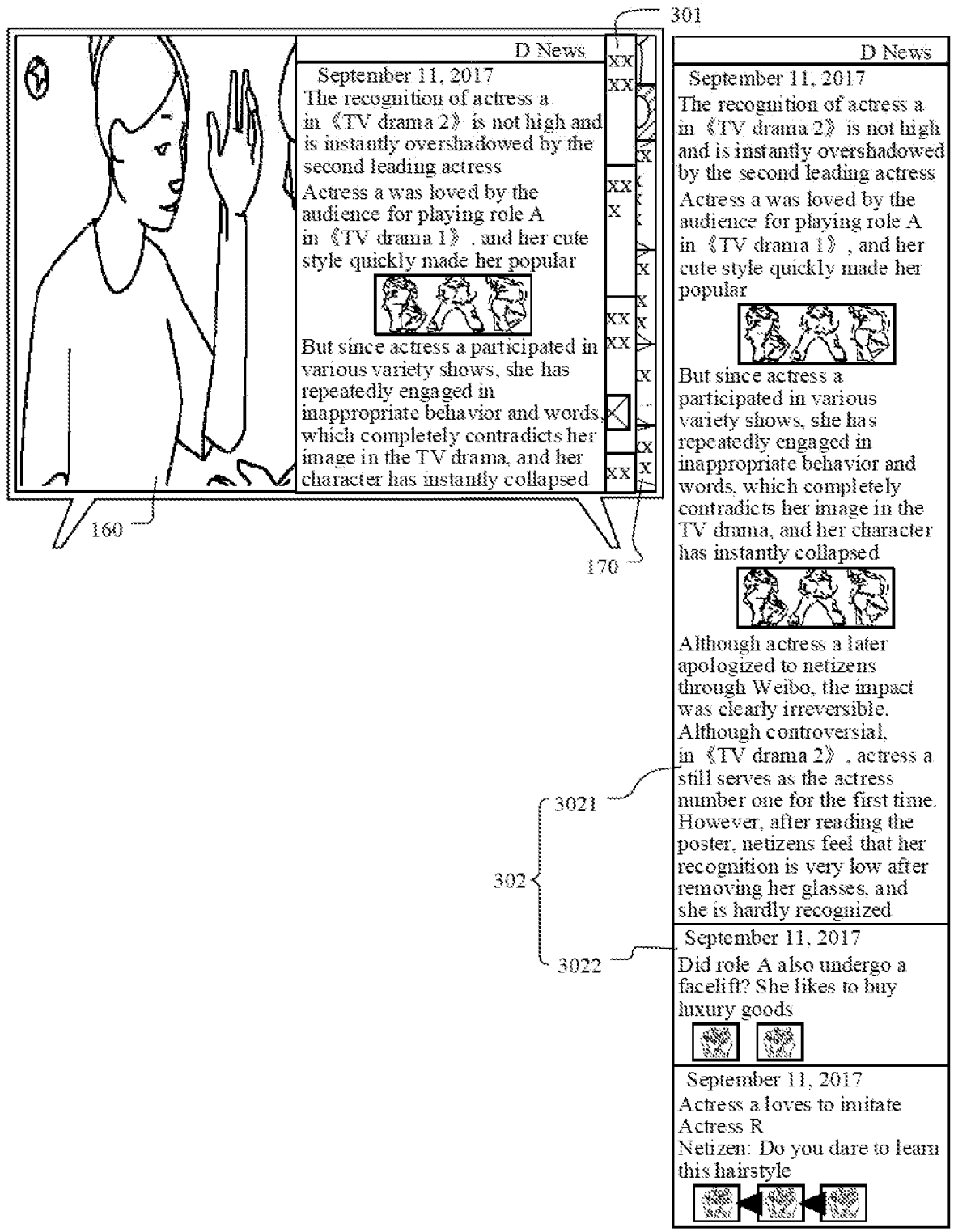
FIG. 16B illustrates an example GUI for selecting a news event confirm option bar under the "News" option bar.

FIG. 16B illustrates a scenario where a user selects a specific news event option bar, namely the news event window 302, and then the news event window 302 floats above the news event list window 301 in response to the user's selection. Here, news events selected by the news event option bar 3021 spread fully, including the titles, post date, texts and pictures of all the news records, while the unselected news event option bars 3022 still only displays the title and part of the pictures. The not displayed parts can be viewed by scrolling the list.

Figure 17A:
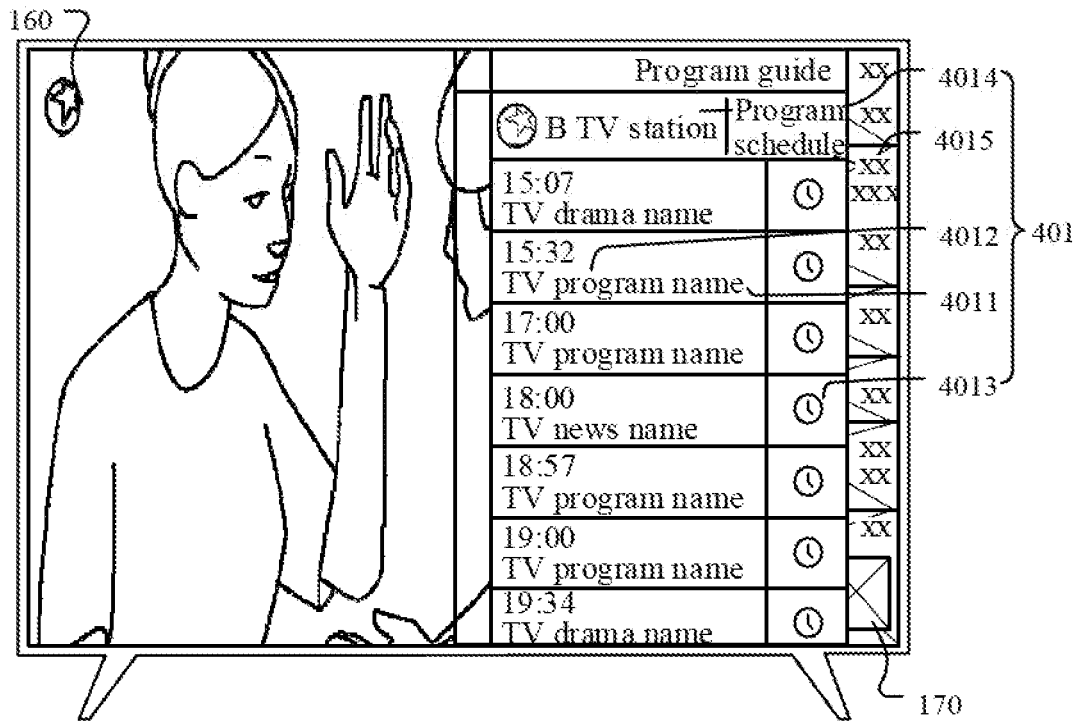
FIG. 17A illustrates an example GUI for selecting a "Program guide" option bar.

FIG. 17A illustrates an example GUI where a user selects the "program guide" option bar. In the example, the GUI includes a program guide list window 401. The program list window 401 floats above the screen shot content display layer 170. When a TV program channel is identified, a program guide list of the TV program channel is displayed, such as: names of programs to be played at the next time period or being played. "B TV station" is taken as an example. The program guide list window 401 displays program teasers to be played by the B TV in the next time period, including two columns, one column showing names 4011 and play time 4012 of programs to be played in the next period, and the other column showing program schedule icons 4013. When the program schedule icon of a desired program is chosen by a user, a reminder will be sent to the user when a scheduled time corresponding to the desired program reaches. The program guide list window 401 presents introduction lists of all the programs in a multi-line form.

Figure 17B:
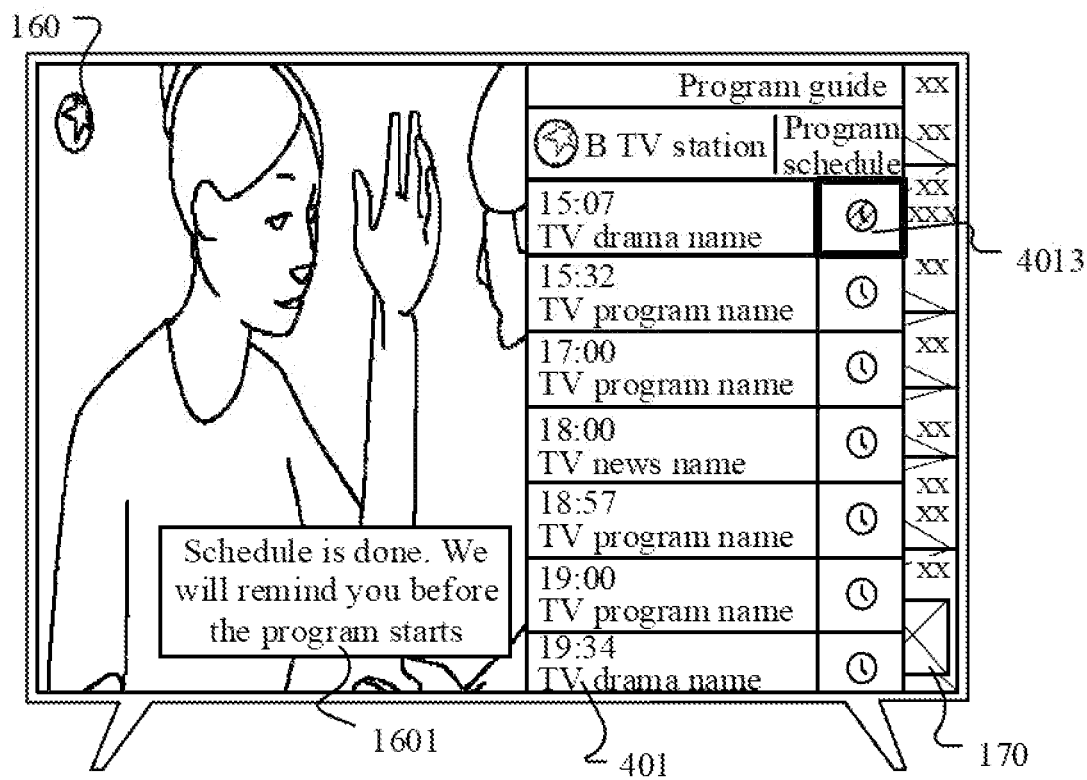
FIG. 17B illustrates an example GUI for a program schedule option bar.

FIG. 17B illustrates a GUI example where a user selects the program schedule option bar 4013. When the user selects and confirms the program schedule icon 4013, the content display layer shows a schedule reminding bar 1601 indicating that a reminder will be sent to the user before the program starts.

Figure 17C:
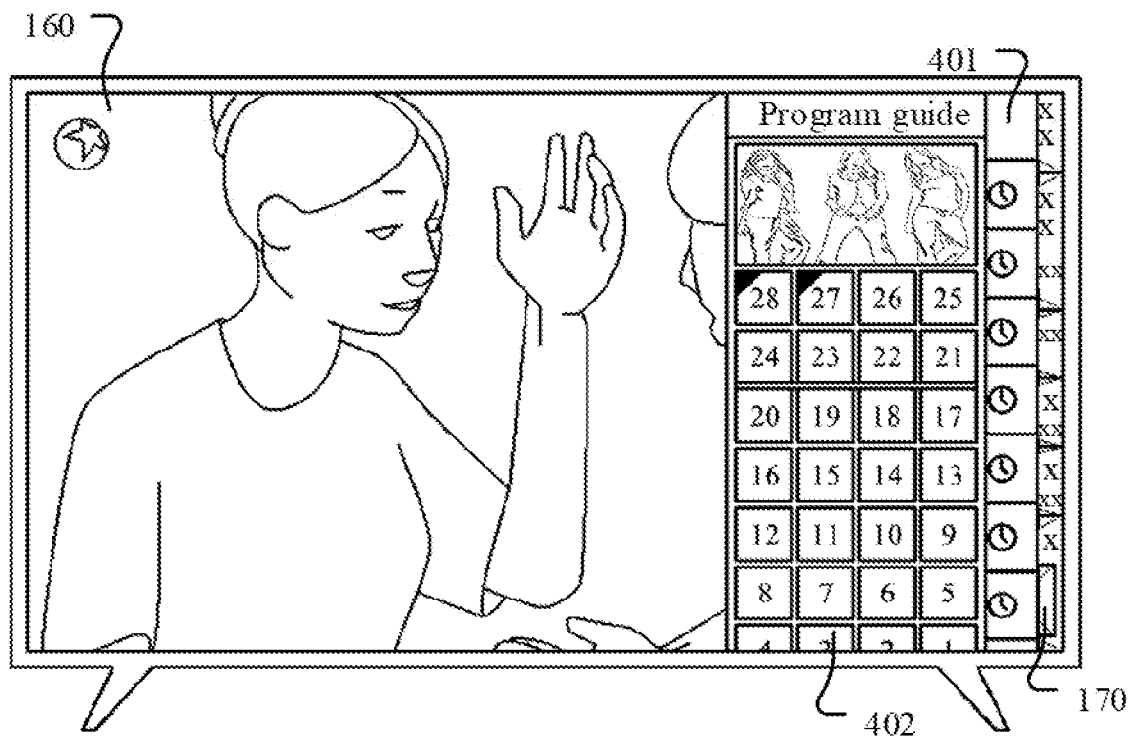
FIG. 17C illustrates an example GUI for selecting a program name option bar.

FIG. 17C shows a GUI example where a user selects the program name option bar 4013. In the example, a third-party video application is activated to store video content that had been played in the past. A new program episode number list window 402 floats above the program guide list window 401 for displaying the number of episodes of a program that had been played in the past, and the user can select to play the program. When a specific episode is selected, the currently-played content display layer 160 displays a skip reminding bar 1602 "skip after 5 seconds" to activate another video application silo (e.g., a video on demand application, or a TV live broadcast application), and the selected program is played through the video application, or the user can select "Back" to continue to play the program of the current silo, as described with reference to FIG. 17D.

After the user selects controls on the above GUI, the smart TV 100 can provide the user with the silo content conveniently and quickly, such as: playing TV broadcast signals, presenting a menu for VOD or providing previous video displayed in the VOD application, displaying one or more images or menus to select images in the media center, displaying menus or applications previously executed in the application silo, or displaying other types of silo content. Thus, based on the silo and the content displayed by the silo, the user can perform logical and situation interaction with the TV 100.

Figure 18:
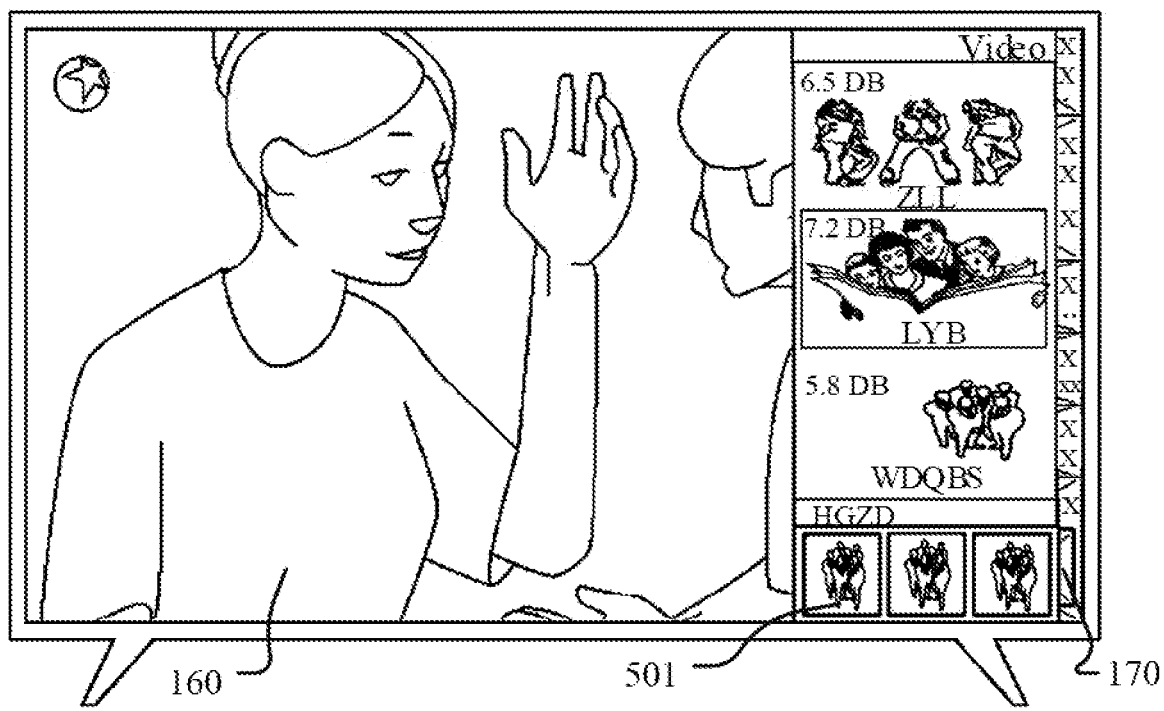
FIG. 18 illustrates an example GUI for selecting a video on demand option bar.

FIG. 18 illustrates a GUI example where a video on demand option bar is selected by a user. In the example, the GUI includes a video option bar list window 501, which floats above the screen shot content display layer 170, and the video option bar includes rating scores, a movie poster and a movie name. Under this option bar, the video on demand (VOD) silo is activated, and the video option bar list window 501 is displayed as a plurality of video option bars that are highly similar to such videos, or video content, in which the user is highly interested, of currently-provided media content, such as: war films, murder suspense films, musicals and comedies that are favored by the user.

In some examples, each line of the video option bar list includes video information related to a currently-played video. The video content most related to the currently-played video is located at the topmost end of the video option bar list. The video option bar list window 501 is a scrolling video option bar list (after the last related content is displayed, the user can skip to the first related content without going back to the first display content in order) or a sliding video option bar list.

Figure 19A:
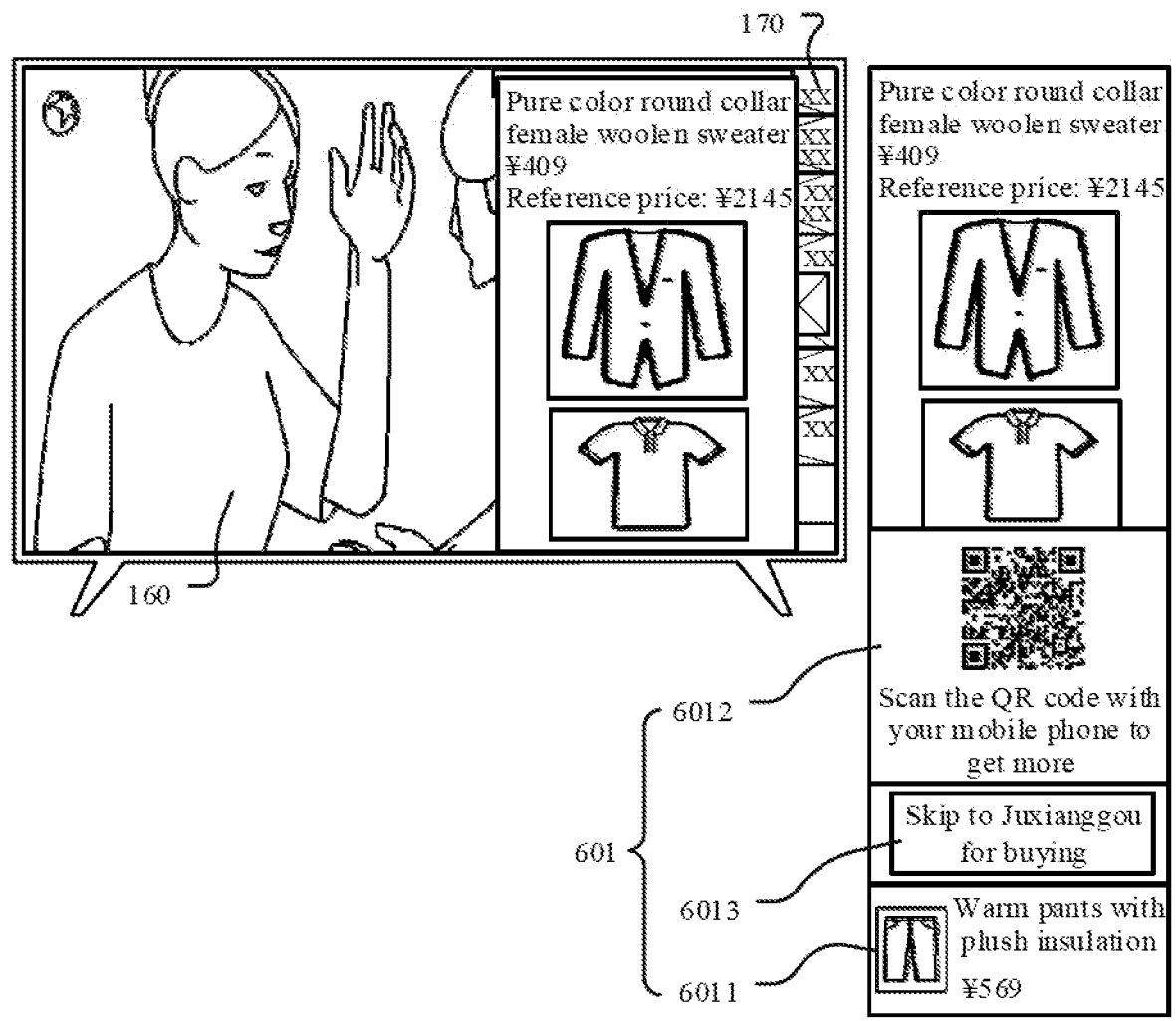
FIG. 19A illustrates an example GUI for selecting a shopping option bar.
Figure 19B:
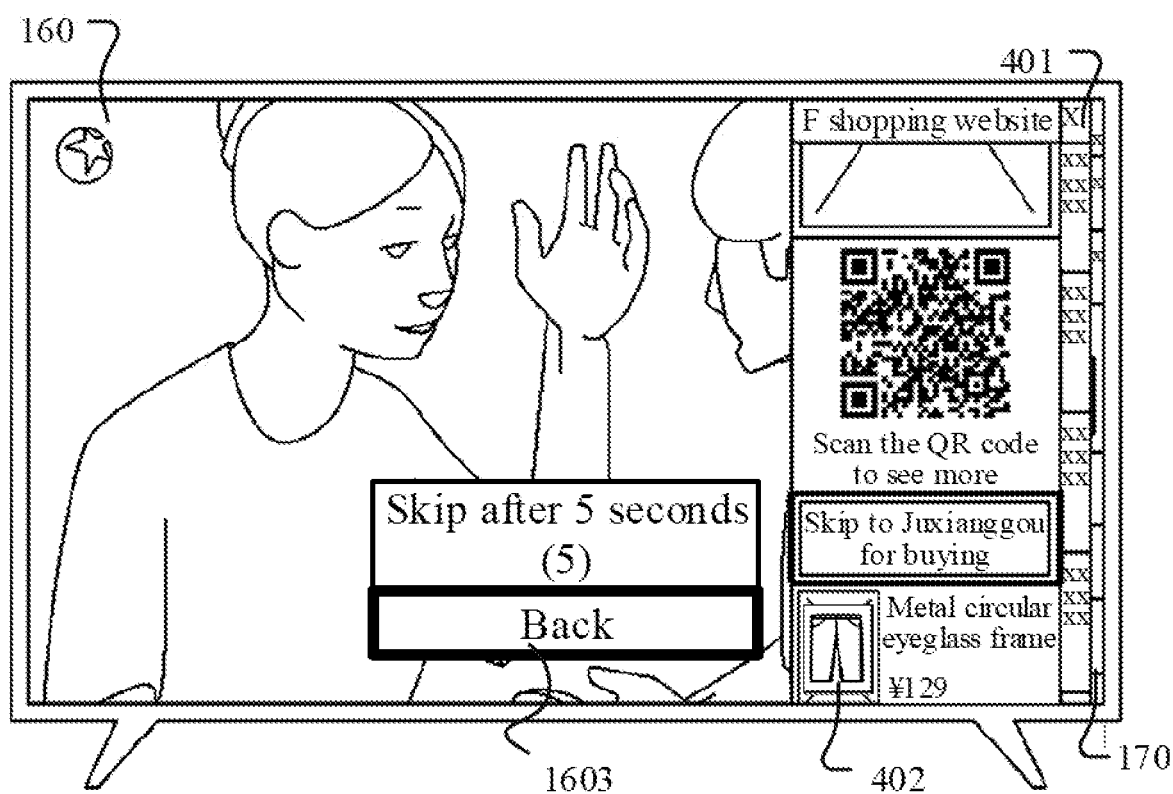
FIG. 19B illustrates an example GUI for selecting a system-provided shopping application option bar.

FIG. 19A illustrates a GUI example for selecting the shopping option bar 1790. In the example, the GUI includes a shopping information list window 601, which floats above the screen shot content display layer 170. The shopping information list window 601 includes a plurality of commodity introduction sub-option bars 6011, a "Scan QR code" sub-option bar 6012, and a shopping application skip sub-option bar 6013. In some examples, when the user selects the commodity introduction option bar, the commodity introduction option bar is folded, and the shopping information list window 601 specifically displays commodity details (including dimensions, sizes, colors and specifications).

In some examples, when the user selects the "Scan QR code" option bar, the QR code is magnified to the entire shopping information list window 601 and presented in square, and more commodity information is obtained from the mobile phone through the mobile phone scanning.

In some examples, when the user selects the shopping application skip option bar 6013, the system shopping application (such as Juxianggou) is in a to-be-activated state, and the skip option bar 1603 is displayed at the bottom of the currently-played content display layer 160, including a prompt for indicating skip (such as skip after 5 seconds) and a prompt for indicating going backward. When the user selects the prompt for indicating skip, the system activates the shopping application and skips to a TV shopping page to facilitate shopping on TV, as described with reference to FIG. 19B.

Figure 20:
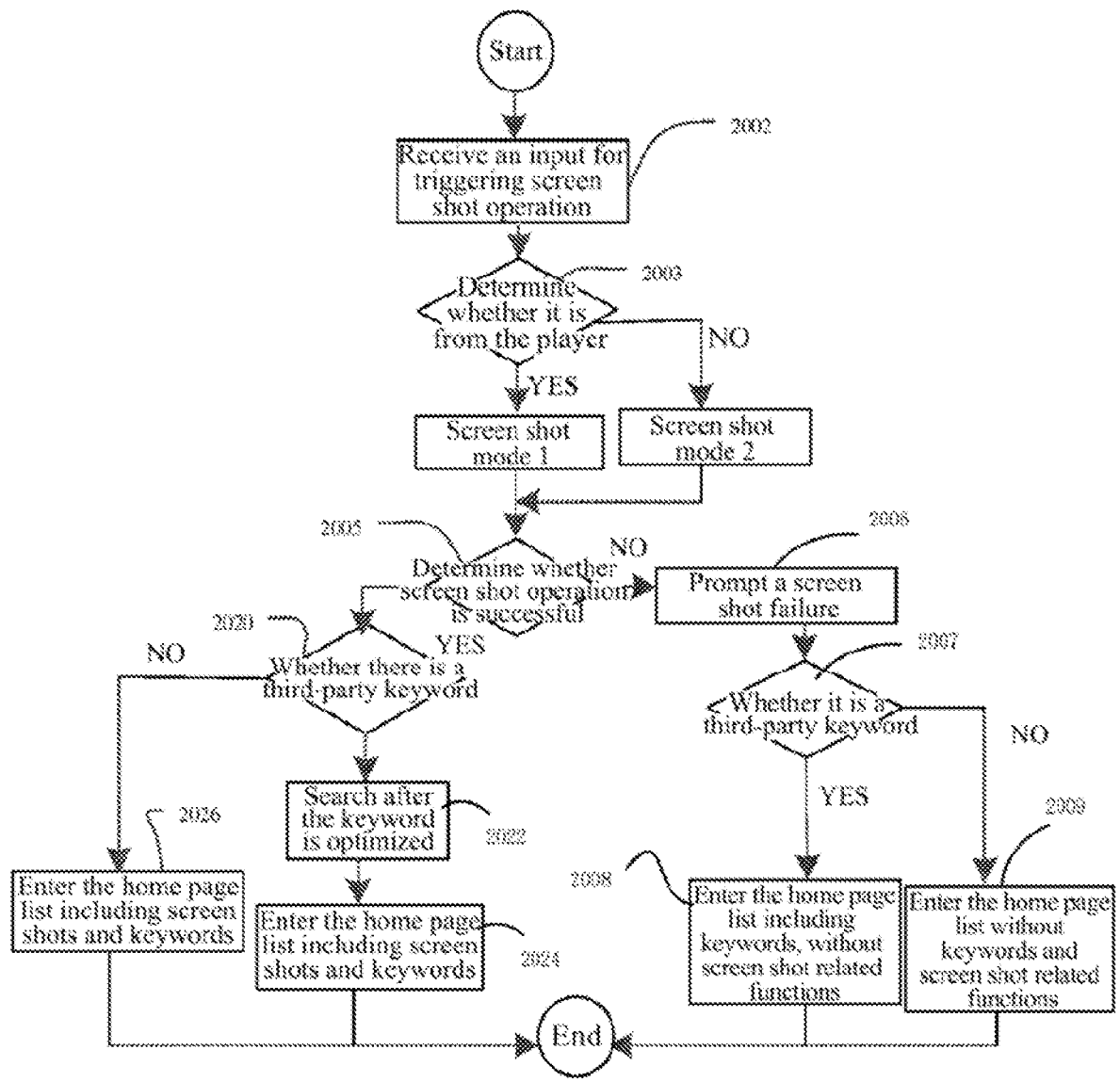
FIG. 20 illustrates an example flow diagram of selecting a screen shot to obtain a screen shot and keyword GUI.

As shown in FIG. 20, some embodiments provide an example of a method 2000 for displaying an application through screen shot capturing. Although FIG. 20 shows a general execution order of the method 2000, the method 2000 may include more or fewer steps, or the steps may be arranged in an order different from that of the method 2000 as shown in FIG. 20.

The method 2000 is a set of computer-executable instructions that can be executed by a computer system or processor, encoded or stored on a computer-readable medium, or specifically embodied as circuits in an application specific integrated circuit (ASIC) or a field programmable gate array (FPGA) that can perform the method. In the following, the method 2000 will be explained with reference to the system, components, modules, data structures, user interfaces and the like illustrated in FIGS. 1 to 21.

In Step 2002, the driver receives a screen shot signal, from the remote controller, a gesture, or a touch on the screen. The screen shot signal will be transmitted to the input event transmitter. The input event transmitter 508 determines whether the signal is from a player according to information from the driver 420.

In Step 2003, if the signal is from the player, the screen shot operation is performed by a screen shot mode 1, if the signal is not from the player, the operation is performed by a screen shot mode 2.

In Step 2005, whether the screen shot operation is successful is determined. If the screen shot operation is successful, the operation of Step 2020 is performed, and otherwise, the operation of Step 2006 is performed.

In Step 2006, "Screen shot failure" is prompted. Then, Step 2007 is executed, in which whether there is third-party keyword. If YES, the home page list is continued, but there is no screen shot related function, and the screen shot event is ended in Step 2008. If NO, the currently-displayed page still continues, no keywords is displayed on screen shots and sidebars, so that no functions and content can be provided, and the screen shot event is ended in Step 2009.

Figure 21:
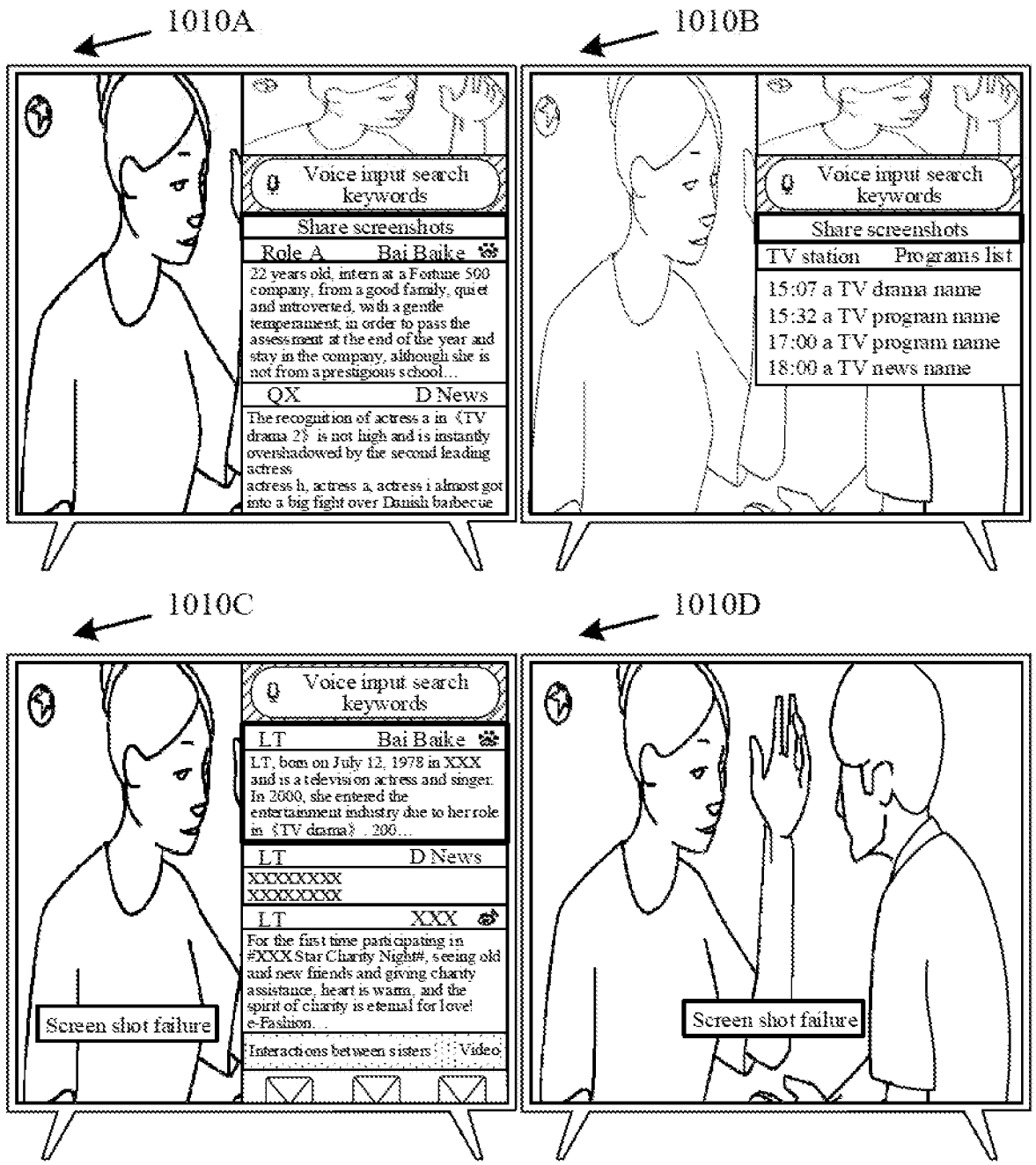
FIG. 21 illustrates an example GUI on which a user triggers a screen shot capturing instruction.

In Step 2020, whether there is a third-party keyword is determined. If NO, Step 2026 is executed to step into the home page list, only a screen shot is acquired, a TV station logo may be identified, and only screen shot related information is provided. If YES, Step 2022 is executed to optimize keywords and/or search the optimized keywords, and then Step 2024 is executed to normally step into the home page list. Keywords and sidebar information of the keyword option bar are displayed. FIG. 21 shows four different exemplary GUIs (1010A, 1010B, 1010C, or 1010D), on which a user triggers a screen shot capturing instruction.

Figure 22:
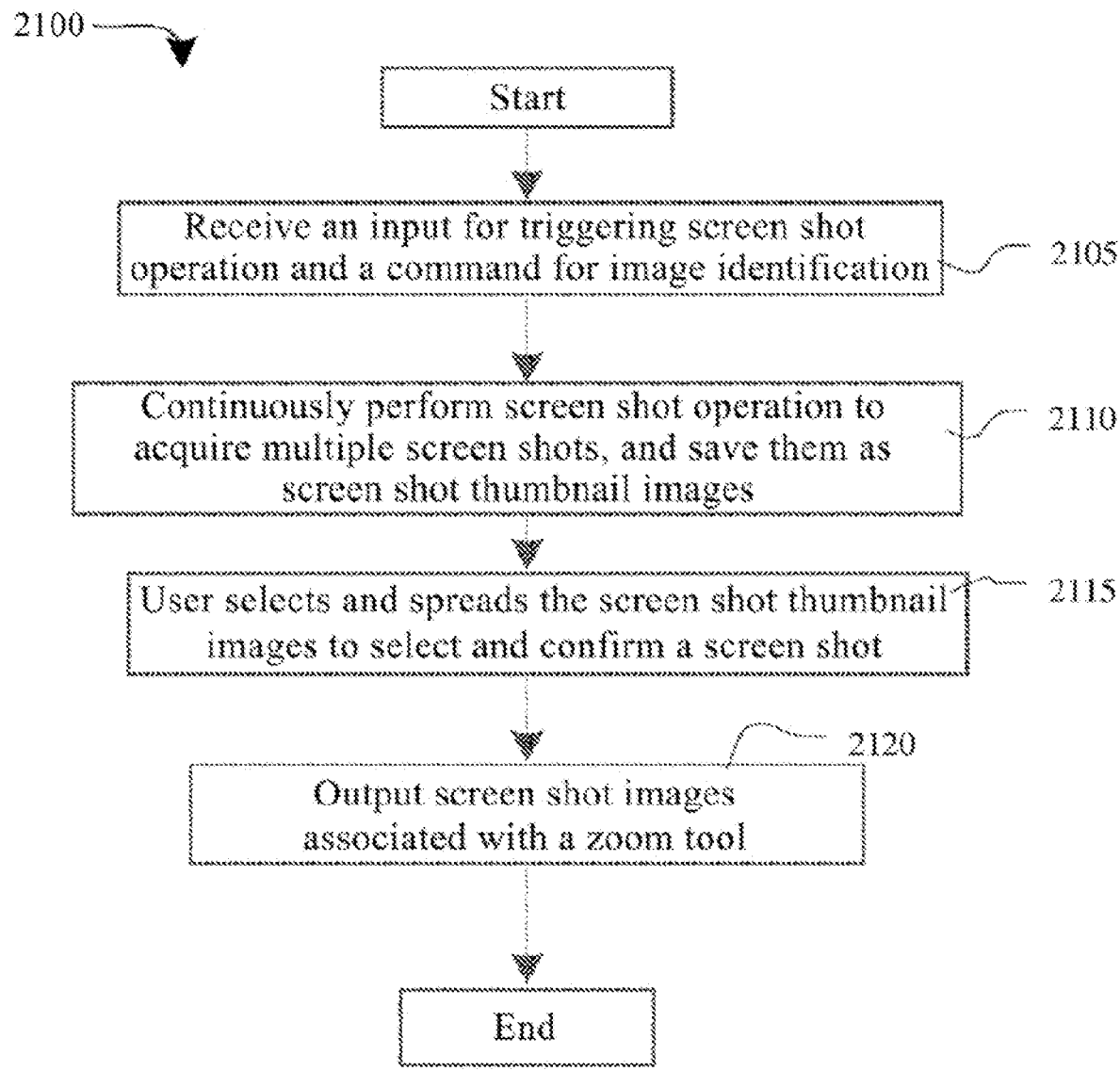
FIG. 22 describes a flow diagram of a screen shot capturing process according to the present disclosure.

FIG. 22 illustrates a process 2100 for screen shot capturing according to some embodiments. As shown in the figure, the process 2100 begins by receiving (at 2105) a command for uploading the screen shot to a photo sharing website. The application can receive the command via a remote controller button, a gesture or a touch on the screen or the like.

The process then determines (at 2110) to capture multiple screen shots before and after the time point of the command, and display them on the screen shot content display layer 170 in thumbnail, and not all the screen shot images are displayed on the sidebar, but only one thumbnail is displayed. When the user selects thumbnails of the screen shots (at 2115), the thumbnail on the sidebar is spread to the currently-played content display layer 160, and all of the screen shot pictures are presented to the user to provide options. After the user selects a specific screen shot, the process determines that the image (2120) is stored in an image storage region (such as a photo album) of the smart TV 100, and creates a log.

Figure 23:
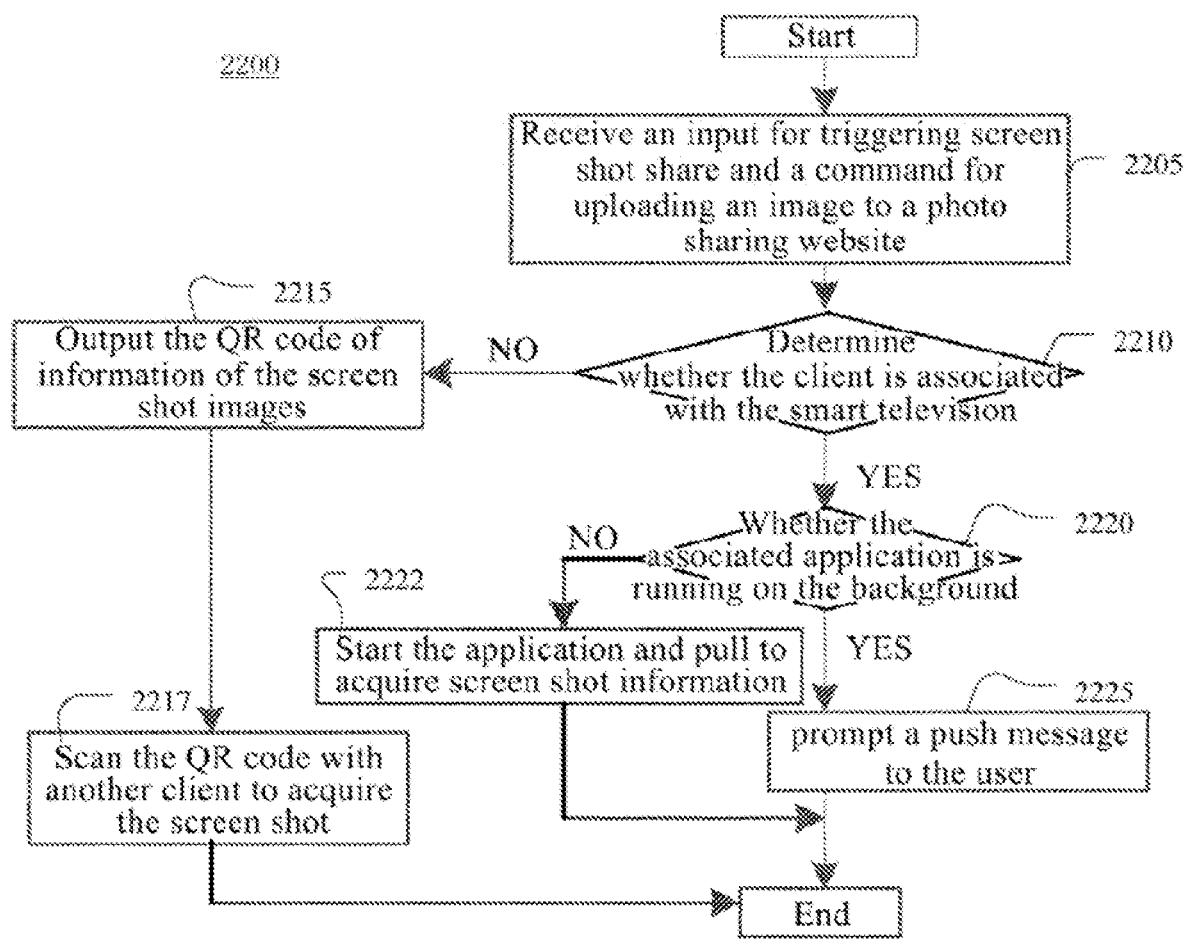
FIG. 23 describes a flow diagram of a process of acquiring a screen shot picture at a client according to the present disclosure.

FIG. 23 illustrates a process 2200 for sharing a screen shot to another client according to certain embodiments. Although FIG. 14 refers to a website that shares screen shots, this can be a "photo sharing" website or a social media application (such as a chat tool). As shown in the figure, the process 2200 begins by receiving (at 2205) an input for triggering screen shot share and a command for uploading an image to a photo sharing website. The application can receive the command via a user interaction such as a remote controller button, a gesture or a touch on the screen or the like.

The process then determines (at 2210) whether another client is associated with the smart TV, that is, an application associated with the smart TV is installed in the client such that the smart TV and the client can directly exchange data. An application for data exchange between the user and the client is specially installed in the smart TV. The user installs the application associated with the smart TV 100 on another client (for example, the Hisense assistant APP is downloaded and installed on another client), and then the "intranet" performs transmission through the built network link. At this time, the other client shares a detail page of screen shot to explain "if your phone and the TV are in the same network, you can directly open the application (such as: "Hisense TV micro assistant") associated with the smart TV" to the user to capture a screen shot.

When another client of the user is associated with the smart TV 100, the process determines (at 2220) whether the associated application is running in the background. The user may possibly have opened the associated application. In the application interface or when the application is running in the background, namely when the TV transmits a screen shot message, the user can receive it immediately. The process determines (at 2225) that the TV will prompt a push message to the user, and transmits a screen shot image to the client to prompt the user to receive the message. At this point, the process is ended, and the user receives the image shared by the smart TV on the other client. Otherwise, when the associated application is not opened, the user in the process 2222 needs to initiate the application and pull to acquire screen shot information, and then the process is ended.

When another client of the user is not associated with the smart TV 100, the process 2215 outputs a QR code with screen shot information in the screen shot content display layer 170, and the client scans the QR code on the smart TV 100 through a website that shares screen shots or a social media application (such as a chat tool) and then reduces the QR code into image information. The process is ended.

Figure 24A:
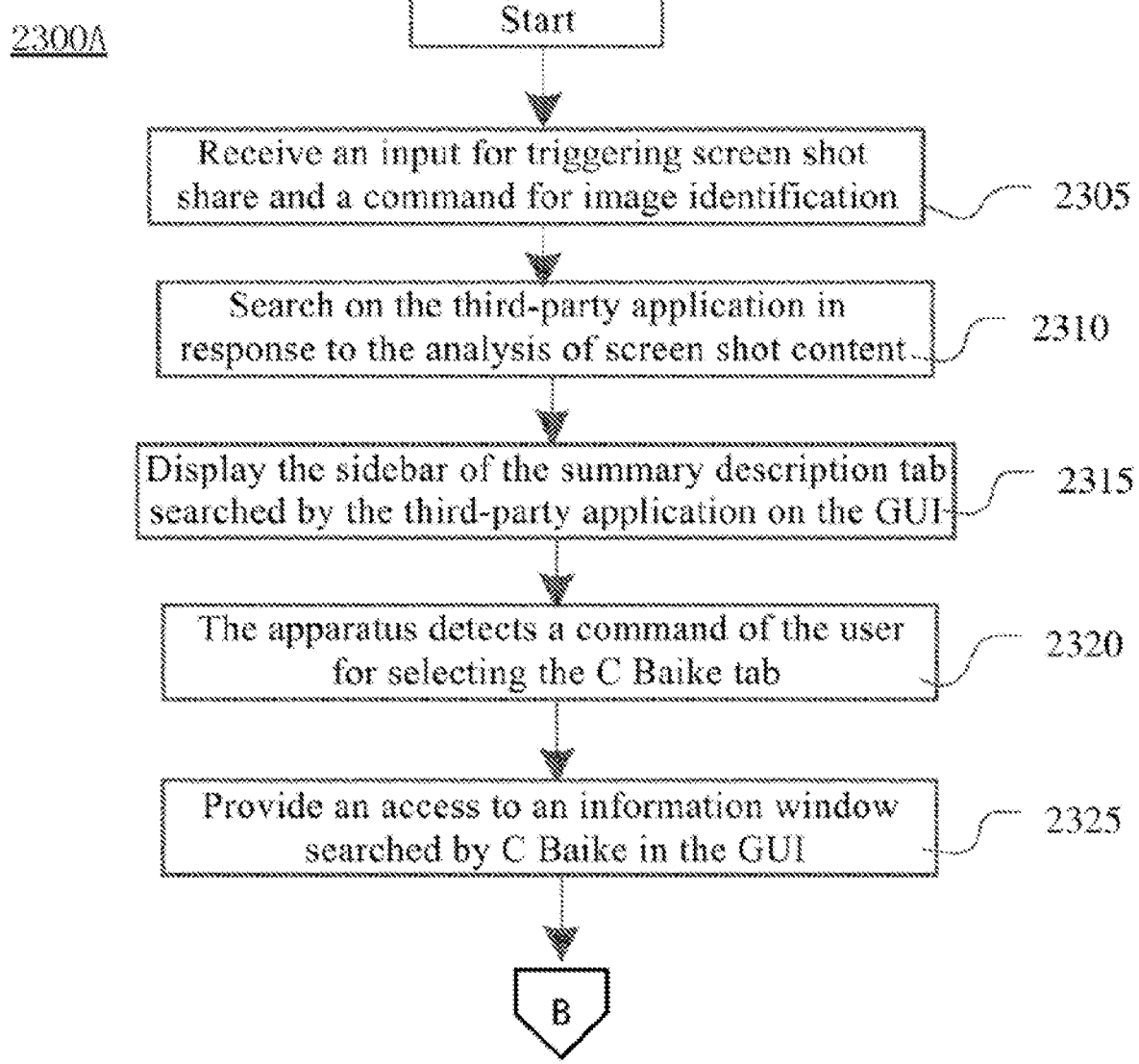
FIGS. 24A to 24B are flow diagrams of checking content in C Baike according to some embodiments.
Figure 24B:
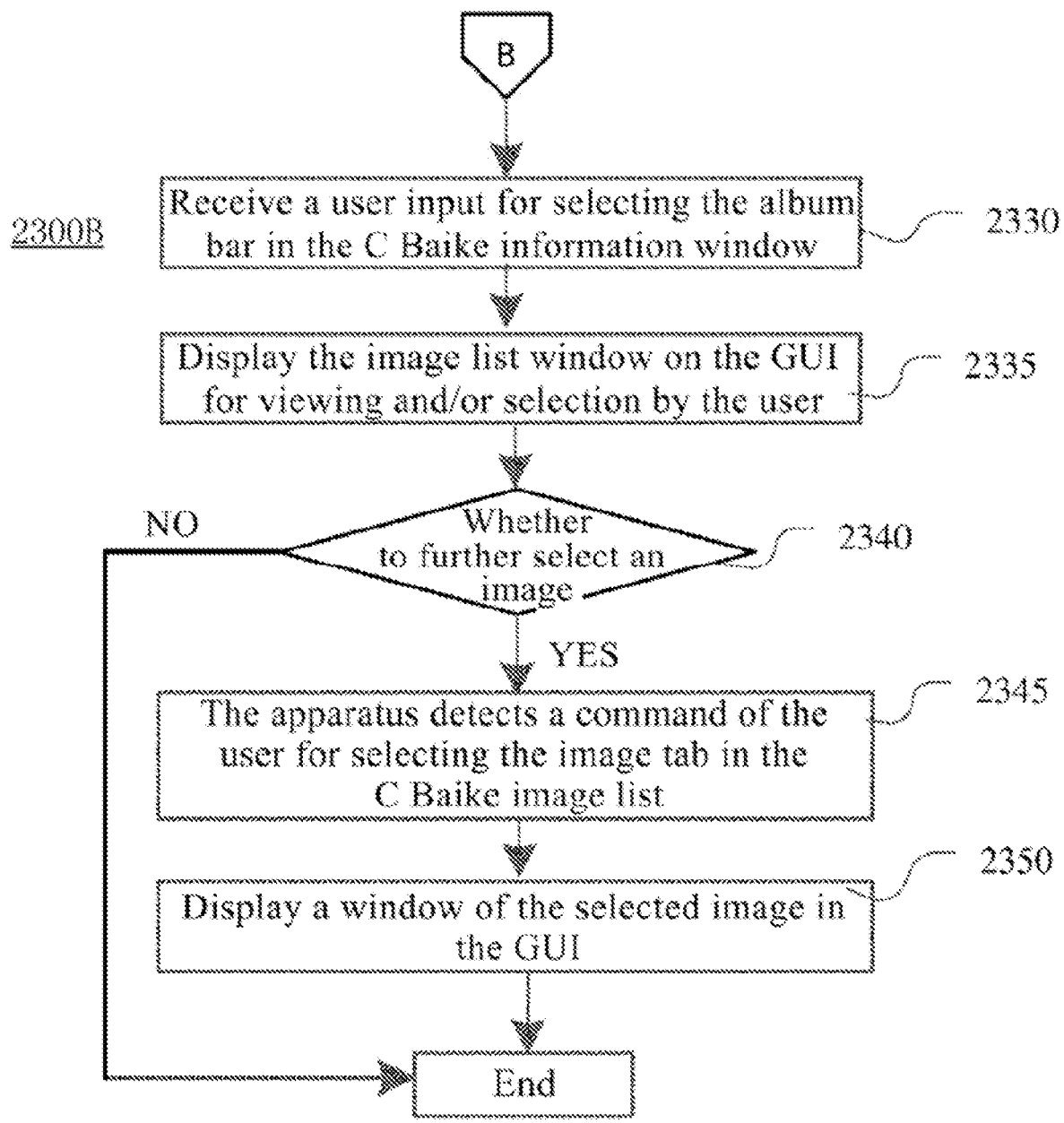

FIGS. 24A to 24B are flow diagrams of an exemplary process (2300A and 2300B) for selecting C Baike. As shown in the figure, the process 2300A begins by receiving (at 2305) an input for triggering screen shot sharing and a command for image identification. The application can receive the command via a user interaction such as a remote controller button, a gesture or a touch on the screen or the like.

The apparatus searches in the third-party application in response to (at 2310) analysis of a screen shot content or an identified image, and generates a GUI including display objects for displaying as search results (at 2315). The display object has an option bar available to the user and configured to provide accesses to different third-party applications. This option bar generally describes the search content of the third-party applications. The option bars presented in the sidebar form a list such that the user can browse and view the content in a sliding or waterfall manner.

In some examples, (at 2320) the apparatus detects that the user selects a webpage third-party application (such as C Baike, FIG. 15A), and then provides a new window (at 2325) in the sidebar of the GUI to provide an access to the information window for C Baike searching. The information window 203 is a side information window floating in the screen shot content display layer 170, and corresponds to any one or more of the album bar, the keyword bar and the entry detail bar. In some embodiments, in a case where content in C Baike is incomplete, any one or more of the album bar, the keyword bar and the entry detail bar may not be included. For example, no albums and keywords are displayed, and only the entry detail bar is displayed, or no associated word bar is displayed, and the album bar and the entry detail bar are displayed.

In the illustrated example, the user selects the focus frame of a description bar 2034, resulting in presentation of the GUI as shown in FIG. 15B. In some examples, the album bar 2032, the keyword bar 2033 and the Logo bar 2031 does not change their positions, and the content of the entry detail bar will all be spread, and then slide up with the selection of the user.

In the illustrated example, when the user selects the focus frame of the album bar 2032, the GUI of FIG. 15C is displayed. The process 2330 receives a user input for selecting the album bar in the C Baike information window, and then provides an image list window 204 (at 2335) in the sidebar of the GUI to provide an access to an image list found in C Baike. The image list window 204 is a side information window floating in the screen shot content display layer 170, includes thumbnails of at least three images, and can be slid to view images not shown below (for example, the GUI as shown in FIG. 15C).

In some examples, the user can view the thumbnails only in the image list window without further selecting the images. In some examples, the user can exit from the image list window 204 to the previous option bar or exit the screen shot content display layer 170 to browse the video content played in the currently-played content display layer 160 in full screen.

When a user wants to further select an image (at 2340), the apparatus detects (2345) a command of the user for selecting the image option bar in the image list window, and displays a selected image window 205 in the GUI. The image window 205 floats above the image list window 204, and displays a single image. If the image is displayed completely, it is viewed as a full-screen square, as described with reference to FIG. 15D.

Figure 25:
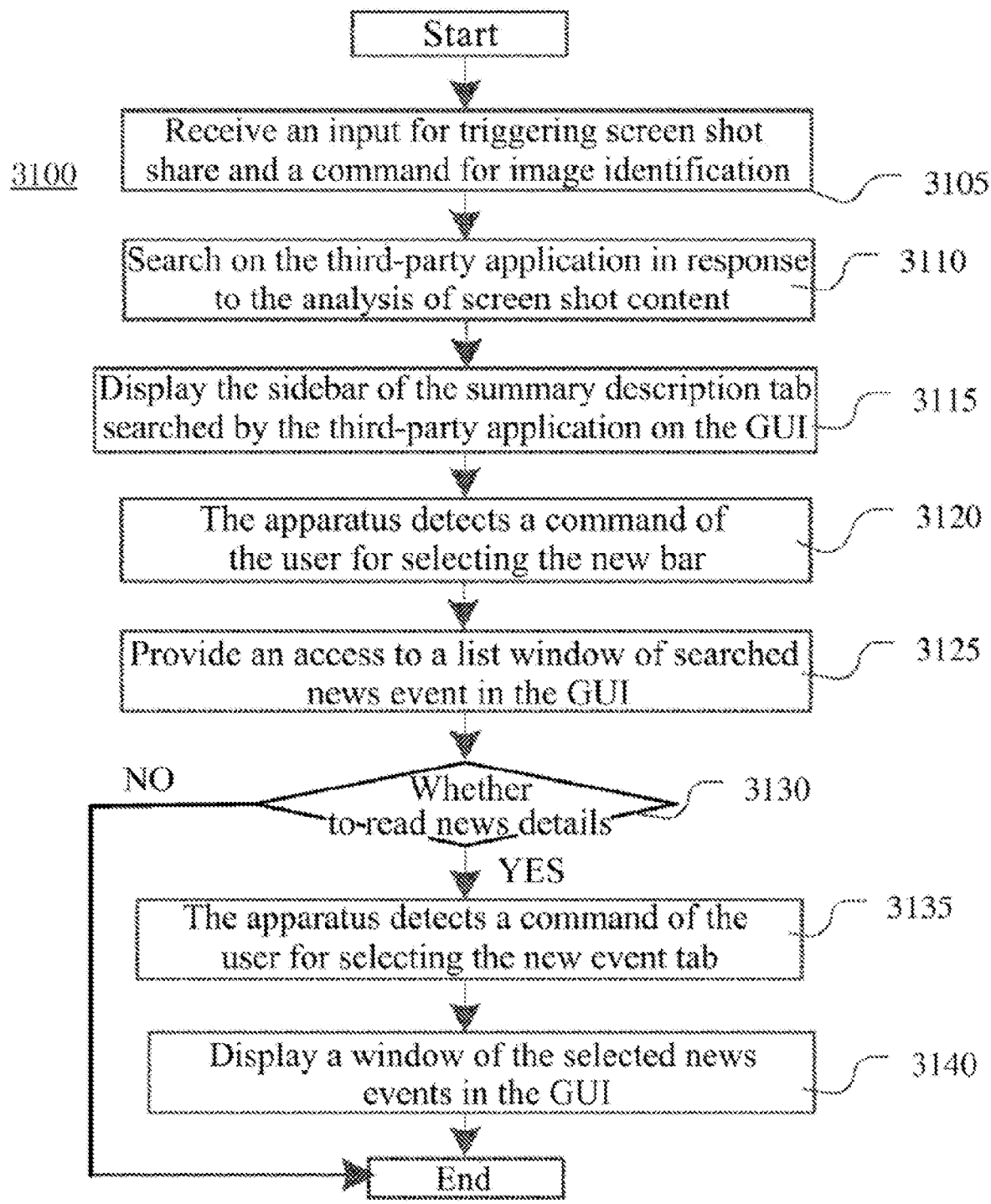
FIG. 25 describes a flow diagram of browsing a GUI under a news option bar according to the present disclosure.

FIG. 25 is a flow diagram of an exemplary process 3100 for selecting the news option bar. As shown in the figure, the process 3100 begins by receiving (at 3105) an input for triggering screen shot sharing and a command for image identification. The application can receive the command via a user interaction such as a remote controller button, a gesture or a touch on the screen or the like.

The apparatus searches in the third-party application in response to (at 3110) analysis of a screen shot content or an identified image, and generates a GUI including display objects for displaying as a search result (at 3115). The display object has an option bar available to the user and configured to provide accesses to different third-party applications. This option bar generally describes the search content of the third-party applications. The option bars presented in the sidebar form a list such that the user can browse and view the content in a sliding or waterfall or scrolling manner.

In some examples, (at 3120) the apparatus detects that the user selects a webpage third-party application (such as D News, FIG. 16A), and then provides a new window (at 3125) in the sidebar of the GUI to provide an access to the news event list window. The news event list window 301 is a side information window floating on the screen shot content display layer 170, and corresponds to a plurality of news event option bars. A news event option bar describes a news event, specifically including a date, a title (the title is set to include no more than five lines, portions beyond the five lines of the title are hidden, and " . . . " is used at the end of the fifth line to indicate that the title is hidden), and an image (you can select to display or not display an image during setting, and if you select to display an image, three images can be displayed in a thumbnail form at most).

In some examples, the user can only read headline news and/or introductions at the news event list window without further selecting to read news. In some examples, the user can exit from the news event list window 301 to the previous option bar or exit the screen shot content display layer 170 to browse the video content played in the currently-played content display layer 160 in full screen.

When the user wants to read details of a news event (at 3130), the apparatus detects (3135) a command of the user for selecting a command of the news event option bar in the news event list window, and displays a selected image window 302 in the GUI (at 3140). In the illustrated example, the user selects the focus frame corresponding to the first news event option bar, resulting in presentation of the GUI as shown in FIG. 16B. A news event window 302 is activated, and floats above the news event list window 301. News events described by the selected news event option bar 3021 are all spread, including the titles, post time, texts and images of all the news records, while the unselected news event option bar 3022 still only displays the title and part of the images. The not displayed parts can be viewed by scrolling the list.

Figure 26A:
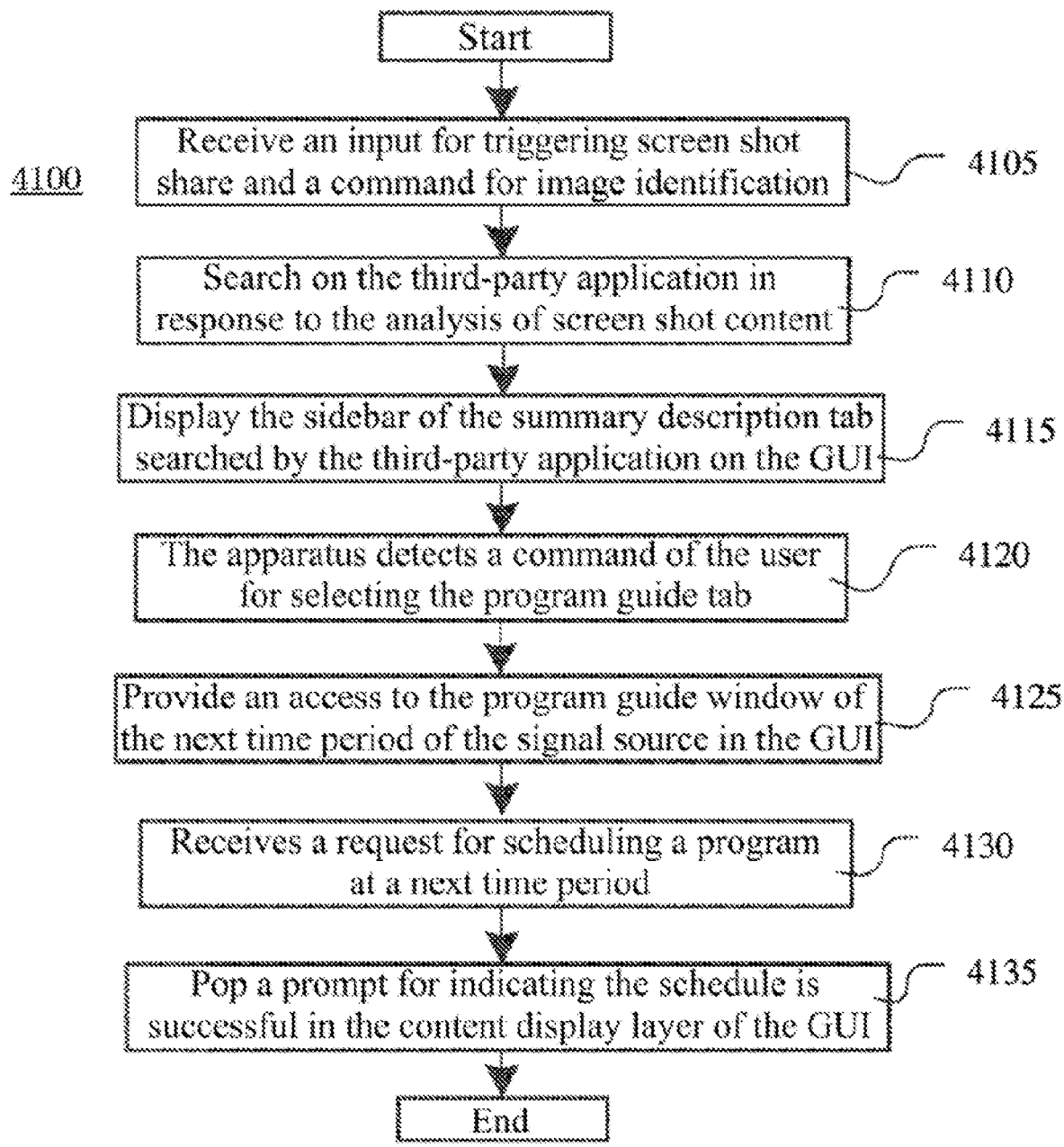
FIG. 26A describes a flow diagram of a program schedule process under a program guide according to the present disclosure.
Figure 26B:
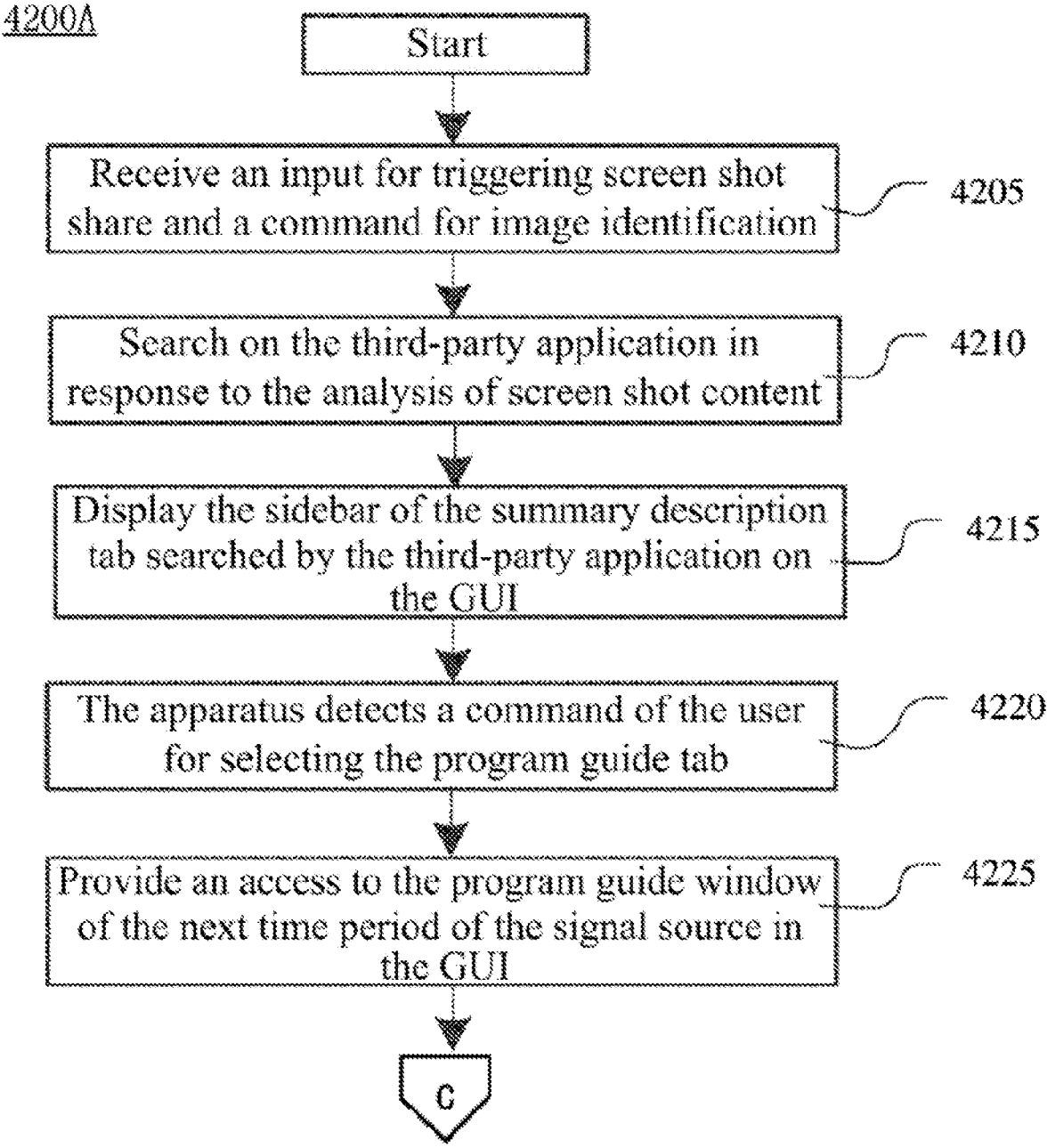
FIGS. 26B to 26C are flow diagrams of a process of playing updated programs under the program guide.
Figure 26C:
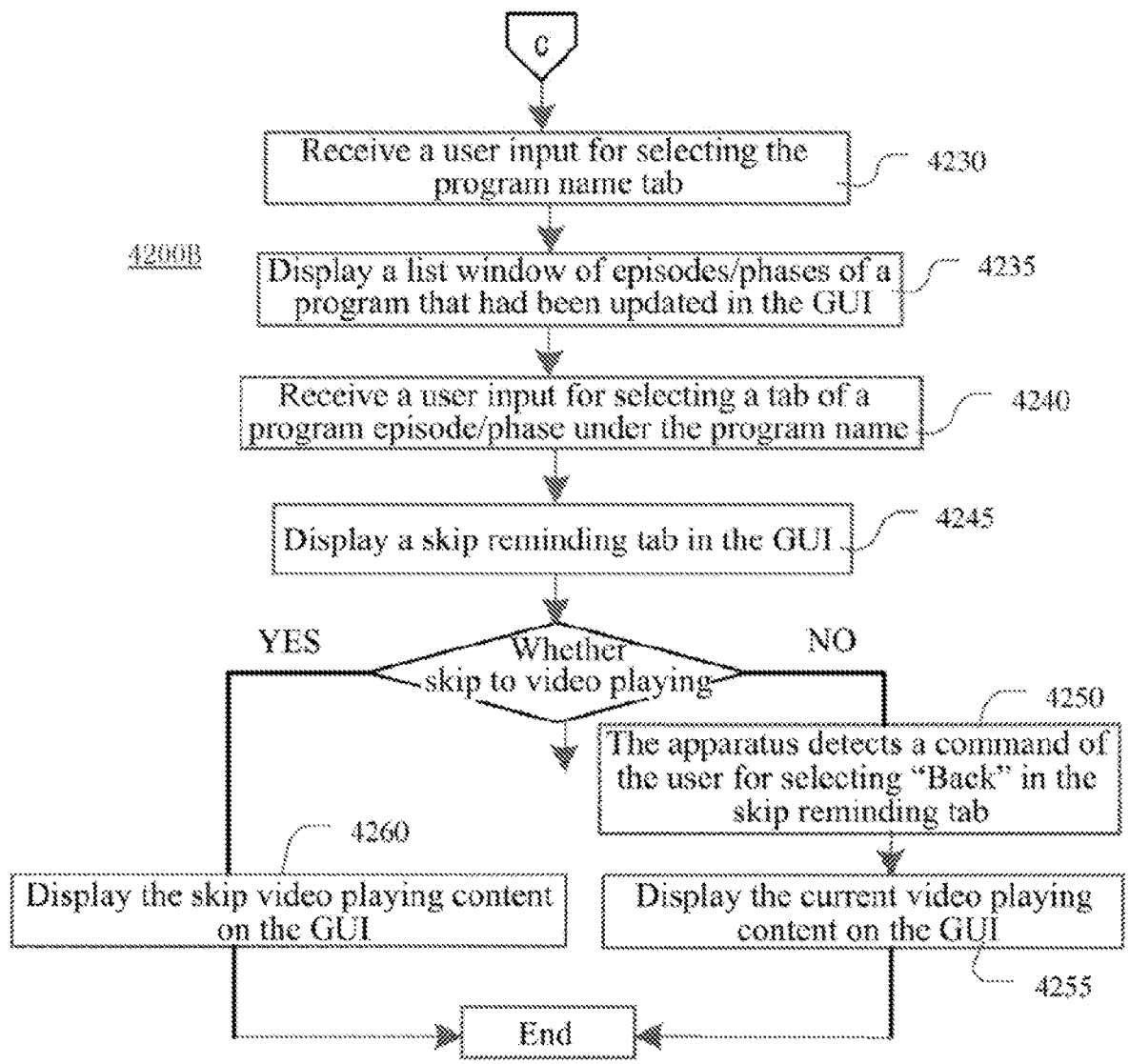

FIGS. 26A to 26C are flow diagrams of an exemplary process 4100 for selecting the program guide option bar. FIG. 26A describes a flow diagram of a program schedule process under a program guide according to the present disclosure. The process 4100 begins by receiving (at 4105) an input for triggering screen shot sharing and a command for image identification. The application can receive the command via a set of user interactions such as pressing a remote controller button, a gesture or a touch on the screen or through certain transformations.

The apparatus searches on a third-party application in response to (at 4110) analysis result of a screen shot content or an identified image, and generates a GUI including a display object for displaying based on a search result (at 4115). The display object has at least one different available option bar for a user to access in the third-party application. These option bar include general descriptions with respect to the search content from the third-party application. The option bars presented in the sidebar form a list such that a user can browse and view the content in a sliding, scrolling or waterfall manner.

In some examples, (at 4120) the apparatus detects that the user selects a TV program third-party application, and then provides a new program guide window (at 4125) in the sidebar of the GUI, which provides an access to the program option bar. When the third-party application identifies that a video played in the currently-played content display layer 160 is from a satellite TV video channel, the TV station logo is analyzed, and then a program guide to be played in the satellite TV corresponding to the TV station logo is displayed, as shown in FIG. 16A. The program guide list window 401 is a side information window floating on the screen shot content display layer 170, and corresponds to a plurality of program option bars. Each of the program option bars includes an option bar for a program name and an option bar for schedule.

The apparatus receives (at 4130) a request for scheduling a program at a next time period, and then pops a prompt for indicating the schedule is successful in the content display layer of the GUI (as shown in FIG. 17B) (at 4135). In some examples, the user can select to exit from the program guide window 401 to the screen shot content display layer 170, or exit the from screen shot content display layer 170 such that the video content in the currently-played content display layer 160 is played in full screen.

In some examples, when a user wants to check a updated program series of a program name, the user selects the program name in the program option bar in the program guide window 401, the apparatus receives (at 4230) instructions associated with the selected program name option bar. Here, the third-party video application is activated to store video content that had been updated in the past. In the exemplary GUI as shown in FIG. 17C, a new program episode number list window 402 floats above the program guide list window 401 for displaying the episode number of the program that had been played in the past (at 4235). The two topmost marked option bars are video content for program preview.

When selecting a certain specific episode, the apparatus (at 4240) receives a user input for selecting a program episode option bar under the program name. The received user input can be a click on a remote controller button, a gesture or a touch on the screen. The currently-played content display layer 160 of a main display panel (at 4245) displays the skip reminder 1602 "skip after 5 seconds" and then skips to play a program selected by another silo (and the third-party video application), and the video content of a selected past program is displayed (at 4260) in the GUI.

In some embodiments, the apparatus detects (at 4250) a user command, which is selecting "Back" in the skip reminder bar, and then the GUI (at 4255) exits from the screen shot content display layer 170 and continues to play the program of the current silo, as described with reference to FIG. 17D.

Figure 27:
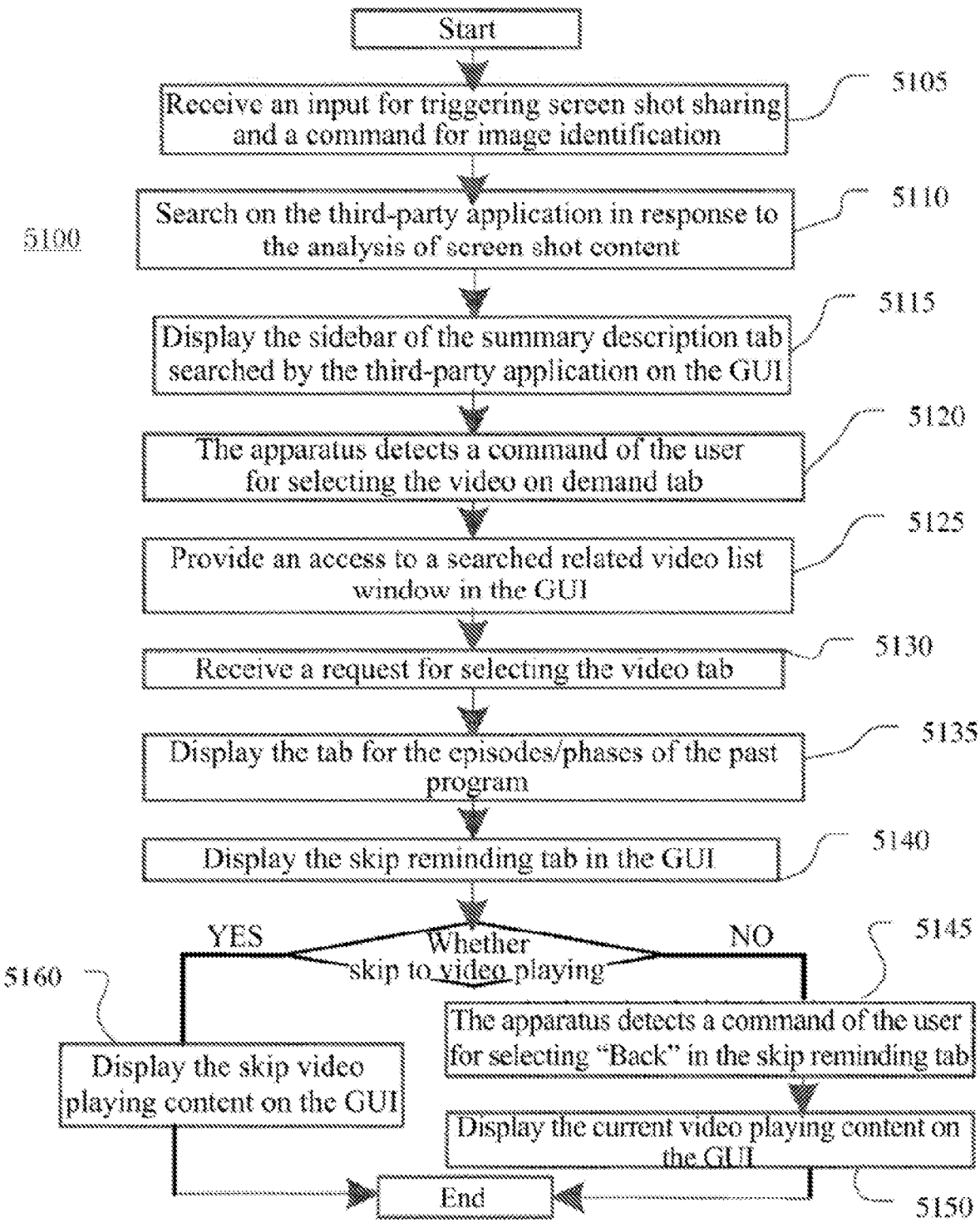
FIG. 27 is an exemplary process flow diagram of selecting video on demand under a video playing application.

FIG. 27 is a flow diagram of an exemplary process for selecting video on demand in a video playing application. As shown in FIG. 27, the process 5100 is to receive (5105) an input for triggering screen shot sharing and a command for image identification. The application can receive the command via a set of user interactions such as pressing a remote controller button, a gesture or a touch on the screen or through certain transformations.

The apparatus searches on a third-party application in response to (at 5110) analysis result of a screen shot content or an identified image, and generates a GUI including a display object for displaying based on a search result (at 5115). The display object has one or more different available option bars for the user to access to the third-party application. The option bars includes general descriptions with respect to the search content of the third-party application. The option bars presented in the sidebar form a list such that the user can browse and view the content in a sliding or waterfall manner.

In some examples, when the apparatus detects (at 5120) that the user selects a video third-party application (a video application built in the smart TV, such as Juhaokan; or skipping to another video play application, such as iQiyi and PPTV, FIG. 18), a new window (such as a video option bar list window, at 5125) is provided in the sidebar of the GUI to provide an access to the searched related video list window. The video option bar list window 501 is a side information window floating on the screen shot content display layer 170, and includes a rating score, a movie poster and a movie name. Under this option bar, the video on demand silo is activated, and the video option bar list window 501 is displayed as a plurality of video option bars that are highly related to such videos, or the video option bar list window 501 is displayed as a certain type of videos which the user is more interested among currently-provided media content (such as: war movies, murder suspense films, musicals and comedies that are favored by the user). The video option bar list window 501 is a scrolling video option bar list (after the last related content is displayed, the user can skip to the first related content without going back to the first display content in order) or a sliding video option bar list.

Figure 17D:
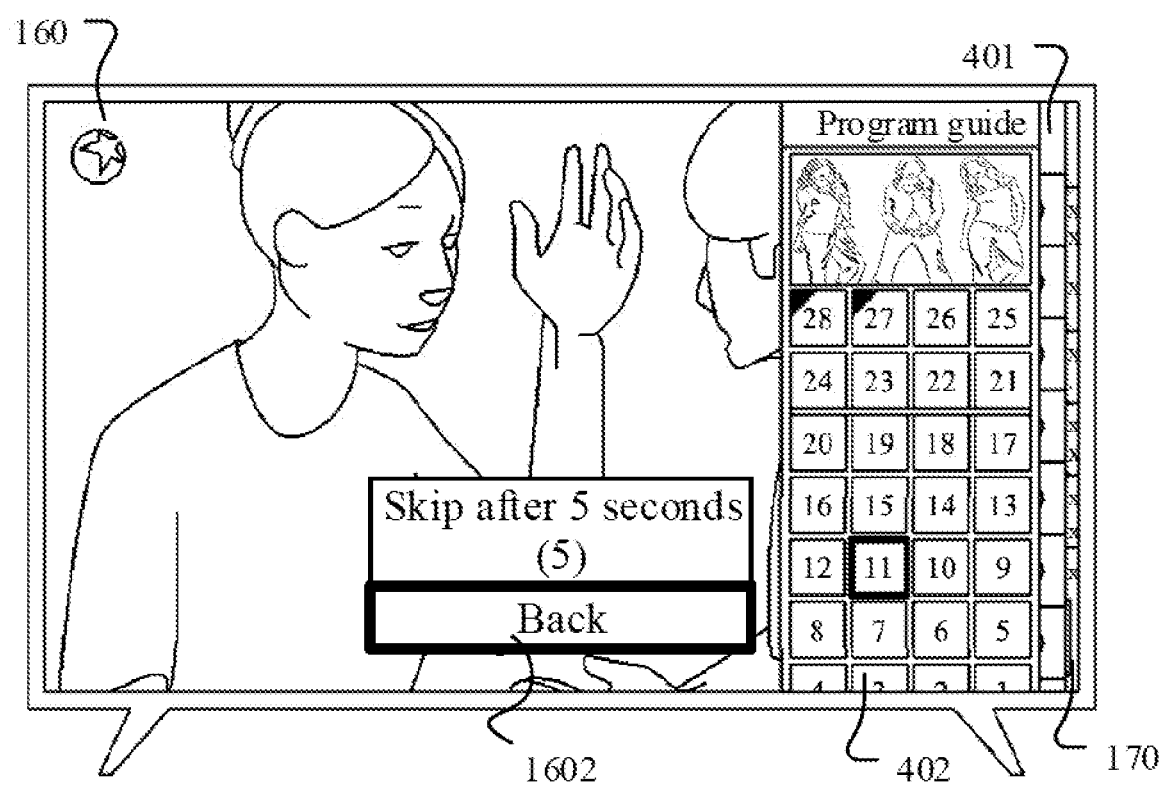
FIG. 17D illustrates an example GUI for selecting a previous program for playing.

In the illustrated example, when the apparatus receives a request for selecting a focus frame of the video option bar (at 5130), the GUI similar to that of FIG. 17D is displayed. When a certain specific episode is selected (at 5135), the apparatus receives a user input for selecting a program episode option bar under the program name. The received user input can be a click on a remote controller button, a gesture or a touch on the screen. The currently-played content display layer 160 of a main display panel (at 5140) displays a skip reminder bar 1602 "skip after 5 seconds" and then skips to play a program from another silo (and the third-party video application), and the video content of a selected past program is displayed (at 5160) in the GUI.

In some embodiments, the apparatus detects (at 5145) a user command, which is selecting "Back" in the skip reminder option bar, and then the GUI (at 5150) exits from the screen shot content display layer 170 and continues to play the program of the current silo. In some examples, the user can exit from the video option bar list window 501 to the previous option bar or exit the screen shot content display layer 170 to browse the video content currently played in the currently-played content display layer 160 in full screen.

Figure 28A:
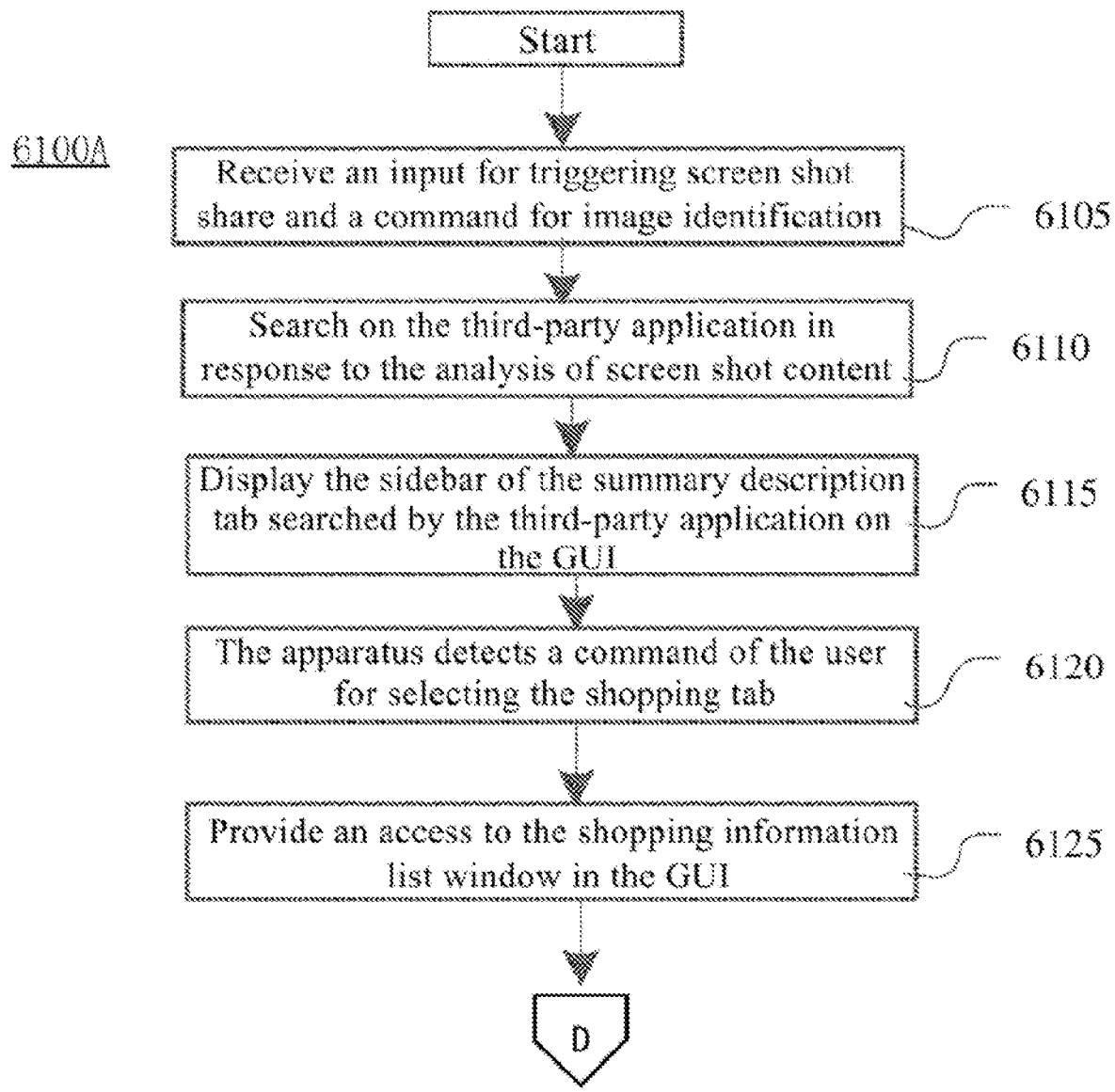
FIGS. 28A to 28B describe a flow diagram of browsing a GUI under a shopping option bar according to the present disclosure.

FIG. 28A is a flow diagram of an exemplary process 6100A for selecting a shopping third-party application. As shown in FIG. 28, the process 6100A is to receive (at 6105) an input for triggering screen shot sharing and a command for image identification. The application can receive the command via a set of user interactions such as pressing a remote controller button, a gesture or a touch on the screen or through certain transformations.

The apparatus searches on a third-party application in response to (at 6110) analysis result of a screen shot content or an identified image, and generates a GUI including a display object for displaying based on a search result (at 6115). The display object has one or more different available option bar for the user to access to the third-party application. The option bars include general descriptions with respect to the search content of the third-party application. The option bars presented in the sidebar form a list such that the user can browse and view the content in a sliding or waterfall manner.

Figure 28B:
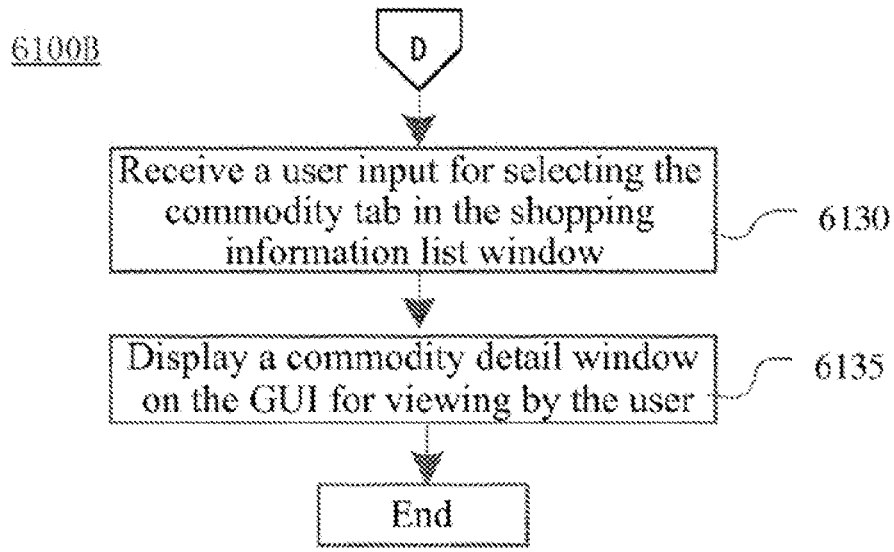

In some examples, as shown in FIG. 28B (6100B), when the apparatus detects (at 6120) that the user selects a shopping third-party application (a shopping application built in the smart TV, such as Juxianggou; or skipping to another shopping application, FIG. 19), a new window (such as a shopping information list window, at 6125) is provided in the sidebar of the GUI to provide an access to the searched related commodity list window. The shopping information list window 601 is a side information window floating on the screen shot content display layer 170, and corresponds to a commodity introduction option bar 6011 (displaying of specific content depends on specific cooperation), a "Scan QR code" option bar 6012 and a shopping application skip option bar 6013. Under this option bar, the shopping application is activated, and the shopping information list window 601 is a scrolling option bar list (after the last related content is displayed, the user can skip to the first related content without going back to the first display content in order) or a sliding video option bar list.

In some examples, when the user selects a commodity option bar, the apparatus receives (at 6130) a user input for selecting the commodity option bar in the shopping information list window, and the commodity option bar is spread, and the shopping option bar list window 601 in the GUI specifically display (at 6135) associated commodity details (including dimensions, sizes, colors and specifications).

Figure 28C:
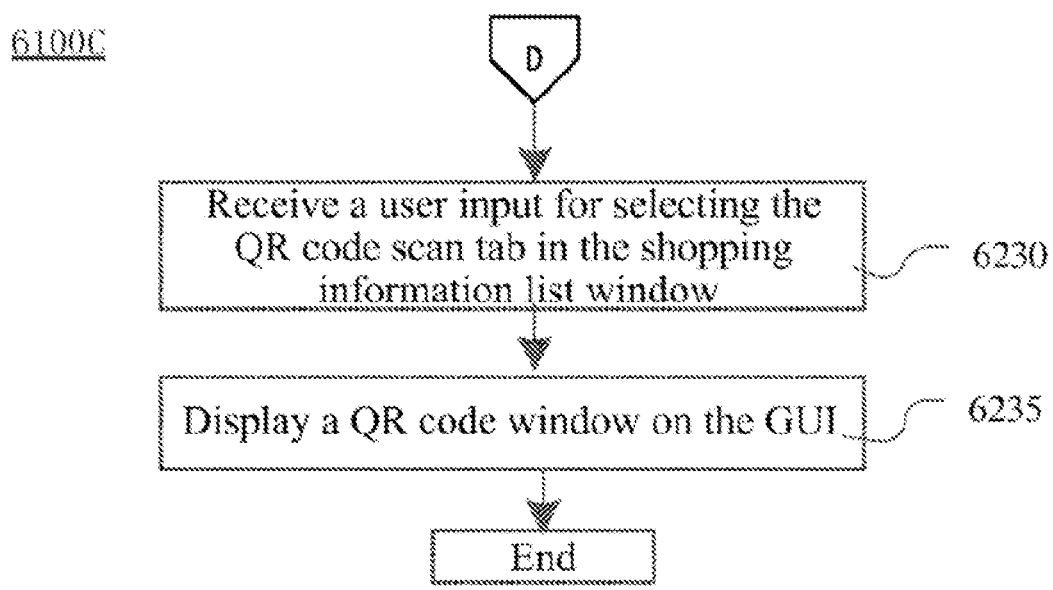
FIG. 28C describes a flow diagram of acquiring a GUI of shopping information at a client according to the present disclosure.

FIG. 28C describes a flow diagram 6100C of acquiring a GUI of shopping information at a client according to the present disclosure. In some examples, the apparatus detects (at 6230) that the user selects the "Scan QR code" option bar, a QR code window is displayed (at 6235) on the GUI. A QR code is magnified to the entire shopping option bar list window 601 and presented as a square. The QR code on the smart TV 100 is scanned by a client, and more commodity information is obtained from the client.

Figure 28D:
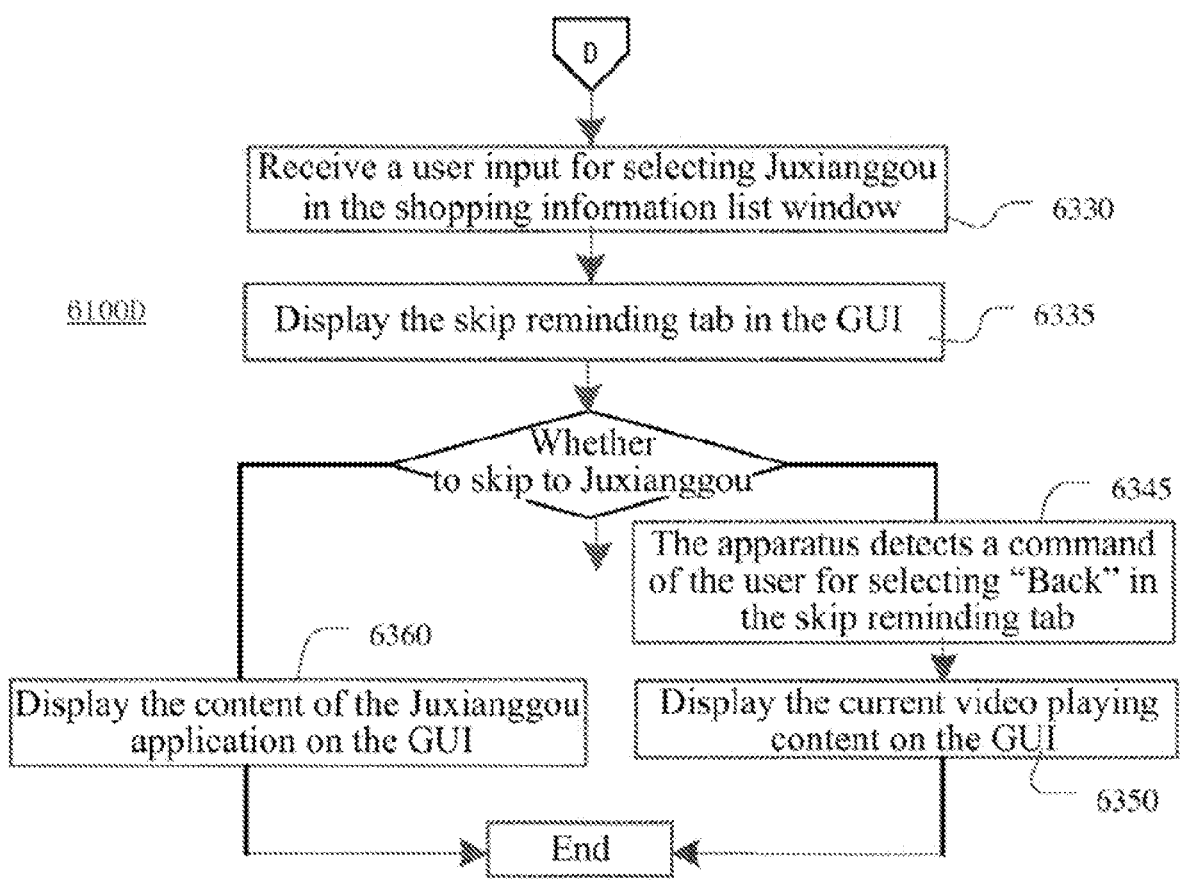
FIG. 28D is an exemplary flow diagram of entering a system-provided shopping application.

FIG. 28D is an exemplary flow diagram (6100D) of entering a built-in shopping application. In some examples, the apparatus receives (at 6330) a user input for selecting a shopping application Juxianggou in the shopping information list window. When the user selects the skip option bar 6013, the system shopping application (such as Juxianggou) is in a to-be-activated state, and the skip reminder option bar 1603 is displayed (at 6335) at the bottom of the currently-played content display layer 160 of the GUI, including a skip prompt (such as skip after 5 seconds) and a back prompt. The system shopping application is activated and skipped to a TV shopping page. Juxianggou application content is displayed on the GUI, so as to facilitate shopping on TV, as described with reference to FIG. 19B (at 6360).

In some embodiments, the apparatus detects (at 6345) a user command, which is selecting "Back" in the skip reminder option bar, and then the GUI (at 6350) exits from the screen shot content display layer 170 and continues to play the program of the current silo. In some examples, the user can exit from the video option bar list window 501 to the previous option bar or exit the screen shot content display layer 170 to browse the video content currently played in the currently-played content display layer 160 in full screen.

As described above, in the present embodiment, in order to meet the requirements for a more visual user interface and a seamless user interaction, when the currently-played content is displayed on the display of the smart TV, in response to an input instruction for screen shot capture, a plurality of option bars are displayed. The plurality of option bars are respectively configured to display thumbnail images of screen shots and recommended content related to content identified based on images of the screen shots, and/or configured to respond to a user interface for input user instruction in association with the screen shots. In this way, when the user is watching the currently-played video content, the screen shot instruction is triggered by the remote controller, voice, touch, etc., and then current video images are captured in real time and identified, so as to identify the content presented in the video images (such as commodities, movie stars, TV station logos and QR codes), and simultaneously recommend information related to the content of the video images.

Embodiment II

FIG. 29 to FIG. 34 illustrate exemplary graphical user interface (GUI) II when a user triggers screen shot capturing. When a video is being played on the display, after an instruction for capturing a screen shot is triggered by clicking the remote controller, touching the screen, making a gesture or inputting a voice and the like, the GUI is displayed on the display, which includes a currently-played content display layer 110 and a screen shot content display layer 120. It should be noted that controlling the operation of the smart TV by the remote controller is taken as an example below.

Figure 29:
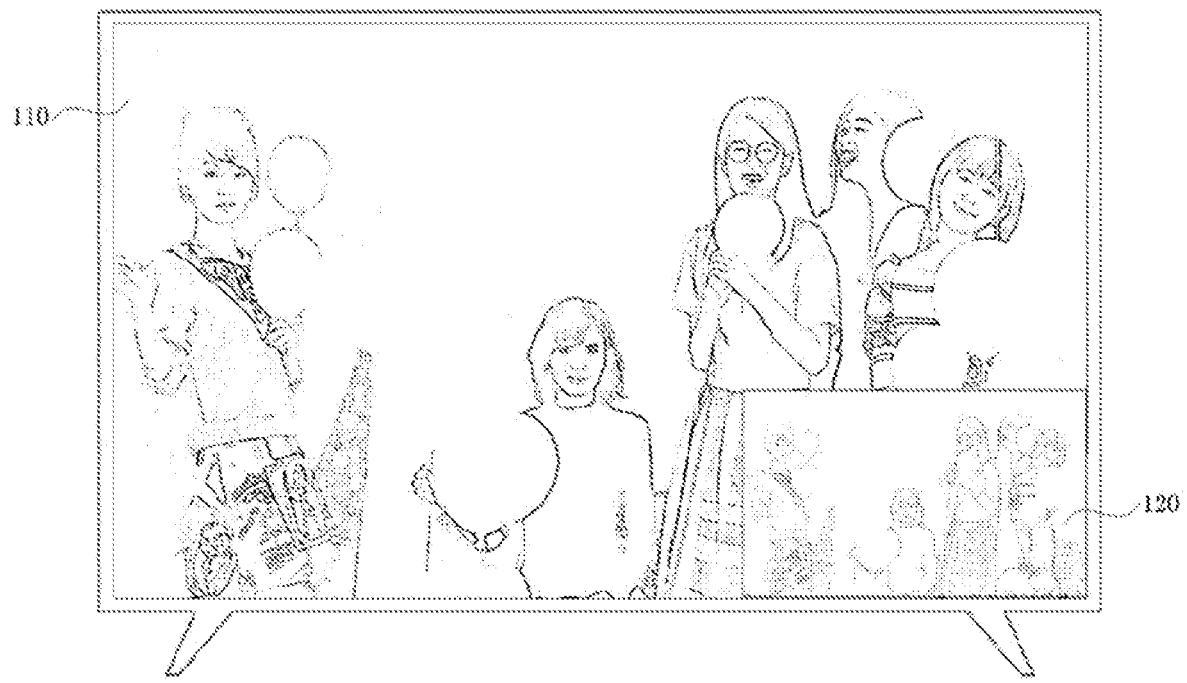
FIG. 29 illustrates a GUI of an example II for selecting and triggering a screen shot.

In particular, as shown in FIG. 29, when the user presses a preset button (such as "Jubao button" or a certain multi-function button) corresponding to the screen shot capturing instruction on the remote controller, a thumbnail image of a screen shot is floating at the bottom side of the screen shot content display layer 120. The thumbnail image comes into the display region with a transitional animation. For example, the transitional animation is how the thumbnail image comes into the display region, where the thumbnail image may come into the display region from top to bottom or from right to left. Further, when the thumbnail image comes into the display region through transitional animation, where the transitional animation further includes a speed of the thumbnail image coming into the display region from bottom to top.

Figure 30:
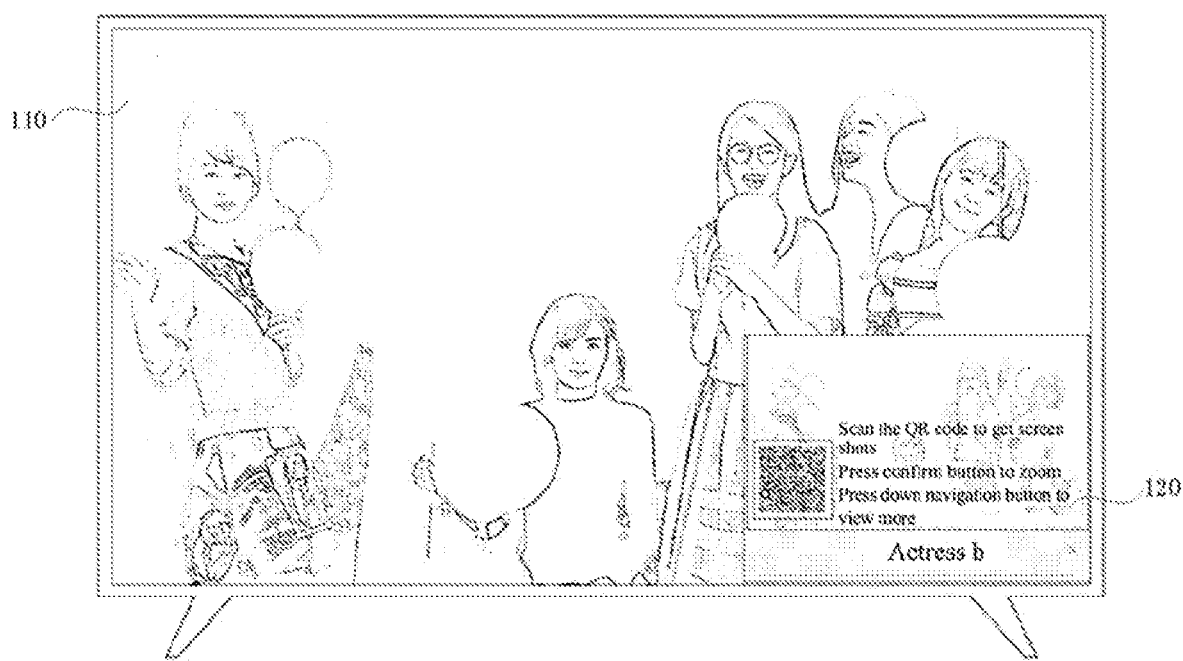
FIG. 30 illustrates an example GUI for displaying a QR code image and user prompt information.

As shown in FIG. 30, in some embodiments, after the thumbnail image is identified by image recognition, a QR code image containing information of the thumbnail image and user prompt information (for example, scan to obtain the screen shot, zoom in by pressing a confirm button and see more by pressing a down button) are displayed above the thumbnail image. The thumbnail image and the QR code image are simultaneously uploaded to a third-party server, so that the user scans the QR code image to download the thumbnail image from the third-party server by using a mobile terminal (such as a mobile phone and a tablet computer) according to the user prompt information. Optionally, after performing image recognition on the thumbnail image to identify objects in the image, a keyword of a first object at the leftmost position of thumbnail image is displayed below the thumbnail image as default. As shown in FIG. 30. The first object "Actress b" on the left of the figure is displayed below the picture thumbnail image.

Optionally, the image recognition process may be locally performed by the smart TV, or performed by a cloud, a server and the like, which is not specifically limited herein.

Here, the thumbnail image includes at least one object which may be one or more of a person, items, or an icon. When the object is a person, its keyword may be the role name of the person in the currently-played video, such as the role G in the TV drama HLS, or a real name of the person, such as an actress b portraying the role G. When the object is an item, its keyword may be a category of the item. For example, when the identified object is a costume, its keyword is shirt, or the brand or name of the item, and when the identified object is an automobile, its keyword is a brand or manufacture of the automobile, for example BMW. When the object is an icon or logo, its keyword may be a name of the icon/logo. For example, when the identified object is a TV station logo, the keyword is B TV station. Of course, the present embodiment does not limit the keywords of the objects in the thumbnail image.

As shown in FIG. 31A to FIG. 32G, when the user continues to operate the remote controller, the screen shot content display layer 120 displays a thumbnail image of the screen shot, recommended content related to the content identified based on the image of the screen shot, and/or user interfaces for inputting control instructions in association with the screen shot capturing, such as instruction input interfaces "Voice search" and "Screen shot share."

Figure 31A:
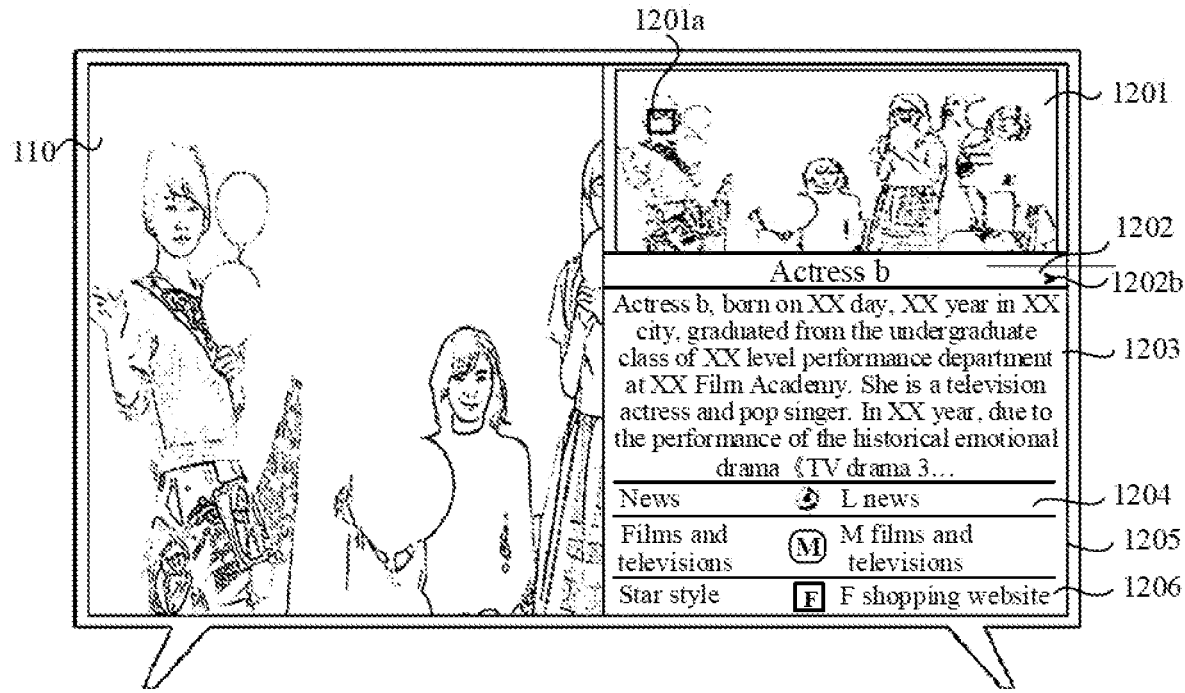
FIGS. 31A to 31D illustrate an example GUI for selecting different objects of a screen shot picture and displaying recommended content related to the objects.

Specifically, when the user clicks the down button on the remote controller to move the current focus to the keyword of the object displayed below the thumbnail image, such as the "Actress b" in FIG. 30, the display displays the GUI as shown in FIG. 31A. In this GUI, the screen shot content display layer 120 is a set including a plurality of option bars, including a screen shot display bar 1201 configured to display a thumbnail image of a screen shot and a plurality of recommended content bars 1202 to 1209 configured to display recommended items related to the content identified on the basis of the image of the screen shot. Optionally, the screen shot display bar 1201 is located on the top side of the screen shot content display layer (the upper right edge of the display), and the recommended content display bars 1202 to 1209 are located on the bottom side of the screen shot content display layer (the lower right edge of the display).

Figure 31B:
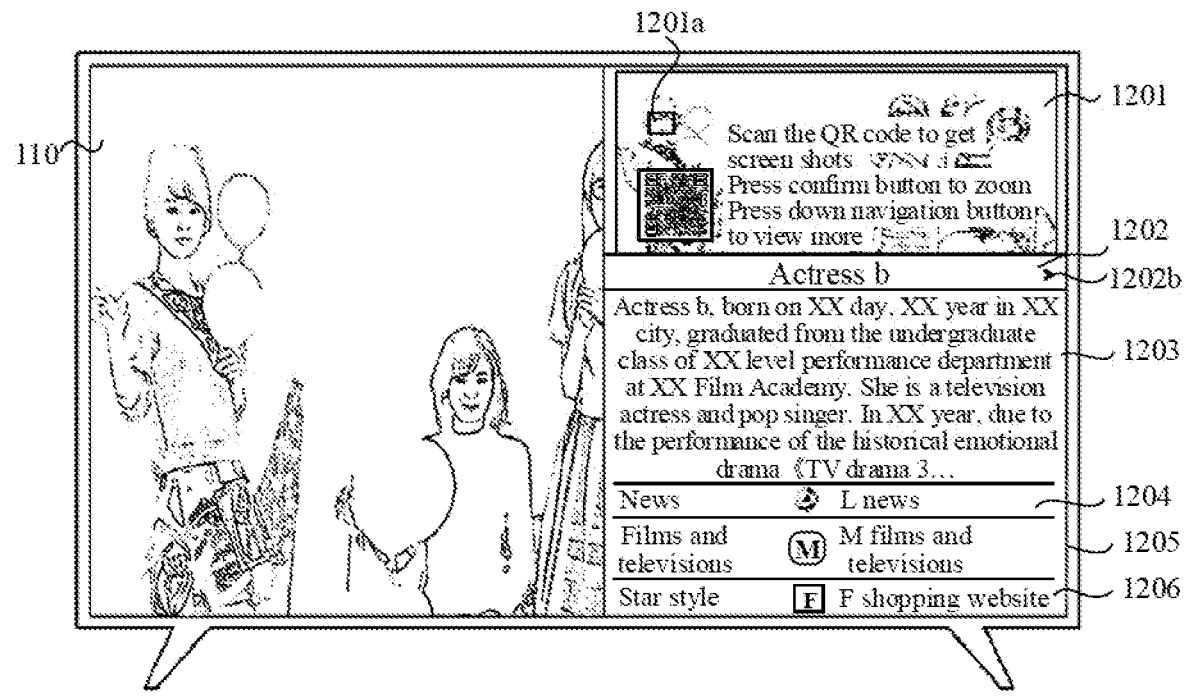

The QR code image above the picture thumbnail image and the user prompt information in the screen shot display bar 1201 are hidden, as shown in FIG. 31A. It should be noted that when the current focus is moved to the screen shot display layer 1201, the QR code image and the user prompt information may be displayed above the thumbnail image, as shown in FIG. 31B, so that the user can use the mobile terminal to scan the QR code image to acquire the thumbnail image according to the user prompt information in the GUI as shown in FIG. 31B.

The plurality of recommended content display bars may include a keyword option bar 1202 for the object in the thumbnail image, and at least one kind of option bars 1203 to 1209 related to the content identified on the basis of the object. The recommended content display bars here may be Baike, news, films, star style, shopping and program guide, which are related to the content identified based on the object in FIG. 32A.

When the thumbnail image is identified as containing a plurality of objects, the focus frame is displayed on the first object at the leftmost of the thumbnail image of the screen shot display bar 1201 as default, and the keyword option bar 1202 displays a keyword of the first object, and the at least one kind of option bars 1203 to 1209 display the recommended content related to the first object. Here, the size, the shape, the color and other display effects of the focus frame are not specifically limited.

Exemplarily, in FIG. 31A, the thumbnail image is identified as containing five figures, and the positions of the five figures in this image are presented from left to right, and the keywords of these figures, from left to right, are Actress b, Actress c, Actress d, and so on.

In an implementation, when the user clicks the down button on the remote controller to move the current focus to the keyword "Yang Zi", which is name of a Chinese actress, of the object displayed below the picture thumbnail image in FIG. 30, the GUI as shown in FIG. 31A is displayed. In the screen shot content display layer of the GUI, the screen shot display bar 1201 displays, by default, a rectangular focus frame 1201a on the face of the role Actress b at the leftmost of the thumbnail image, and the keyword option bar 1202 also synchronously displays the keyword Actress b of the person object at the leftmost of the thumbnail image, and at the same time, the recommended content display bars 1203 to 1209 also synchronously display recommended content related to Yang Zi. For example, the Baike option bar 1203 displays the resume and introduction of the role Actress b.

Figure 31C:
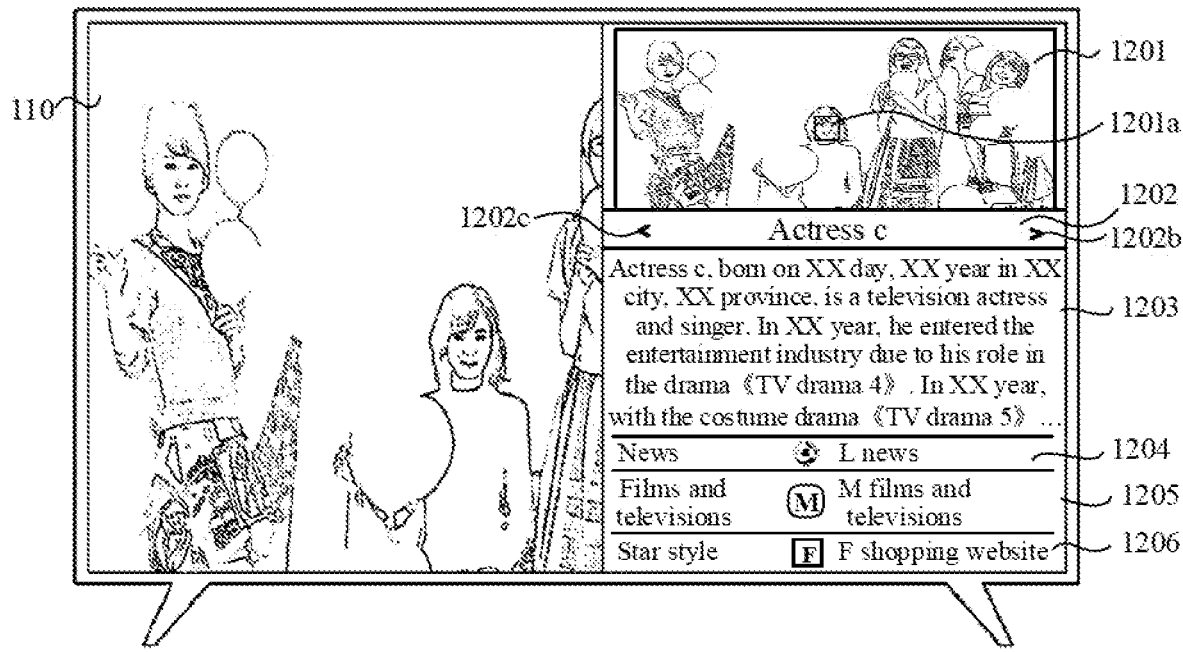

Further, in FIG. 31C, in the screen shot display bar 1201, when the user presses the right button on the remote controller, the focus frame 1201a moves to the right and is displayed on the face of object actress c who is next to Actress b on the right. At the same time, the keyword option bar 1202 is updated to display the keyword "Actress c" of the next person object, and the recommended content display bars 1203 to 1209 are also updated to display recommended content related to the next person object actress c. For example, the C Baike option bar 1203 displays the resume and introduction of the role actress c. The news option bar 1204 displays the latest news of the role actress c.

Figure 31D:
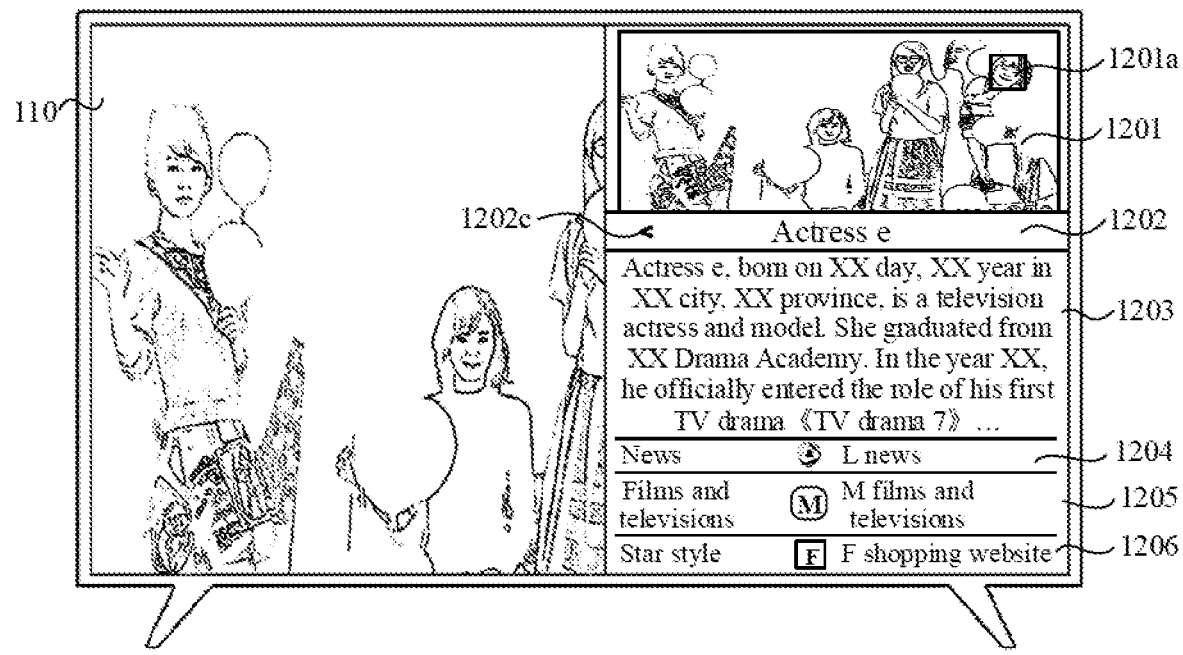

Further, in the screen shot display bar 1201, according to positions of the five figures in this image from left to right, when the user continues to press the right button on the remote controller, the focus frame 1201a moves right sequentially and is displayed on the faces of the person object actress a, actress d and actress e. At the same time, the keyword option bar 1202 is also updated to display the keyword of the object selected by the current focus frame, and the recommended content display bars 1203 to 1209 are also updated to display recommended content related to the object selected by the current focus frame. In FIG. 31D, when the user presses the right button on the remote controller, the current focus frame 1201a moves to the face of the person object actress e at the rightmost of the thumbnail image. The keyword option bar 1202 is synchronously updated to display the keyword "Actress e" of this object, and the recommended content display bars 1203 to 1209 are also updated to display recommended content related to the object actress e. For example, the C Baike option bar 1203 displays the resume and introduction of the role actress e.

In this way, when the user operates the remote controller to enable the current focus frame to select different objects in the thumbnail image in the screen shot display bar, the smart TV updates the keyword option bars in response to a user input indicated by the focus frame to update and display the keywords of the objects selected by the current focus frame, and at the same time, the recommended content display bars are also updated to display the plurality of kinds of recommended content related to the objects selected by the current focus frame, so that the user can conveniently learn about various kinds of information of the different objects in a video screen shot, and the recommendation function of the smart TV is enriched.

In another implementation, as shown in FIGS. 31A to 31D, the keyword option bar 1202 also displays direction move indicators 1202b and 1202c to prompt the user that the thumbnail image also contains other objects in addition to the object corresponding to the currently-displayed keyword in the keyword option bar and the position relationships between the other objects and the object corresponding to the currently-displayed keyword.

In FIG. 31A, the keyword option bar 1202 displays the keyword "Actress b" of the object at the leftmost of the thumbnail image, and the direction move indicator 1202b for moving right is displayed on the right of the keyword option bar 1202, which represents that there are also other person objects on the right side of the person object actress b in the thumbnail image. Furthermore, the focus frame 1201a is synchronously displayed on the face of the object actress b in the screen shot display bar 1202, and the recommended content display bars 1203 to 1209 also synchronously display the recommended content related to the object actress b.

Further, when the user operates the remote controller to move the focus and select the direction move indicator 1202*b* in FIG. 31A, the display displays the GUI as shown in FIG. 31C. In the screen shot content display layer of the GUI, the keyword option bar 1202 displays the keyword "Actress c" of the object located closest to Actress b on the right. At the same time, the direction move indicator 1202*c* for moving left is displayed on the left of the keyword option bar 1202, which represents that there are also other person objects on the left side of the person object actress c in the thumbnail image, and the direction move indicator 1202*b* for moving right is displayed on the right of the keyword option bar 1202, which represents that there are also other objects on the right side of the object actress c in the thumbnail image. At this time, in the screen shot content display layer, the focus frame 1201*a* is synchronously displayed on the face of the object actress c in the screen shot display bar 1201, and the recommended content display bars 1203 to 1209 also synchronously display the recommended content related to the object actress c.

In FIG. 31C, when the user operates the remote controller to move the focus and select the direction move indicator 1202*c* in FIG. 31C, the display displays the GUI as shown in FIG. 31A, and descriptions thereof are omitted herein.

In FIG. 31C, further, when the user operates the remote controller to move the focus and select the direction move indicator 1202*b* in FIG. 31C, the keyword option bar 1202 sequentially displays the keywords "Actress b", "Actress c", "Actress d", and so on, according to the order position of the five objects in this image from left to right. At the same time, the screen shot content display bar 1202 is also updated to display the focus frame 1201*a* on the face of the object matched with the keyword in the current keyword option bar 1202, and the recommended content display bars 1203 to 1209 are also updated to display the recommended content related to the person object matched with the keyword of the current keyword option bar 1202.

For example, when the user operates the remote controller and selects the direction move indicator 1202*b*, the display displays the GUI as shown in FIG. 31D. In the screen shot content display layer of the GUI, the keyword option bar 1202 displays the keyword "Actress e" of the object at the rightmost of the thumbnail image, and the direction move indicator 1202*c* for moving left is displayed on the left of the keyword option bar 1202, which represents that there are also other objects on the left side of the object actress e in the thumbnail image. At this time, in the screen shot content display layer, the focus frame 1201*a* is synchronously displayed on the face of the object actress e in the screen shot display bar 1201, and the recommended content display bars 1203 to 1209 also synchronously display the recommended content related to the object actress e.

In this way, when the user operates the remote controller to move the current focus and select the direction move indicator in the keyword option bar, the smart TV displays different keywords in the keyword option bar in response to a user input for selecting the current focus. Meanwhile, on the thumbnail image of the screen shot display bar, the focus frame selection indicator is updated and displayed on the face of the person object matched with the keyword in the current keyword option bar, and the recommended content display bars are also updated to display the plurality of kinds of recommended content related to the person object matched with the keyword in the current keyword option bar, so that the user can conveniently learn about various kinds of information of the different objects in a video screen shot, and the recommendation function of the smart TV is enriched.

It should be noted that if the thumbnail image is identified as containing a plurality of objects, when the focus frame selection indicator is displayed on the object at the leftmost of the thumbnail image of the current screen shot display bar, the keyword option bar only displays the direction move indicator for moving right without displaying the direction move indicator for moving left, so as to tell the user that there are also other objects on the right side of the object in the thumbnail image and no other objects on the left side of the object.

When the focus frame selection indicator is displayed on the object in the middle of the thumbnail image of the current screen shot display bar, the keyword option bar displays both the direction move indicator for moving right and the direction move indicator for moving left, so as to tell the user that there are other objects on both the right side and the left side of the object in the thumbnail image.

Similarly, when the focus frame selection indicator is displayed on the object at the rightmost of the thumbnail image of the current screen shot display bar, the keyword option bar only displays the direction move indicator for moving left without displaying the direction move indicator for moving right so as to tell the user that there are also other objects on the left side of the object in the thumbnail image and no other objects on the right side of the object.

It should be noted that in a case where only one object is identified in the thumbnail image, no focus frame selection indicator is displayed in the thumbnail image of the screen shot display bar, and the keyword option bar may not display the direction move indicators while displaying the keyword of the object.

Figure 32A:
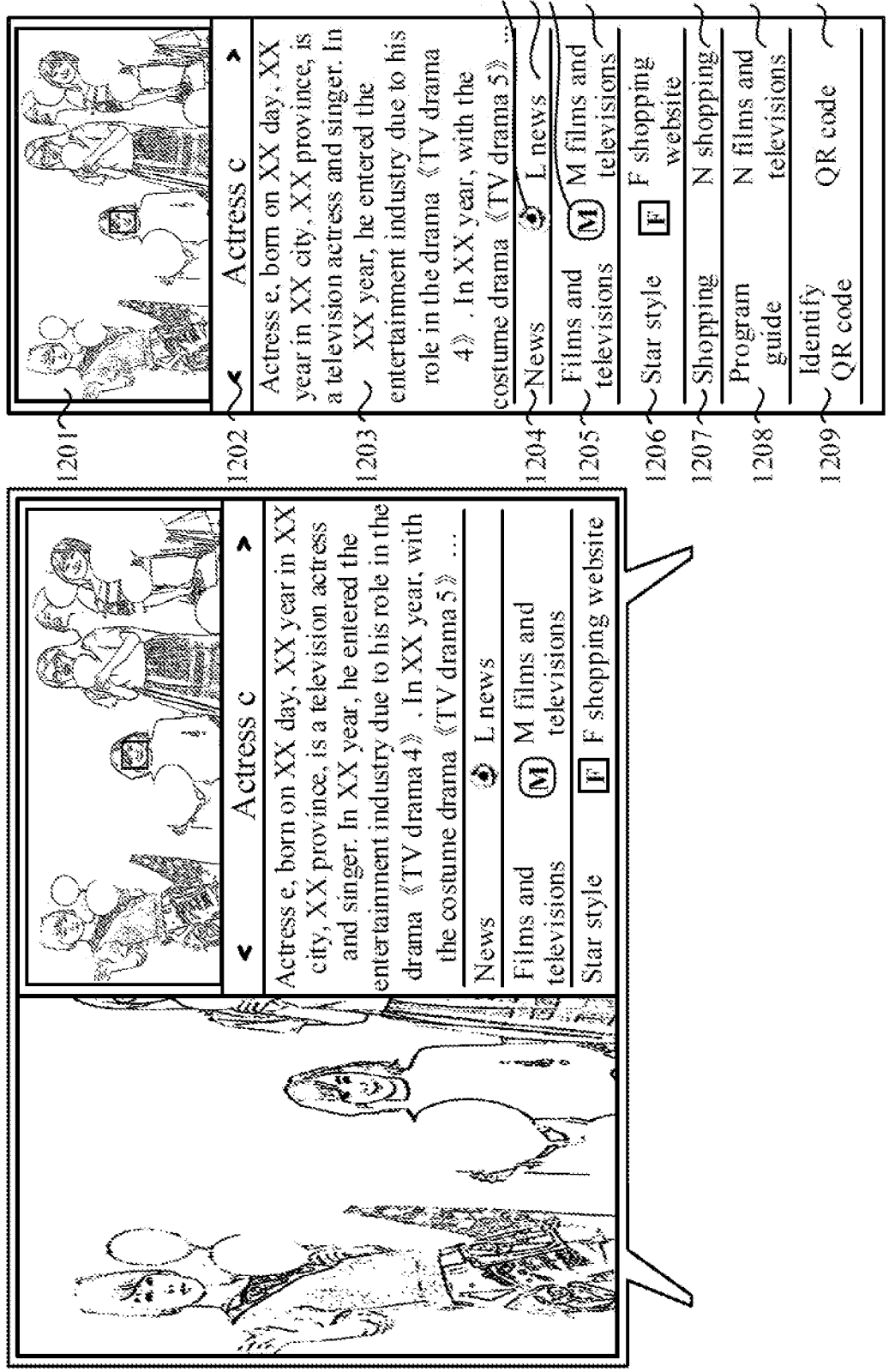
FIGS. 32A to 32G illustrate an example GUI for selecting different kinds of recommended content display bars.

The GUI as shown in FIG. 32A is taken as an example. A brief introduction is made to different kinds of recommended content in a plurality of recommended content display bars with reference to FIGS. 32B to 32G.

In FIG. 32A, when the square focus frame 1201*a* is displayed on the face of the second object from the left of the thumbnail image of the screen shot display bar 1201, the keyword option bar 1202 displays the keyword "Actress c" of the second object. Meanwhile, the recommended content display bars 1203 to 1209 synchronously display a plurality of kinds of recommended content related to the second object. The kinds of recommended content here can be Baike, news, movies and televisions, star style, shopping, program guide, QR code identification and the like.

In some examples, when the square focus frame 1201*a* is displayed on the face of the second object actress c from the left of the thumbnail image of the screen shot display bar 1201, in the plurality of recommended content display bars, the Baike option bar 1203 is in a unfolded state as default and displays brief Baike information, such as the basic introduction, the personality and the current living condition, of the second person object actress c, and other kinds of option bars 1204 to 1209 are folded as default, such as the news option bar 1204 and the films and televisions option bar 1205.

Or, when the user operates the remote controller to move the current focus to the keyword option bar 1202 that displays the keyword "Actress c" of the object, in the plurality of recommended content display bars, the Baike option bar 1203 is unfolded and displays brief Baike information of the second object actress c, and other kinds of option bars 1204 to 1209 are still folded, such as the news option bar 1204 and the films and televisions option bar 1205.

Figure 32B:
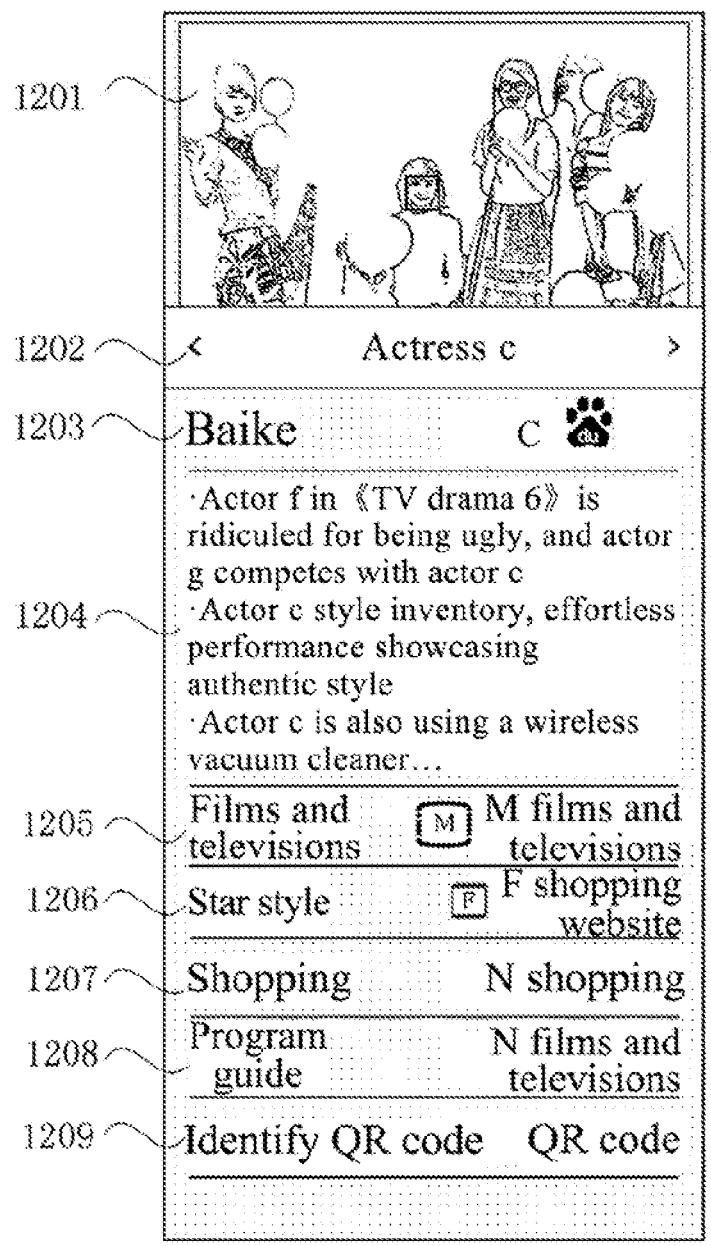

Next, in FIG. 32B, when the user operates the remote controller to move the current focus to the news option bar 1204, in the plurality of recommended content display bars, the news option bar 1204 is unfolded and displays news & gossip information related to the second object actress c, such as a brief description of the search content, including a plurality of latest news related to the object actress c, and other kinds of option bars 1203 and 1205 to 1209 are still folded, such as the Baike option bar 1203 and the films and televisions option bar 1205.

Figure 32C:
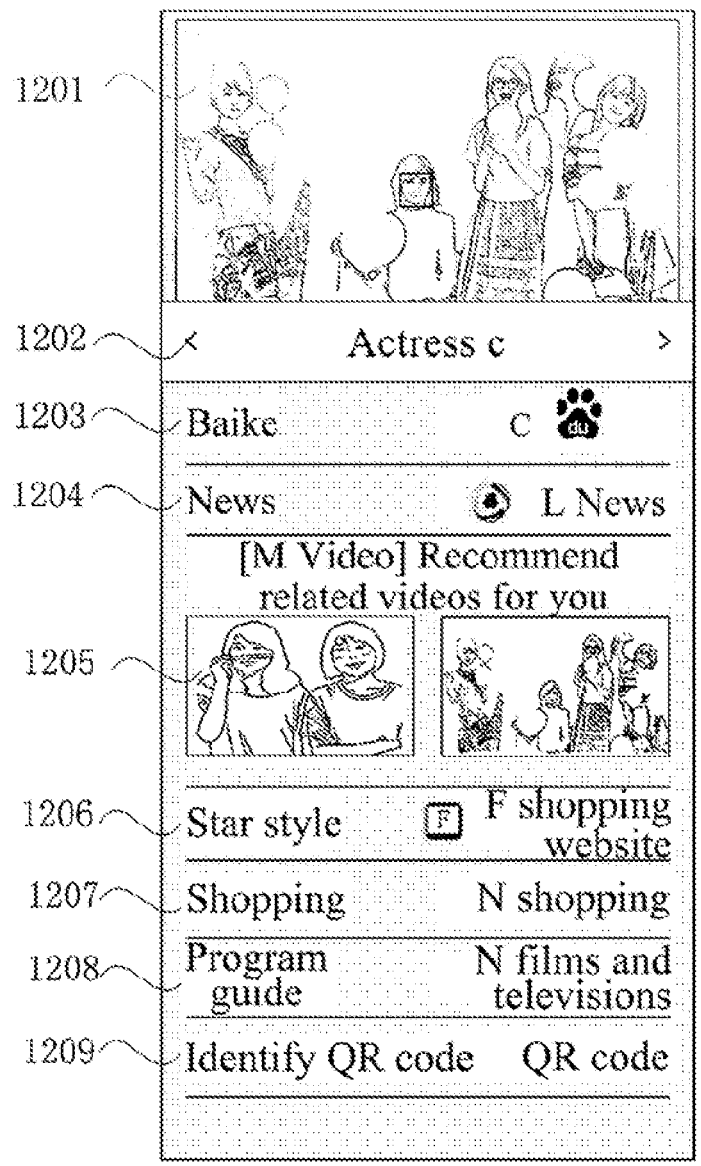

Next, in FIG. 32C, when the user operates the remote controller to move the current focus to the films and televisions option bar 1205, in the plurality of recommended content display bars, the films and televisions option bar 1205 is unfolded and displays other films and televisions portrayed by the second object actress c, such as videos related to the search content and recommended by "A video website", and other kinds of option bars 1203 to 1204 and 1206 to 1209 are still in folded state, such as the Baike option bar 1203 and the films and news option bar 1204.

Figure 32D:
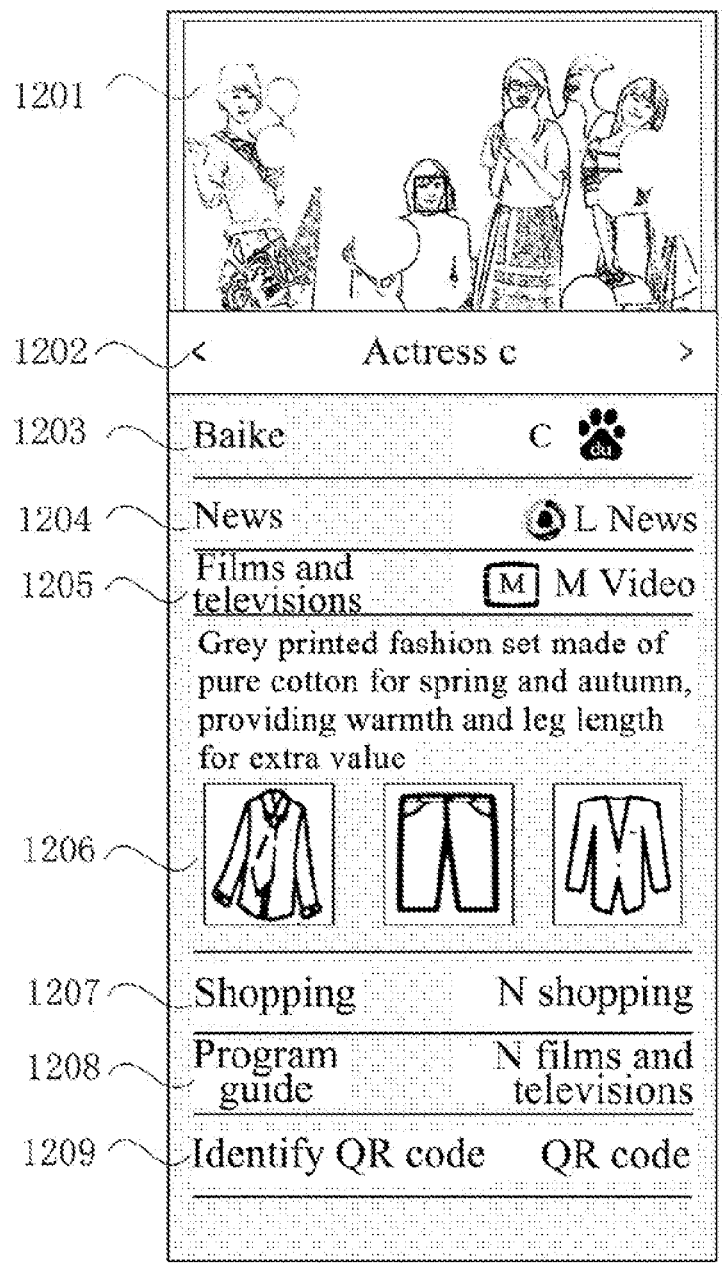

Next, in FIG. 32D, when the user operates the remote controller to move the current focus to the star style option bar 1206, in the plurality of recommended content display bars, the star style option bar 1206 is unfolded and displays same or similar costumes and jewelry as those on the second object actress c in the thumbnail image, such as a shirt, pants and a jacket worn by the role I portrayed by the actress c in the currently-played video, and other kinds of option bars 1203 to 1205 and 1207 to 1209 are still in folded state, such as the Baike option bar 1203 and the films and news option bar 1204.

Figure 32E:
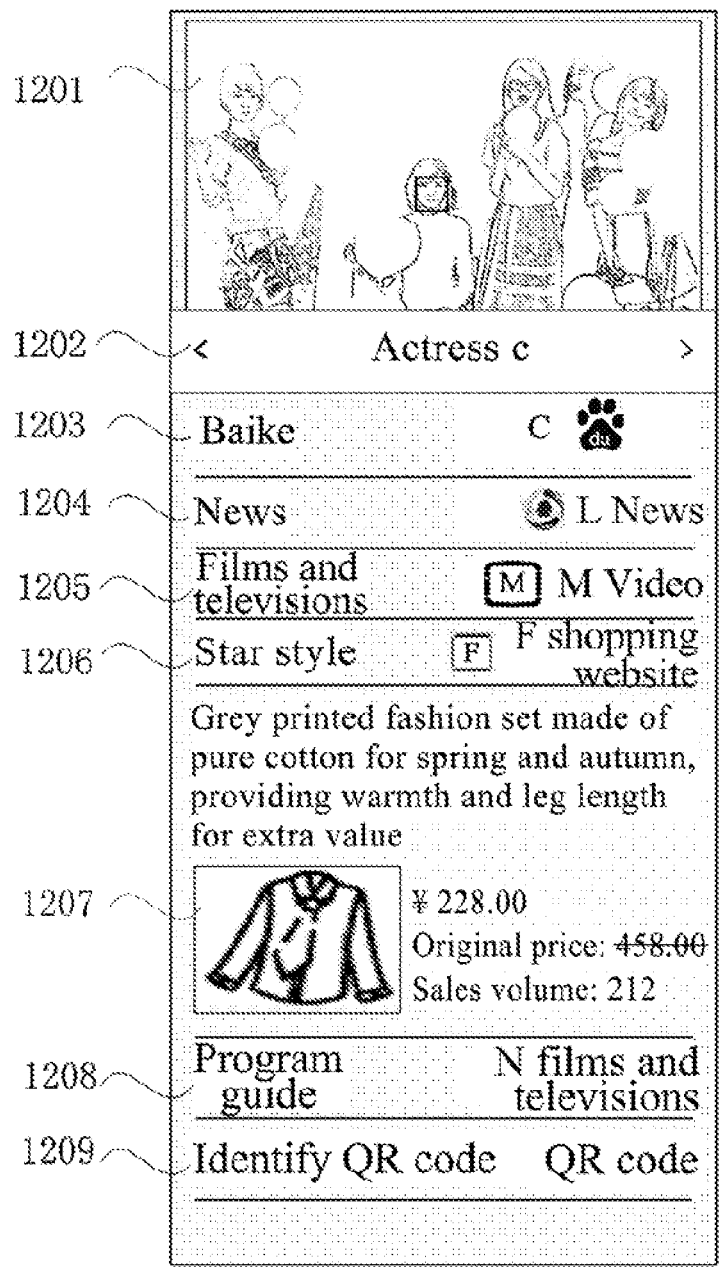

Next, in FIG. 32E, when the user operates the remote controller to move the current focus to the shopping option bar 1207, in the plurality of recommended content display bars, the shopping option bar 1207 is unfolded and displays same or similar costumes and jewelry as those on the second object actress c in the thumbnail image. For example, the unfolded option bar displays the commodity name on the top side, displays the commodity picture of the shirt worn by the role I portrayed by the actress c in the currently-played video on the left of the bottom side, and displays a price of the shirt on the right of the bottom side, and other kinds of option bars 1203 to 1206 and 1208 to 1209 are still in folded state, such as the Baike option bar 1203 and the films and news option bar 1204.

Figure 32F:
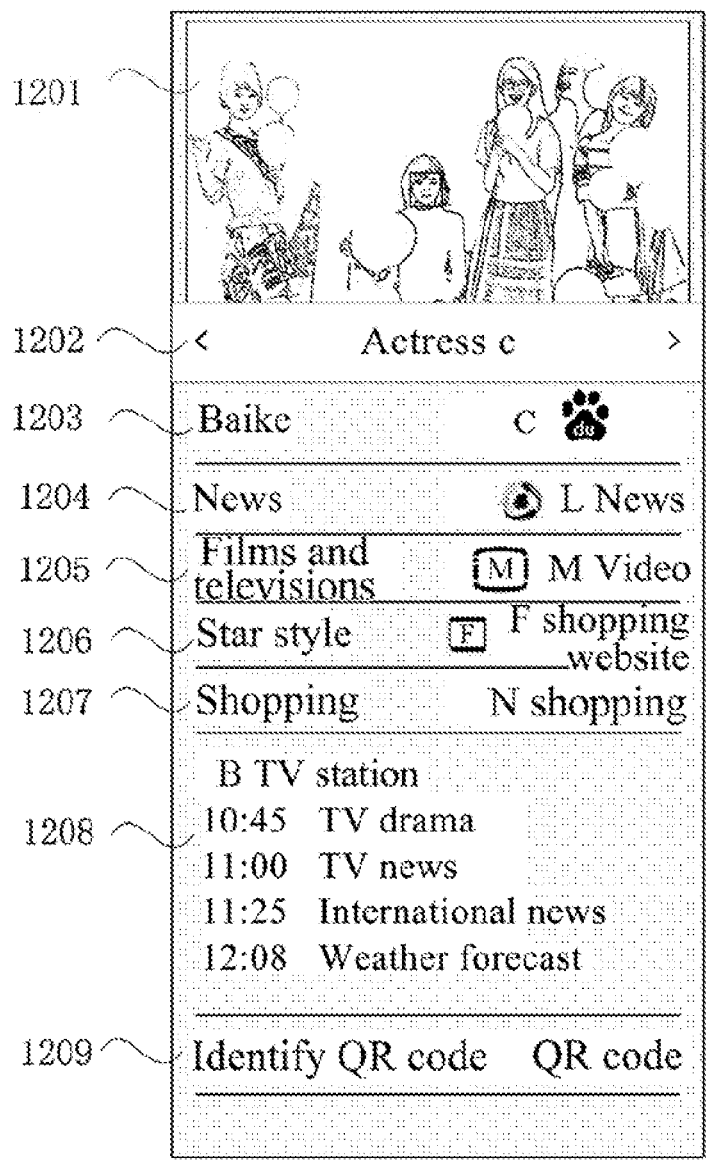

Next, in FIG. 32F, when a user operates the remote controller to move the current focus to the program guide option bar 1208, in the plurality of recommended content display bars, the program guide option bar 1208 is unfolded and displays a channel, obtained by identifying the TV station logo in the thumbnail image, of the currently-played video. For example, if the channel is the Dragon TV, a program guide introduction and program details of the Dragon TV are displayed, including, but not limited to, program names and play time, and other kinds of option bars 1203 to 1207 and 1209 are in folded state, such as the Baike option bar 1203 and the films and news option bar 1204.

Figure 32G:
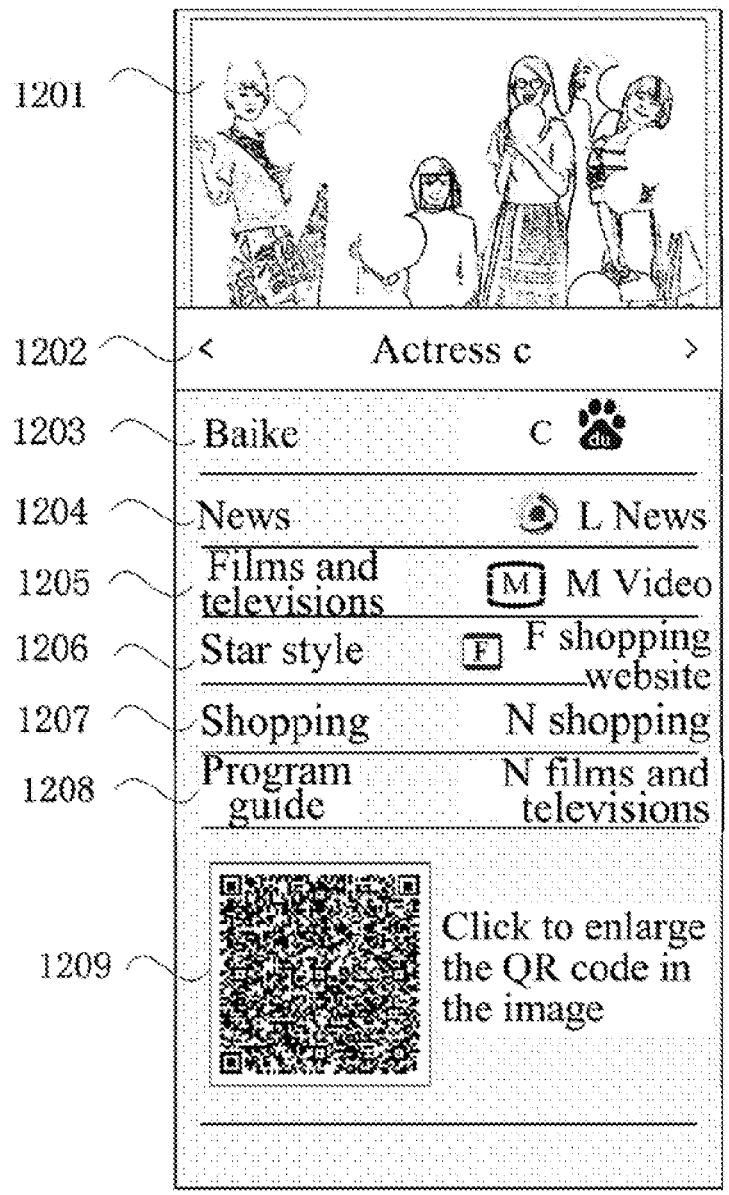

Next, in FIG. 32G, when a user operates the remote controller to move the current focus to the QR code identification option bar 1209, in the plurality of recommended content display bars, the QR code identification option bar 1209 is unfolded and displays a QR code image containing thumbnail image information of the screen shot and user prompt information. For example, a QR code in the image is clicked to be enlarged. Other kinds of option bars 1203 to 1208 are in folded state, such as the Baike option bar 1203 and the films and news option bar 1204.

Taking FIG. 32A as an example, when the Baike option bar 1203 is in unfolded state, it directly displays the brief description of the search content, including a webpage recommended content from C Baike. Optionally, when the Baike option bar 1203 is in unfolded state, it may also include two bars. The first bar displays "Baike" of the recommended content on the left, and displays the website icon and the website name of the search source "C" on the right side, wherein the LOGO "C" represents the source of the recommended content. The second bar displays the brief description of the search content.

FIG. 32B is taken as an example. When the news option bar 1204 is in unfolded state, which directly displays the brief description of the search content, including a webpage recommended content from Tencent News. Optionally, when the Baike option bar 1204 is in unfolded state, it may also include two bars. The first bar displays "Baike" of the recommended content on the left, and displays a website icon and a website name of the search source "C" on the right side, wherein the LOGO "C" represents the source of the recommended content. The second bar displays a brief of the search content.

When other kinds of option bars are in folded state, they may display the kinds of the recommended content in the option bars and/or the sources of the recommended content. Optionally, the source of the recommended content may be the website icon and/or the website name. For example, the news option bar 1204 in FIG. 32A is in folded state, it displays the kind "news" of the recommended content and the source "L news" of the recommended content. The source of the recommended content may be displayed as "L news" 1204a and an icon 1204b of the L News. For another example, the films and televisions option bar 1205 is in folded state, it displays the kind "films and televisions" of the recommended content and the source "M video website" of the recommended content. The source of the recommended content may be displayed as "M video website" 1205a and an icon 1205b of the M video website. For another example, the shopping option bar 1207 is in folded state, it displays the kind "shopping" of the recommended content and the source "N shopping website" of the recommended content. The source of the recommended content may be displayed as "N shopping website" 1207a only.

That is, the recommended content display bar may be at least divided into an upper bar and a lower bar: a navigation bar and a content bar. The navigation bar displays the kind of the recommended content and/or the source of the recommended content, and the content bar displays a brief of the search content of a specific kind. When the recommended content display bar is in unfolded state, the navigation bar may be in a hidden or displayed state, which may be set according to the need of the user. When the recommended content display bar is in folded state, the navigation bar may be displayed only to prompt the user to learn about different kinds of recommended content related to the object.

It should be noted that in FIG. 32A, the source of the recommended content is actually an application icon and/or an application name, and the user can select to activate the corresponding application, such as the sources of the recommended content: "C website", "L news website", "M video website", "F shopping website", "N shopping website", "N films and televisions website" and "QR code".

It should be further noted that the user can select to set the sources of the recommended content in the plurality of recommended content display bars. For example, the news option bar 1204 may provide news & gossip content coming from different search sources such as L news, C news, E news and D news and related to the content of the thumbnail image. The films and televisions option bar 1205 may provide film and television work content coming from different search sources such as M film and television website, O film and television website, P film and television website and N film and television website and related to the content of the picture thumbnail image. The star style option bar 1206 may provide star-style costume commodity content coming from different search sources such as F shopping website, Q shopping website and R shopping website and related to the content of the thumbnail image. The user can set the search sources of different kinds of recommended content to meet demands.

As previously described, the GUI may be presented as a display object, the screen shot content display layer of which has a plurality of option bars. When the user selects the option bars via the remote controller, various kinds of search content may be viewed. For example, when selected, each option bar makes a list of a description, a summary and a related text or a image descriptor. The content profile is displayed in the content display layer, and the user can move the current focus frame onto an icon or a user interface element through the remote controller. When moving the focus, a user can select the content corresponding to the option bar through the remote controller again, and the content is presented as a form that a plurality of information windows are superimposed, so that the user can see more detailed content associated therewith, as shown in FIGS. 33A to 33E and FIGS. 34A to 34C.

Figure 33A:
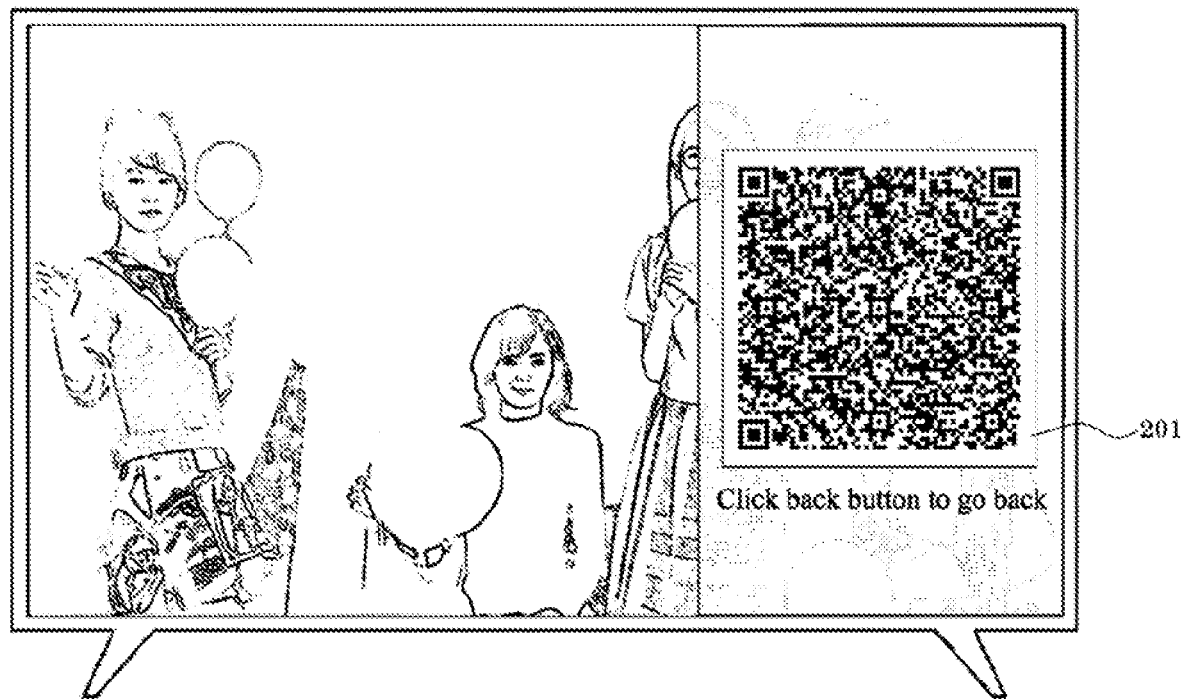
FIGS. 33A to 33E illustrate an example GUI of recommended content information windows displayed by selecting different kinds of recommended content display bars.

FIG. 33A illustrates a GUI example which is operatable by a user in accordance with a user prompt information in FIG. 30 or presents a display interface after a user selects the screen shot display bar 1201. In the illustrated embodiment, when the user clicks the confirm button of the remote controller according to the user prompt information in FIG. 30, or when the user moves the focus onto the thumbnail image of the screen shot display bar (as shown in FIG. 31B) and clicks the confirm button of the remote controller, a QR code image information window 201 containing a QR code image is displayed on the screen shot content display layer. The QR code image information window 201 floats above the screen shot content display layer, and an interface, displaying the various option bars, of the screen shot content display layer is hidden. The user scans the QR code image through a device having a scanning function, such as a mobile phone, and the image of a screen shot may be locally saved in the device or shared to others.

Figure 33B:
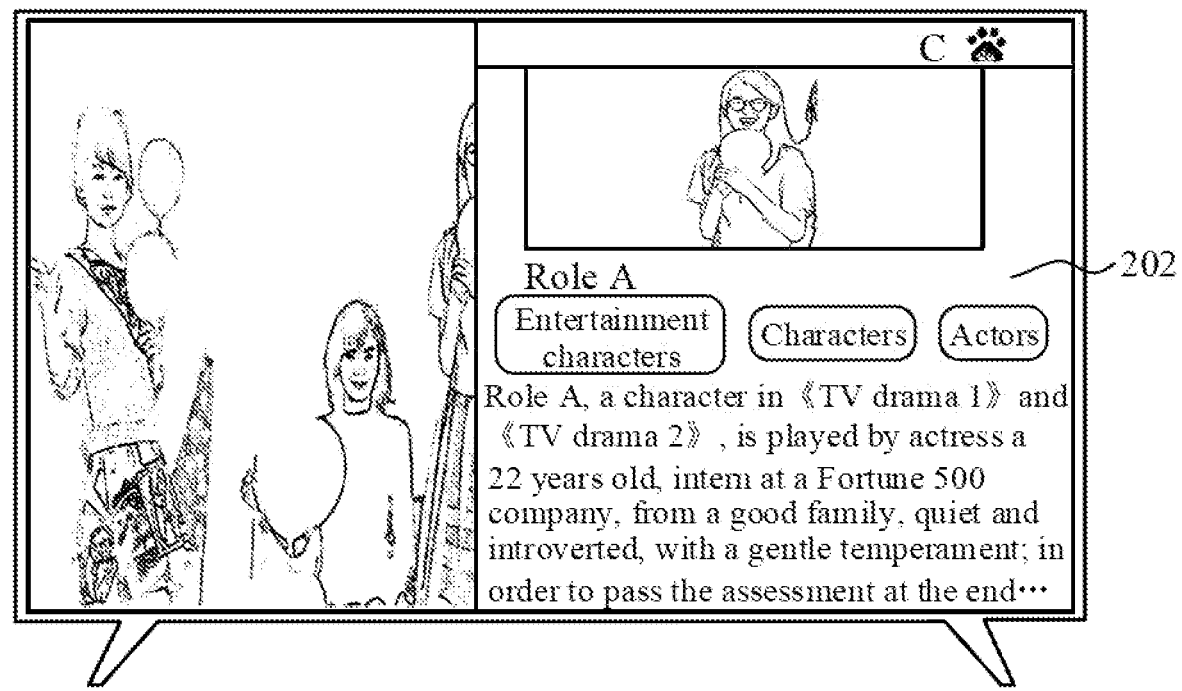

FIG. 33B illustrates a GUI example for selecting the Baike option bar 1203 by a user. In the illustrated embodiment, when the user moves the focus to the Baike option bar and clicks the confirm button of the remote controller, a C Baike information window 202 is displayed on the screen shot content display layer. The C Baike information window 202 floats above the screen shot content display layer, and an interface, displaying the various option bars, of the screen shot content display layer is hidden. The user clicks the up and down buttons of the remote controller to browse the detailed Baike information of the object in a scrolling manner.

Figure 33C:
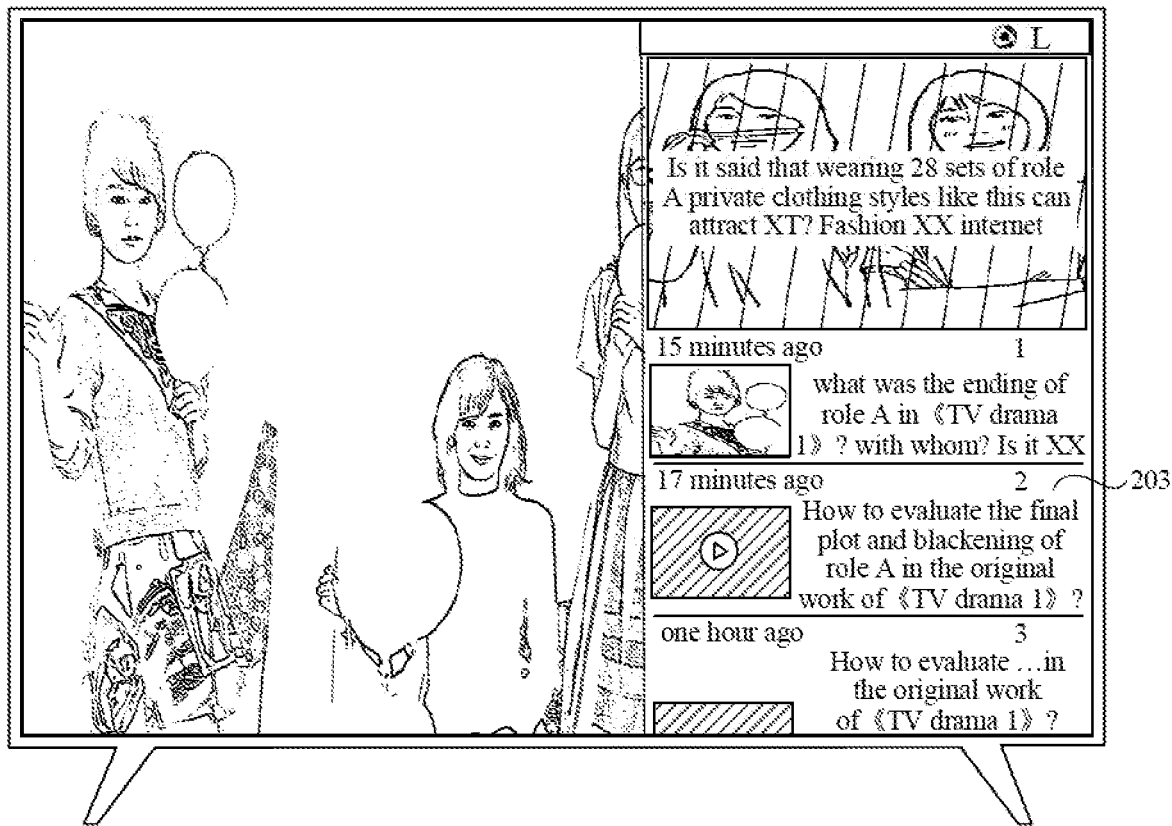

FIG. 33C illustrates a GUI example for selecting the news option bar 1204 by a user. In the illustrated embodiment, when the user moves the focus to the news option bar and clicks the confirm button of the remote controller, an L news information window 203 is displayed on the screen shot content display layer. The L news information window 203 floats above the screen shot content display layer, and an interface, displaying the various option bars, of the screen shot content display layer is hidden. The user clicks the up and down buttons of the remote controller to browse and select different news event list content.

Further, when the user wishes to learn about more detailed content of a certain piece of news, the user can move the focus to the news event sub-option bar, and then clicks the confirm button of the remote controller to activate and confirm one news detail information window 2031. The news detail information window 2031 floats above the L news information window 203, and the interface, displaying the various option bars, of the screen shot content display layer is still hidden. For example, the user moves the focus onto the news event in FIG. 33C, and presses the confirm button of the remote controller to display the GUI example as shown in FIG. 34. The news details described by the selected news event are all unfolded, including the titles, post time, texts and pictures of all the news records, while only the titles and part of the pictures are displayed for unselected news events. When the user presses the back button of the remote controller on the news detail information window, the page goes back to the L news information window. When the user continues to press the back button of the remote controller on the L news information window, the page goes back to the interface displaying the various option bars.

Figure 33D:
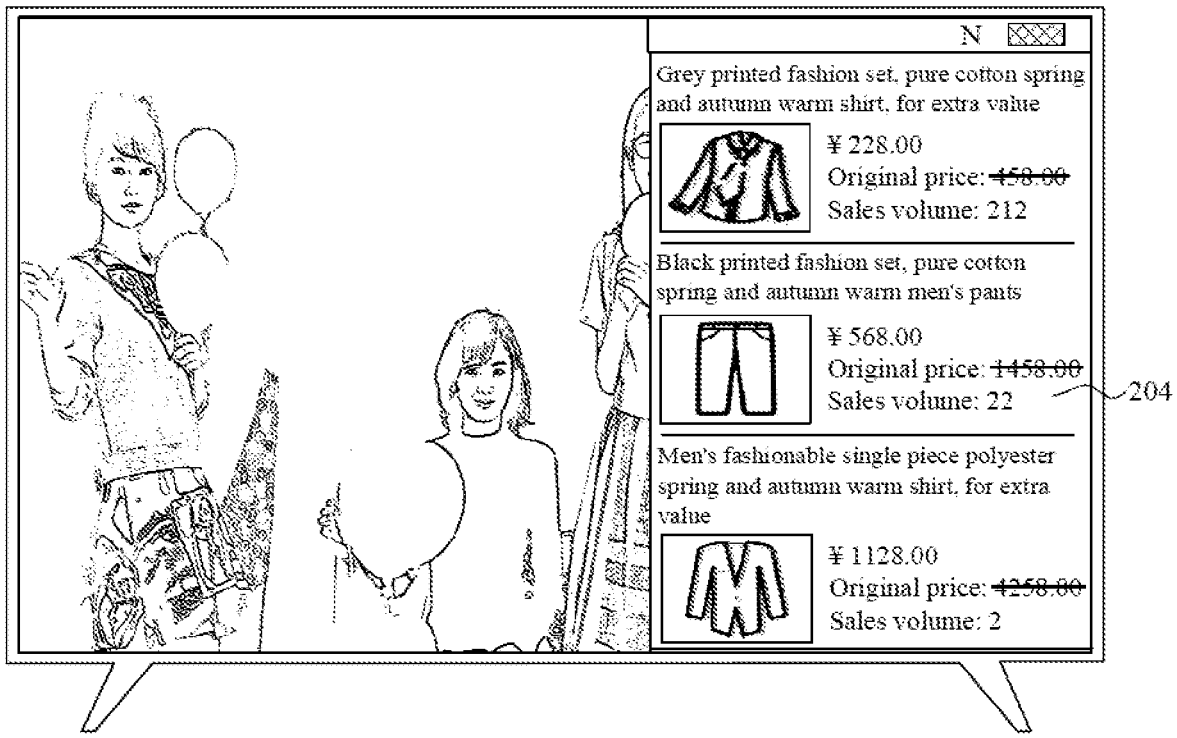

FIG. 33D illustrates a GUI example for selecting the shopping option bar 1207 by a user. In the illustrated embodiment, when the user moves the focus to the shopping option bar and presses the confirm button of the remote controller, a shopping information window 204 including a plurality of commodity introduction sub-option bars are displayed on the screen shot content display layer. The shopping information window 204 floats above the screen shot content display layer, and an interface, displaying the various option bars, of the screen shot content display layer is hidden. The user presses the up and down buttons of the remote controller to browse and select different commodity list content.

Figure 34A:
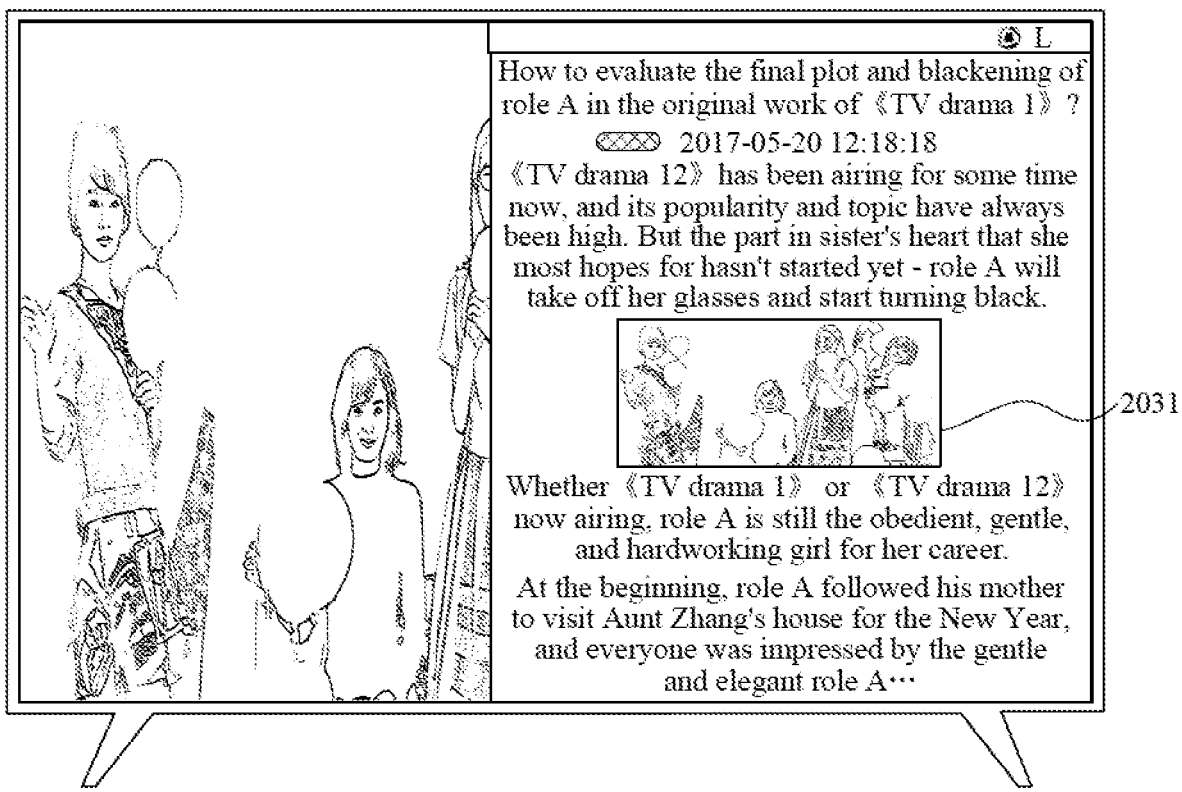
FIGS. 34A to 34C illustrate an example GUI of content detail information windows displayed by selecting different recommended content information windows.
Figure 34B:
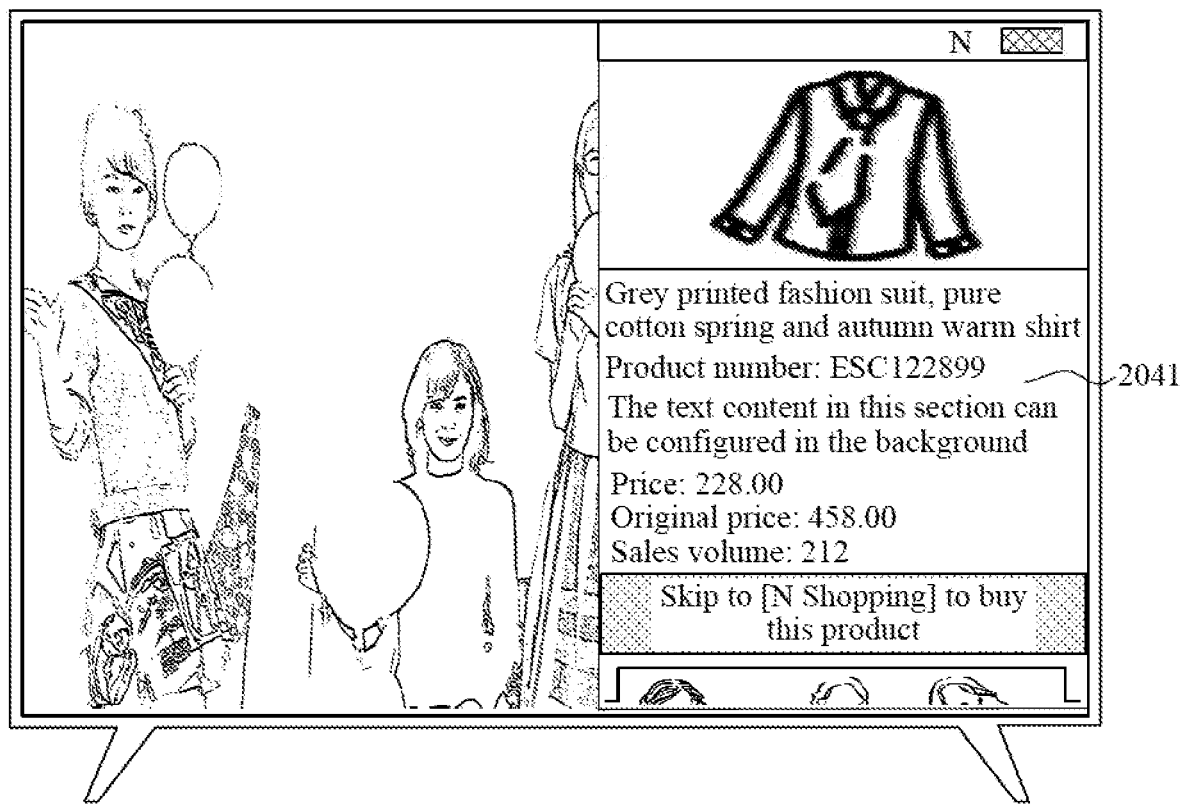

Further, when a user wishes to learn about more details of a certain commodity, the user can move the focus to the commodity introduction sub-option bars, and then presses the confirm button of the remote controller to select to activate and confirm a commodity detail information window 2041 in FIG. 34B. The commodity detail information window 2041 floats above the shopping information window 204, and the interface, displaying the various option bars, of the screen shot content display layer is still hidden. For example, the user moves the focus onto the first commodity introduction sub-option bar in FIG. 33D, and presses the confirm button of the remote controller to display the GUI example as shown in FIG. 34B. The commodity details described in the first commodity introduction sub-option bar are all unfolded, including dimension, size, color, specification and the like. When the user presses the back button of the remote controller on the commodity detail information window, the page goes back to the shopping information window. When the user continues to press the back button of the remote controller on the shopping information window, the page goes back to the interface displaying the various option bars.

Figure 33E:
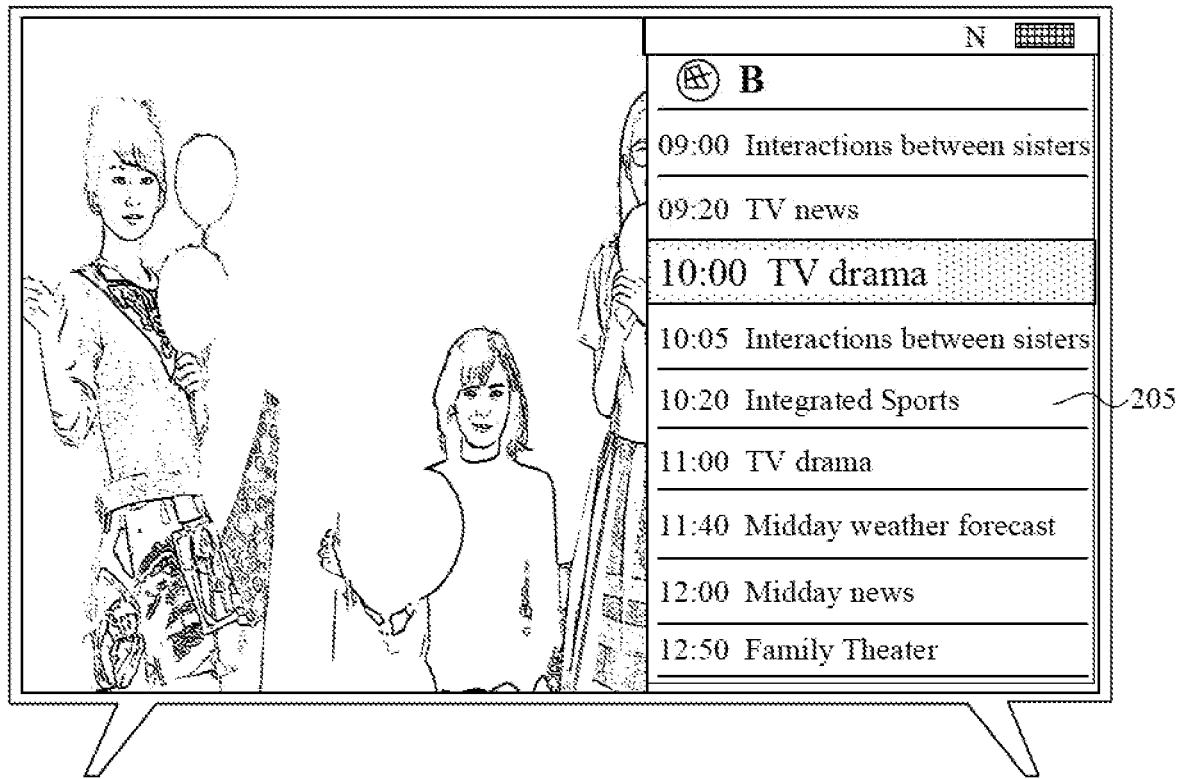

FIG. 33E illustrates a GUI example when a user selects the program guide option bar 1208. In the illustrated embodiment, when the user moves the focus to the news option bar and presses the confirm button of the remote controller, a program guide information window 205 is displayed on the screen shot content display layer. The program guide information window 205 floats above the screen shot content display layer, and an interface, displaying the various option bars, of the screen shot content display layer is hidden. For example, by recognizing the TV station logo in the thumbnail image, it can be seen that the channel of the currently-played content is the B TV station, and a TV program list to be played in the B TV station in the next time period is displayed. The user presses the up and down buttons of the remote controller to browse and select different TV program list content.

Figure 34C:
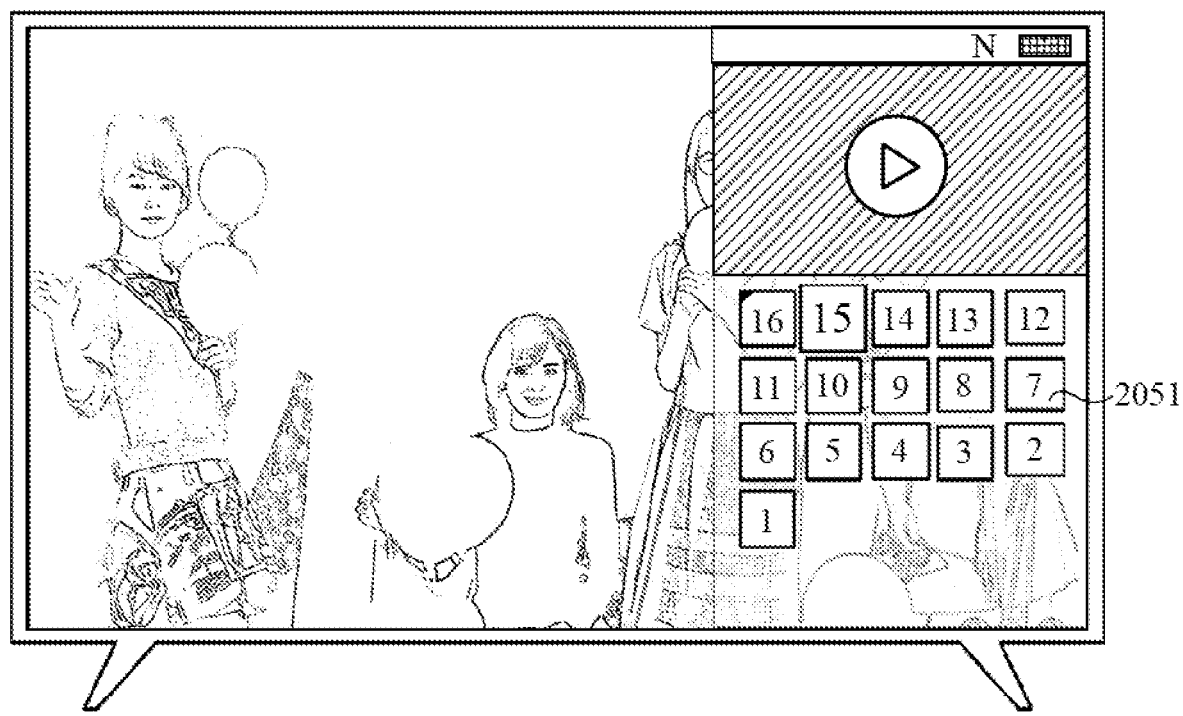

Further, when the user wishes to learn about more details of a specific TV program, the user can move the focus to the TV program name sub-option bar in the TV program list, and then presses the confirm button of the remote controller to activate and confirm a program detail information window 2051 in FIG. 34C. The program detail information window 2051 floats above the program guide information window 205, and the interface, displaying the various option bars, of the screen shot content display layer is still hidden. For example, the user moves the focus onto the TV program name sub-option bar for "TV drama 10" in FIG. 33E, and presses the confirm button of the remote controller to display the GUI example as shown in FIG. 34C. Updated episodes of the TV program are displayed, and the user can select an episode and play it. When the user presses the back button of the remote controller on the program detail information window, the page goes back to the program guide information window. When the user continues to press the back button of the remote controller on the program guide information window, the page goes back to the interface displaying the various option bars.

It should be noted that the above information windows (such as the news information window and the news detail information window) are displayed with a transitional animation, and the transitional animation may include how the information windows come into the display region. For example, the information windows may come into the display region from bottom to top or from right to left. Further, when the information windows come into as a transitional animation, it may also include, for example, a speed of the information windows coming into display region from bottom to top.

It should be noted that the above series of object selecting operations performed by a remote controller may be performed by touch operations on the screen, gestures or voice input and the like, which is not limited in the embodiments of the present disclosure.

Figure 35:
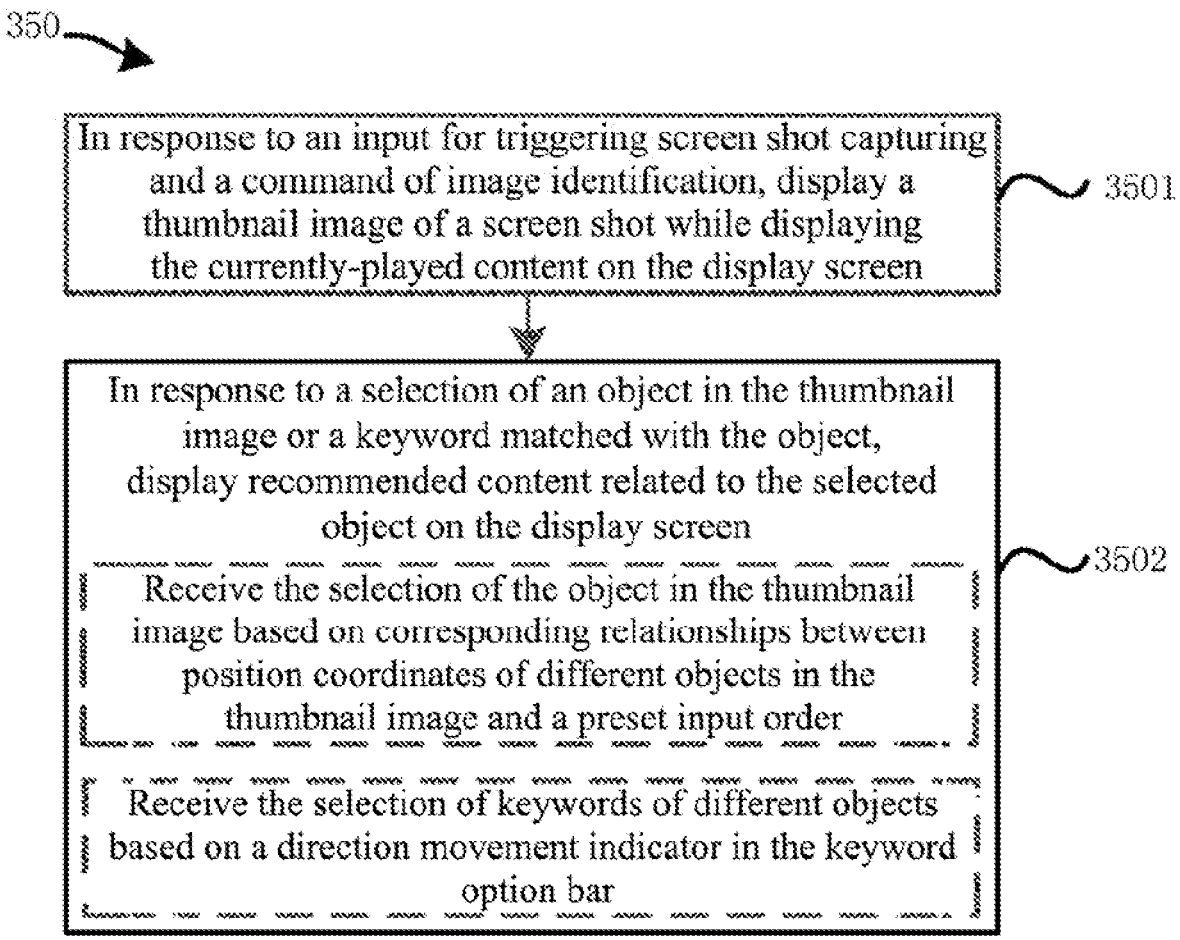
FIG. 35 is a flow diagram illustrating a method for displaying a GUI of a screen shot of a currently-played content on a display according to some embodiments.

FIG. 35 is a flow diagram illustrating a method 350 for displaying a GUI of a screen shot of a currently-played content on a TV display according to some embodiments. The method 350 is performed by the smart TV, and some operations in the method 350 may be combined and/or the orders of some operations may be changed.

In Step 3501, when a TV screen is currently playing a content, upon receiving an instruction for capturing a screen shot of the TV, a thumbnail image of a screen shot of the TV display is displayed as a response.

In Step 3502, in response to a selection of an object in the thumbnail image or a keyword matched with the object, recommended content related to the selected object is displayed on the TV screen.

Specifically, after a server recognizes the image of the screen shot, the thumbnail image contains at least one object, and the keyword of the object may be determined. Referring to FIG. 31A, the image is recognized as containing five objects, and the positions of the five person objects in this image are sorted from left to right, and the keywords of these objects, from left to right, are Actress b, Actress c, Actress a, Actress d and Actress e, respectively.

It should be noted that the smart TV responds a user input for selecting different objects based on positions of different objects in the thumbnail image and a preset input order. For example, the coordinates of different objects in the thumbnail image may be regarded as being sorted from left to right or from right to left, as shown in FIG. 31A, so a user controls the focus to move among different objects by pressing the left or right button on the remote controller to select different objects. For another example, the coordinates of different objects in the thumbnail image may be also regarded as being sorted from top to bottom or from bottom to top, so a user could controls a focus to move among different objects by pressing the up or down button on the remote control to select different objects.

It should be further noted that the coordinates of different objects in the thumbnail image are obtained according to the position coordinates of the different objects in an image displayed in the currently-played content display layer and a ratio of the image displayed in the currently-played current display layer to the thumbnail image.

For example, in FIG. 31A, the ratio of the image displayed in the currently-played content display layer to the thumbnail image is 8:1, and both of them take the lower left corners as an origin of coordinates (0, 0). If the position coordinate of the nose tip of the object actress b on the leftmost side of the image displayed in the currently-played content display layer is (20, 80), the position coordinate of the nose tip of the person object actress b in the thumbnail image is (20/8, 80/8), i.e. (2.5, 10). Similarly, the position coordinates of the nose tip of the object actress c, the nose tip of the actress a, the nose tip of the actress d, and the nose tip of the actress e are respectively obtained by the above method. Then, a user input for selecting different person objects is received on basis of the position coordinates of the nose tips of different person objects and the preset left-to-right or up-to-down order. Of course, the position coordinate of the object may also use the position coordinate of the eyebrow, the eye, the mouth and the like of the object, and is not limited to the position coordinate of the nose tip of the person object.

It should be further noted that a user can select the keywords of different objects based on the direction move indicator in the keyword option bar shown in FIGS. 31A to 31D, and recommended content related to the object matched with the keyword is displayed on the screen as a response.

In some embodiments, the above recommended content related to the selected object may be different kinds of content recommendations, such as Baike, news, and films and televisions, referring to FIGS. 32A to 32G for details.

Figure 36:
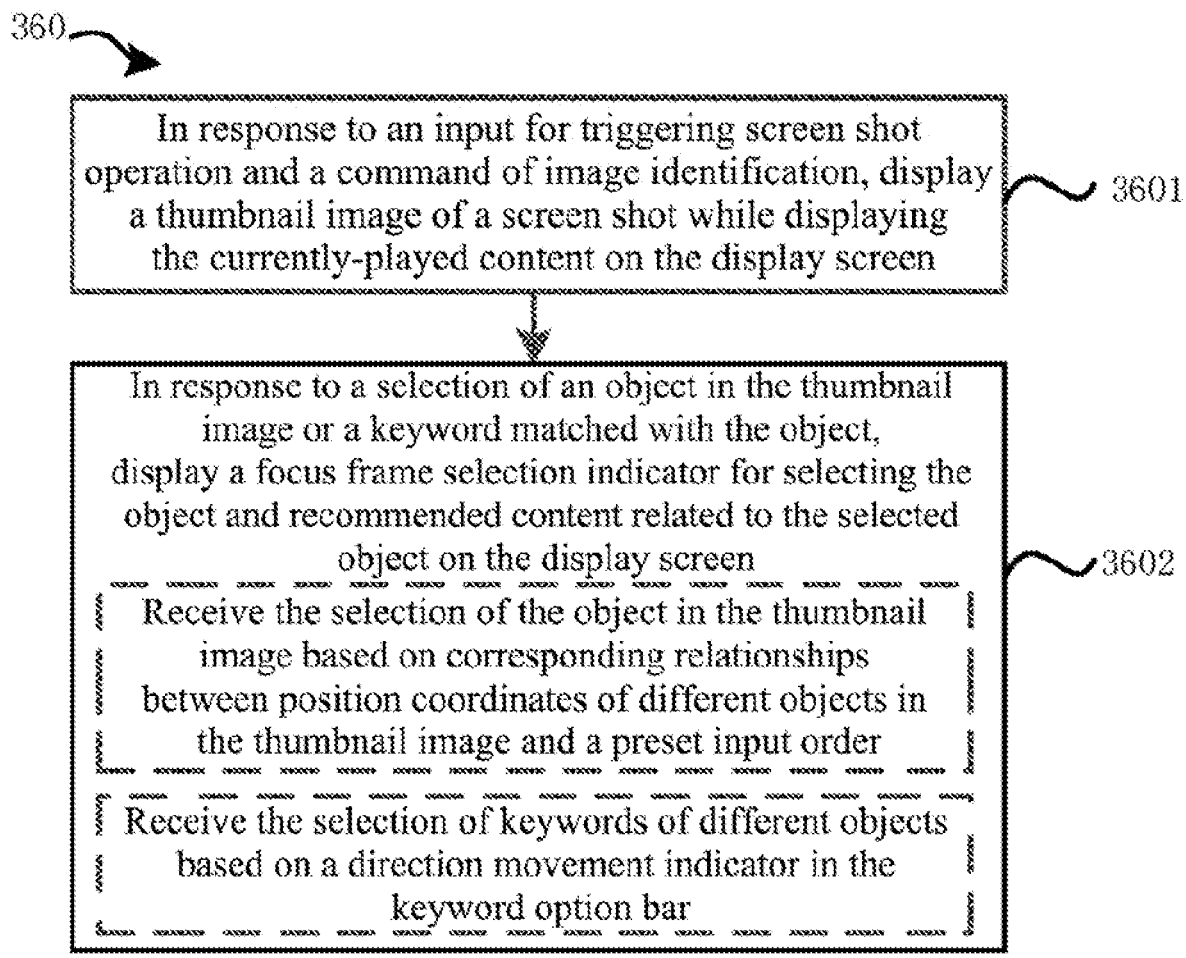
FIG. 36 is another flow diagram illustrating a method for displaying a GUI of a screen shot of a currently-played content on a display according to some embodiments.

FIG. 36 is a flow diagram illustrating a method 360 for displaying a GUI of a screen shot of a currently-played content on a TV display according to some embodiments.

In Step 3601, when a TV screen is currently displaying a content, upon receiving in instruction for capturing a screen shot of the TV screen, a thumbnail image of a screen shot of a currently-played content is displayed on the screen as a response.

In Step 3602, in response to a selection of an object in the thumbnail image or a keyword matched with the object, a focus frame selection indicator and recommended content related to the selected object are displayed on the screen.

In a case where at least one object has been recognized in the thumbnail image, when a user selects a specific object or a keyword matched with a specific object, a focus frame selection indicator for indicating that the object has been selected is displayed in the thumbnail image while different kinds of recommended content related to the object are presented on the screen, so as to prompt a user that the currently view content is the recommended content related to the object selected by the focus frame selection indicator, and the user experience is enhanced.

Here, an exemplary method for selecting different kinds of option bars (such as the Baike option bar, the news option bar and the films and televisions option bar) by a user to browse and select the recommended content refers to the method as shown in FIGS. 24 to 28 in Embodiment I, and descriptions thereof are omitted here.

As described above, in the present embodiments, in order to meet the requirements for a more visual user interface and a seamless user interaction, when a smart TV is current playing a content, in response to an instruction for capturing a screen shot, a plurality of option bar sets are displayed. The plurality of option bars include option bars for displaying a thumbnail image of the screen shot and recommended content related to the content identified on the basis of the image of the screen shot, and/or a user interface for inputting control instructions in association with the screen shot. In response to a selection of an object in the thumbnail image or a selection of a keyword matched with an object, at least one of the plurality of option bars displays the recommended content related to the object.

In this way, when the user is watching the video content currently playing on TV, current video images are captured in real time and recognized, so as to recognize the content presented in the video images (such as commodities, movie stars, TV station logos and QR codes), and immediately recommend information related to the content of the video images. For example, when a user is watching the World Cup, current video images may be captured, and information of each player is recognized, so that when a specific player is selected, content such as information of the player and shopping of articles of star style are popped.

Embodiment III

Figure 37:
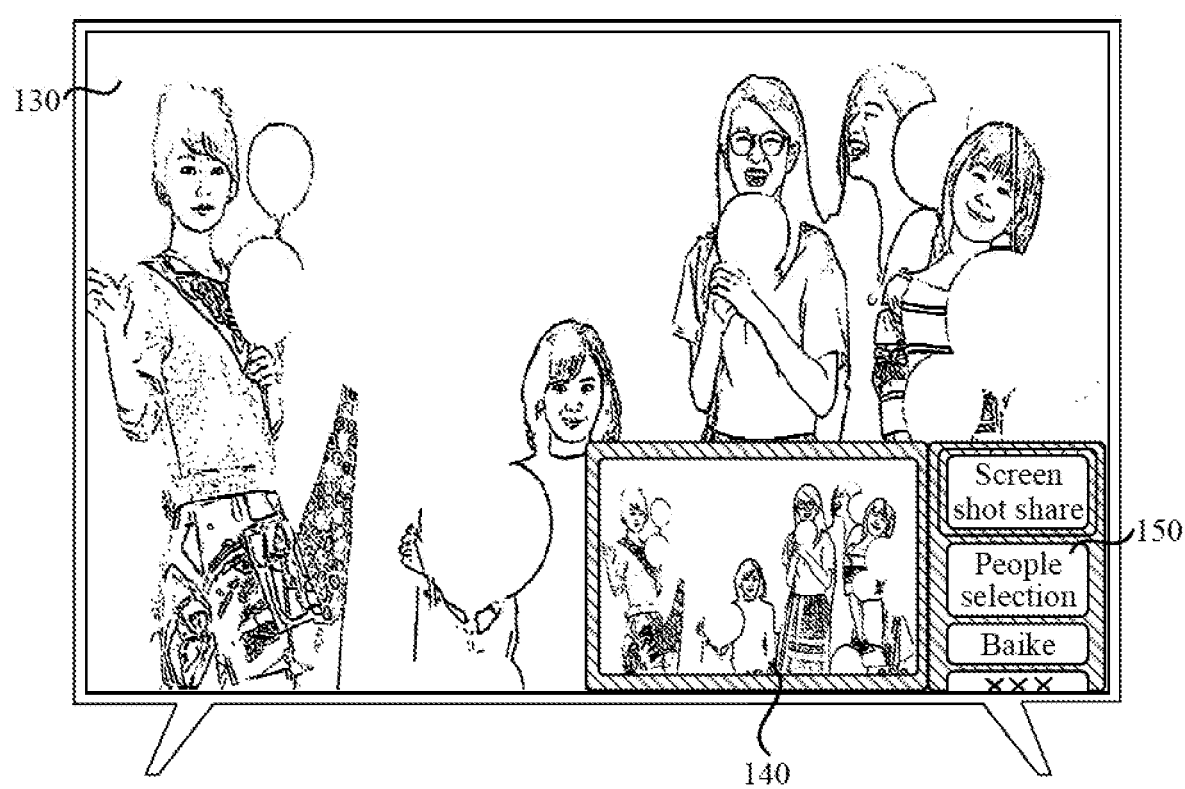
FIG. 37 illustrates a GUI of an example III for selecting and triggering a screen shot.
Figure 38:
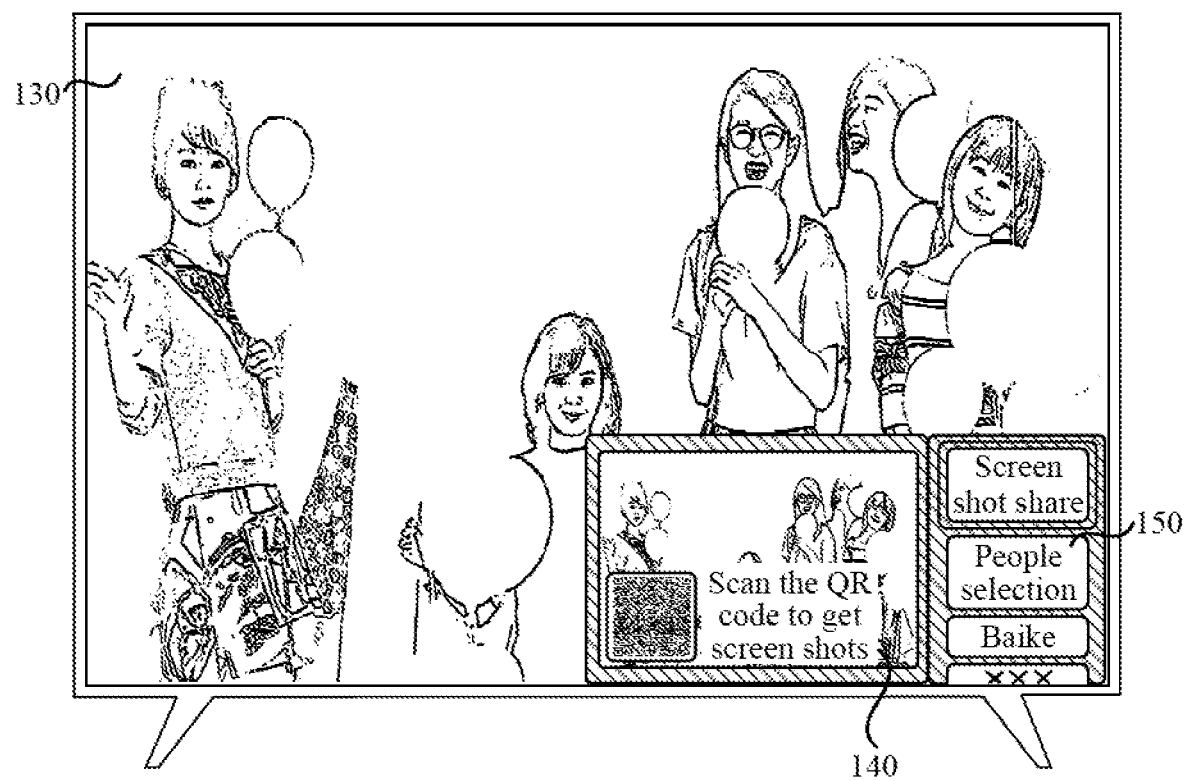
FIG. 38 illustrates an example GUI for displaying a QR code image and user prompt information.

FIGS. 37 to 39 illustrate an exemplary graphical user interfaces (GUI) III when a user triggers screen shot capturing. When a video is being played on the display, after an instruction for capturing a screen shot is triggered by pressing a remote controller, touching on the screen, making a gesture or inputting a voice and the like, the GUI is displayed on the screen, and includes a currently-played content display layer 130, a screen shot content display layer 140 and a function selection region 150. The screen shot content display layer and the function selection region are arranged from left to right. The screen shot content display layer is configured to display thumbnail images of screen shots and recommended content related to content identified from the thumbnail images. The function selection region includes a plurality of function tabs that at least include an object selection tab for providing an access to objects in the thumbnail images, at least one content recommendation tab for accessing the above recommended content, and/or a user input tab for control instructions in association with the screen shot capturing function.

It should be noted that a remote control is used as an exemplary device to control operations of the smart TV below.

Specifically, when the user presses a preset button (such as "Jubao button" or a certain multi-function button) on the remote controller corresponding to the screen shot capturing instruction, the GUI as shown in FIG. 37 is displayed on the screen. The screen shot content display layer 130 displays the thumbnail images of the screen shots. The function selection region 150 includes a plurality of function tabs, such as a screen shot share tab 1501, a figure selection tab 1502, a Baike tab 1503, a news tab 1504, a related video tab 1505 and a Taobao tab 1506 in FIGS. 39A-39E.

It should be further noted that before the thumbnail image of the screen shot is recognized, that is, when the GUI as shown in FIG. 37 is displayed, a current focus is displayed on the screen shot share tab of the function selection region by default, and the other tabs, such as the figure selection tab and the Baike tab, in the function selection region are in a gray state (means inactivated). At this time, a user is unable to move the focus up and down in the function selection region through the remote controller.

As shown in FIG. 38, in some embodiments, after the thumbnail image is recognized, a QR code image containing information of the thumbnail image and user prompt information (words such as: scan to obtain the screen shot, zoom in by pressing a confirm button and see more by pressing a down button) are displayed on the thumbnail image. The thumbnail image and the QR code image are simultaneously uploaded to a third-party server, so that a user can scan the QR code image to download the thumbnail image from the third-party server by using a mobile terminal (such as a mobile phone and a tablet computer) according to the user prompt information.

Optionally, after the thumbnail image is going through image recognition to determine the content in the image, the recommended content related to the content identified from the thumbnail image are being popped up. At this time, presentations on the function selection region is updated. The plurality of function tabs are all in active state, and a user can move the focus up and down in the function selection region through the remote controller to browse and select different function tabs.

Figure 39A:
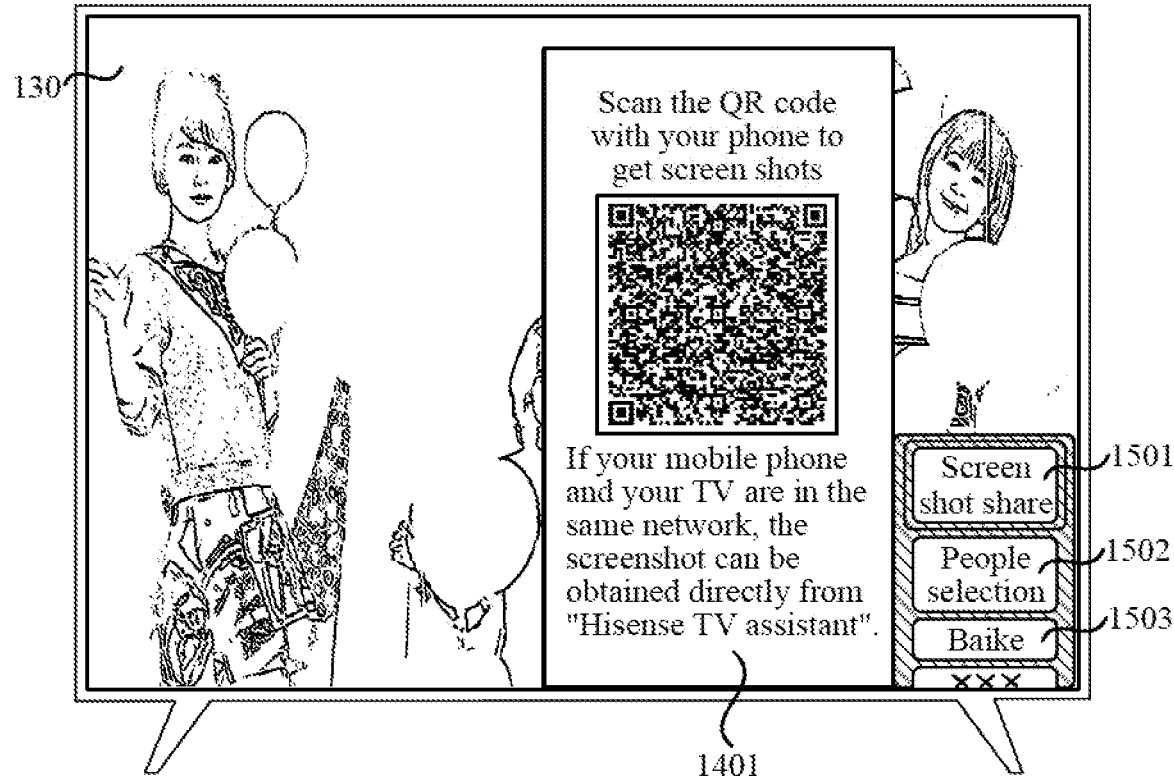
FIGS. 39A to 39D illustrate an example GUI of recommended content information windows displayed by selecting different function tabs in a function selection region.

In the illustrated embodiment, as shown in FIG. 39A, when the user moves a focus to the screen shot share tab 1501 and presses the confirm button of the remote controller, a QR code image information window 1401 is displayed on the screen shot content display layer. A QR code image displayed in the QR code image information window 1401 contains the information of the thumbnail image of the screen shot. The user scans the QR code image through a device having a scanning function, such as a mobile phone, and the image of a screen shot may be locally stored in the device or shared with others.

Figure 39B:
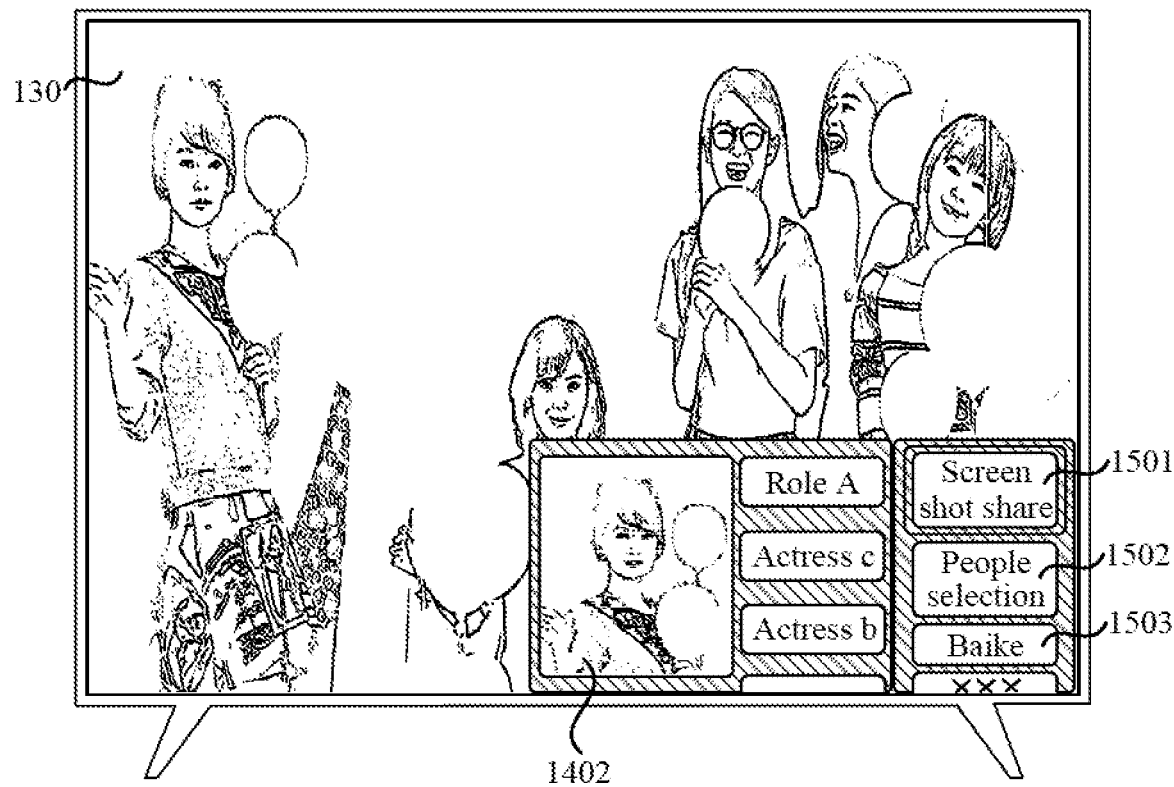
Figure 39C:
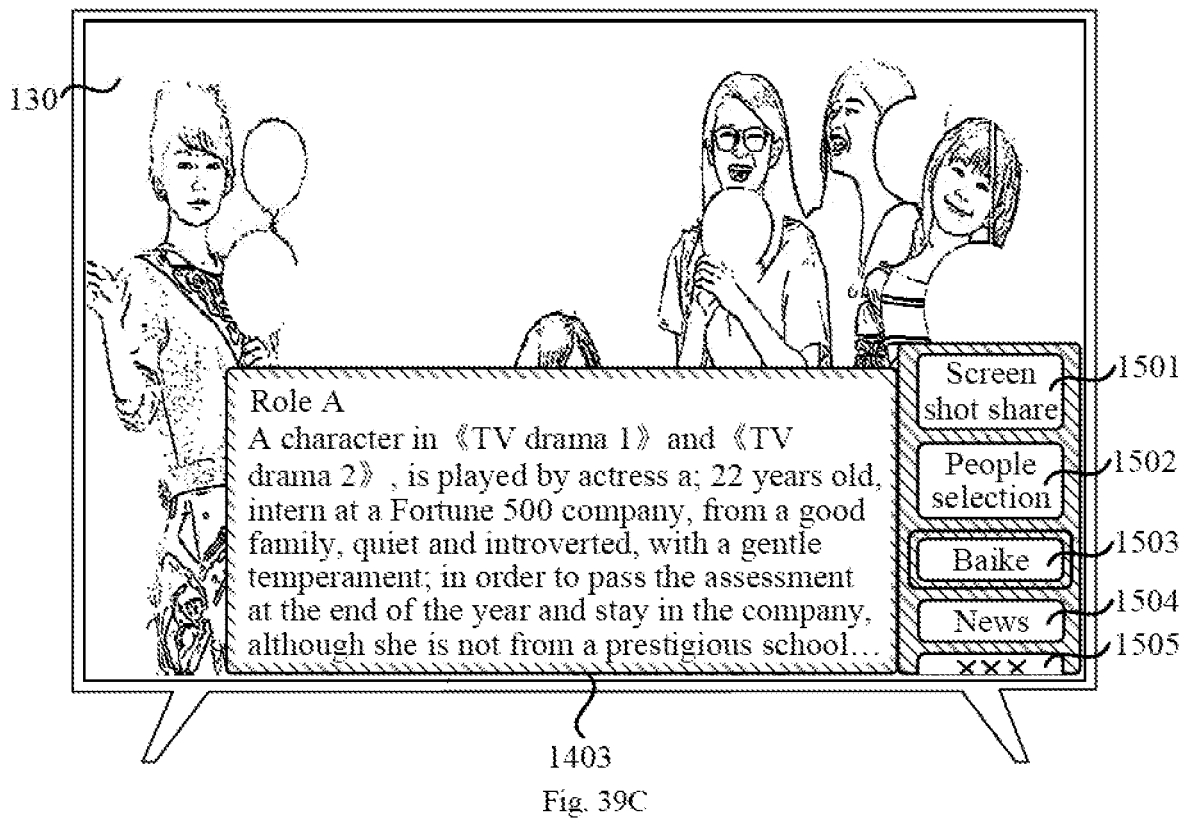

As shown in FIG. 39B, when a user moves a focus to the figure selection tab 1502 and presses the confirm button of the remote controller, an object information window 1402 is displayed on the screen shot content display layer. Here, in the GUI shown in FIG. 37, after image recognition is performed, the thumbnail image of the screen shot is recognized as containing five objects. The object information window may display the objects in the thumbnail image and keywords of the objects. When a user selects a keyword, the object information window displays an object matched with the keyword. For example, the keywords of the five person objects are Role A, Actress c, Actress b, Actress d, and Actress e. When a user moves a focus left to the keywords and selects the keyword Role A, only an image of the object corresponding to the keyword Role A is displayed in the object information window. When the user continues to move the focus downward and selects the keyword Actress c, only an image of the object corresponding to the keyword Actress c is displayed in the object information window.

Further, under a circumstance that a user selects a keyword and the object matched with the keyword is displayed in the object information window, at least one content recommendation tab for accessing recommended content related to content identified from the thumbnail image is provided in the function selection region 150. The recommended content related to the object currently displayed in the object information window are synchronously updated. For example, in FIG. 39B, when the screen shot content display layer displays the keyword Role A and the image of the object corresponding to the Role A, the function tabs such as the Baike tab, the news tab and the related video tab in the function selection region are synchronously updated with information related to the Role A. When the screen shot content display layer displays the keyword Actress c and the image of the object corresponding to the Actress c, the function tabs such as the Baike tab, the news tab and the related video tab in the function selection region are synchronously updated with information related to the Actress c.

Next, under a circumstance that the screen shot content display layer displays the keyword Role A and the image of the object corresponding to the Role A in FIG. 39B, when a user moves a focus right from the object information window 1402 to the figure selection tab 1502, and continues to move the focus downward to the Baike tab 1503, the screen shot content display layer displays a Baike information window 1403 which displays general Baike information of the object Role A, as shown in FIG. 39. The user moves the focus to the Baike information window by pressing the left button on the remote control, and the Baike information window may be pulled up to present more detailed content.

Figure 39D:
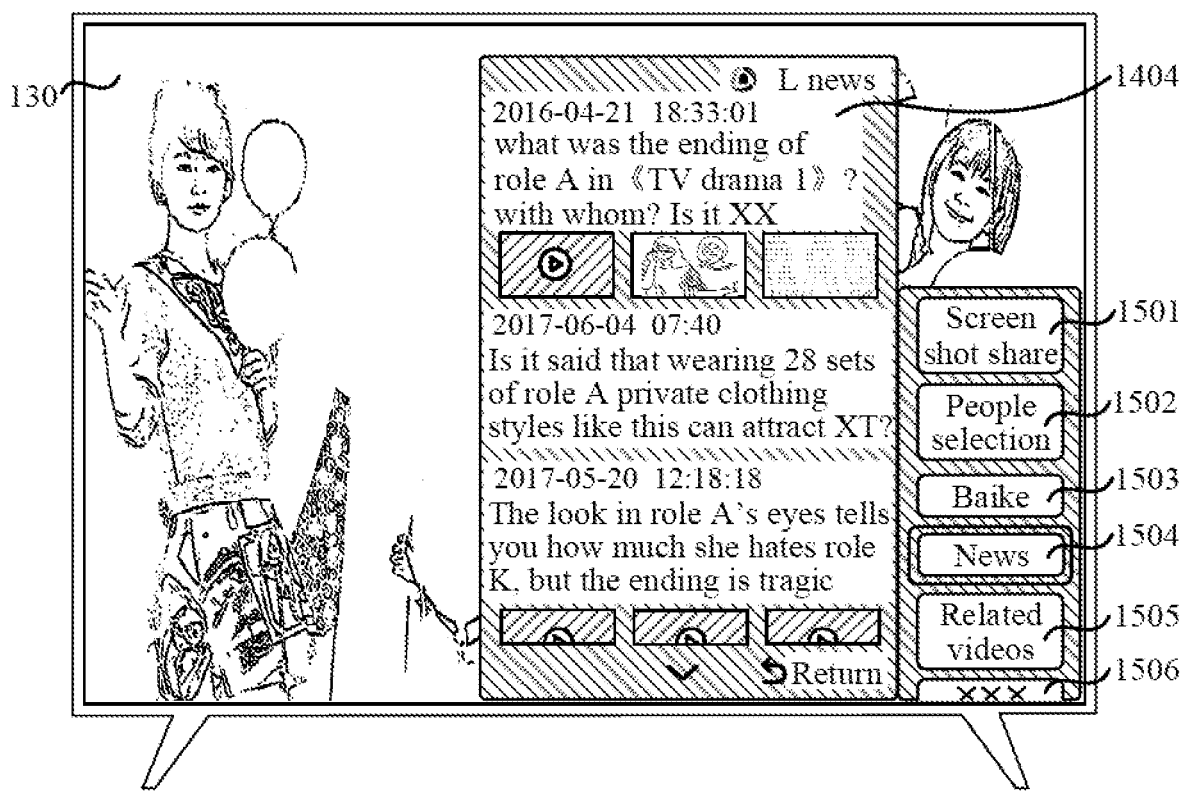

Next, when a user moves a focus to the news tab 1504, the screen shot content display layer displays a news information window 1404 which displays news & gossip information of the object Role A, as shown in FIG. 39D. The user moves the focus to the news information window by pressing the left button to browse and select different news events.

Further, when a user wishes to learn about more details about some specific news, the user can move the focus to the specific news event, and then presses the confirm button of the remote controller to activate and confirm a news detail information window 1404a that floats above the news information window. For example, the user moves the focus onto the first news event in FIG. 39D, and presses the confirm button of the remote controller to cause the TV to display the GUI example as shown in FIG. 39B. News details described about the selected first news event are all unfolded.

The user can continue to operate the remote controller to select different function tabs in the function selection region to access different kinds of recommended content related to the object Role A.

Figure 39E:
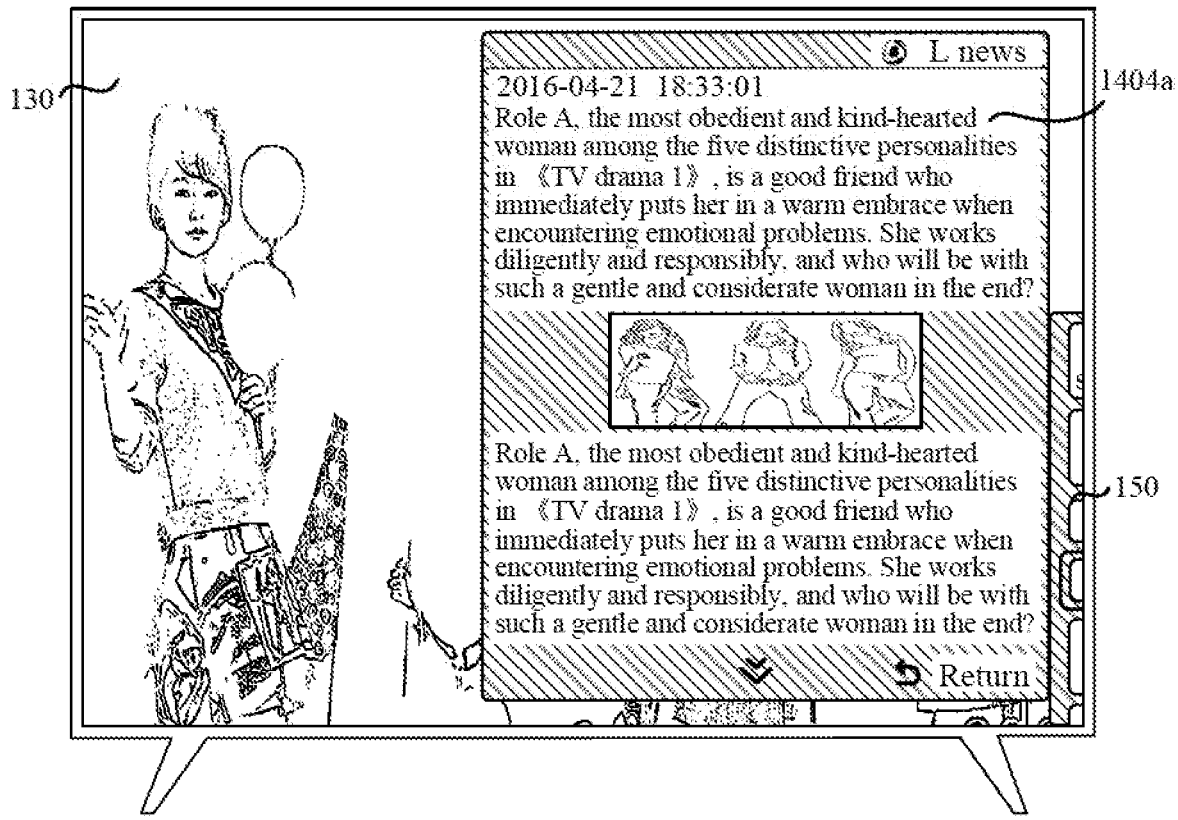
FIG. 39E illustrates an example GUI of a news detail information window displayed by selecting a news information window.

It should be noted that, as shown in FIG. 39E, when the screen shot content display layer displays detailed content of different function tabs, the function selection region may be in a partially hidden and partially displayed state to avoid influencing user's watching of the currently-played content due to occupying a part of the display area. Of course, the function selection region may also be in a completely hidden or completely displayed state, which is not specifically limited in the present disclosure.

It should be noted that when the thumbnail image of the screen shot contains a plurality of objects, the object selection tab of the function selection region may include multiple sub-menu tabs for displaying keywords matched with the plurality of objects, so that when a specific keyword in the sub-menu tab is selected, the screen shot content display layer displays the object matched with the keyword, and the at least one content recommendation tab of the function selection region provides different kinds of recommended content related to the object.

Figure 40:
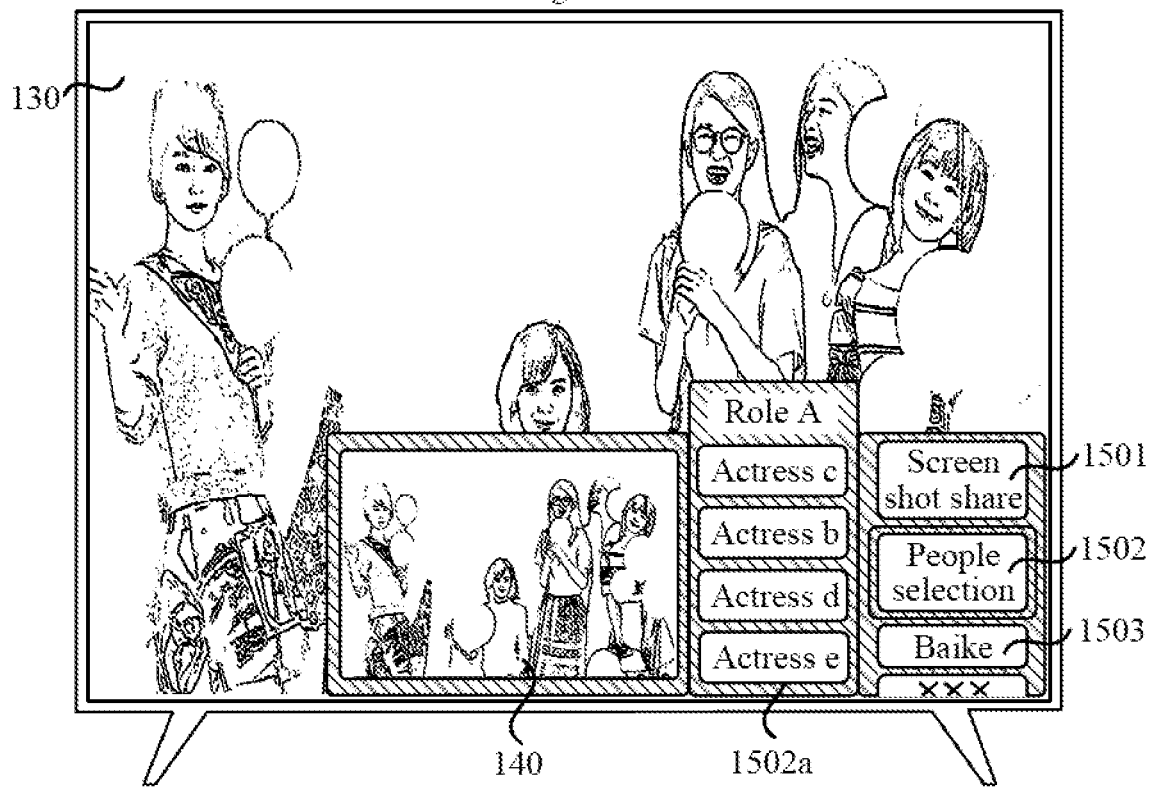
FIG. 40 illustrates an example GUI of a submenu tab displayed by selecting a person selection tab in a function selection region.

For example, in the GUI shown in FIG. 40, when the thumbnail image of the screen shot contains five objects, the figure selection tab 1502 is provided with a sub-menu tab 1502a in which keywords of the five person objects are displayed. When the user selects the keyword Role A, the screen shot content display layer only displays the image of the Role A, and at this time, the Baike tab, the news tab and the related video tab in the function selection region are synchronously updated to display information corresponding to the object Role A. When the user selects the keyword Actress c, the screen shot content display layer only displays the image of Actress c, and at this time, the Baike tab, the news tab and the related video tab in the function selection region are synchronously updated to display information corresponding to the person object Actress c.

Figure 41:
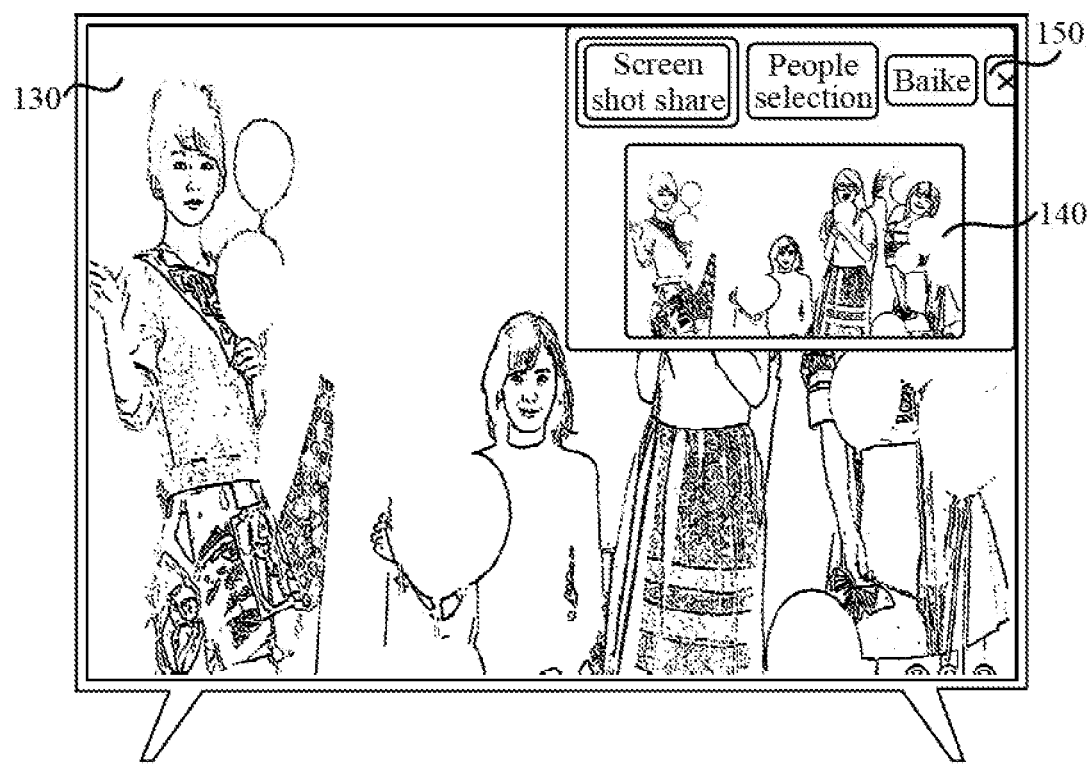
FIG. 41 illustrates another example GUI for selecting and triggering a screen shot.
Figure 42:
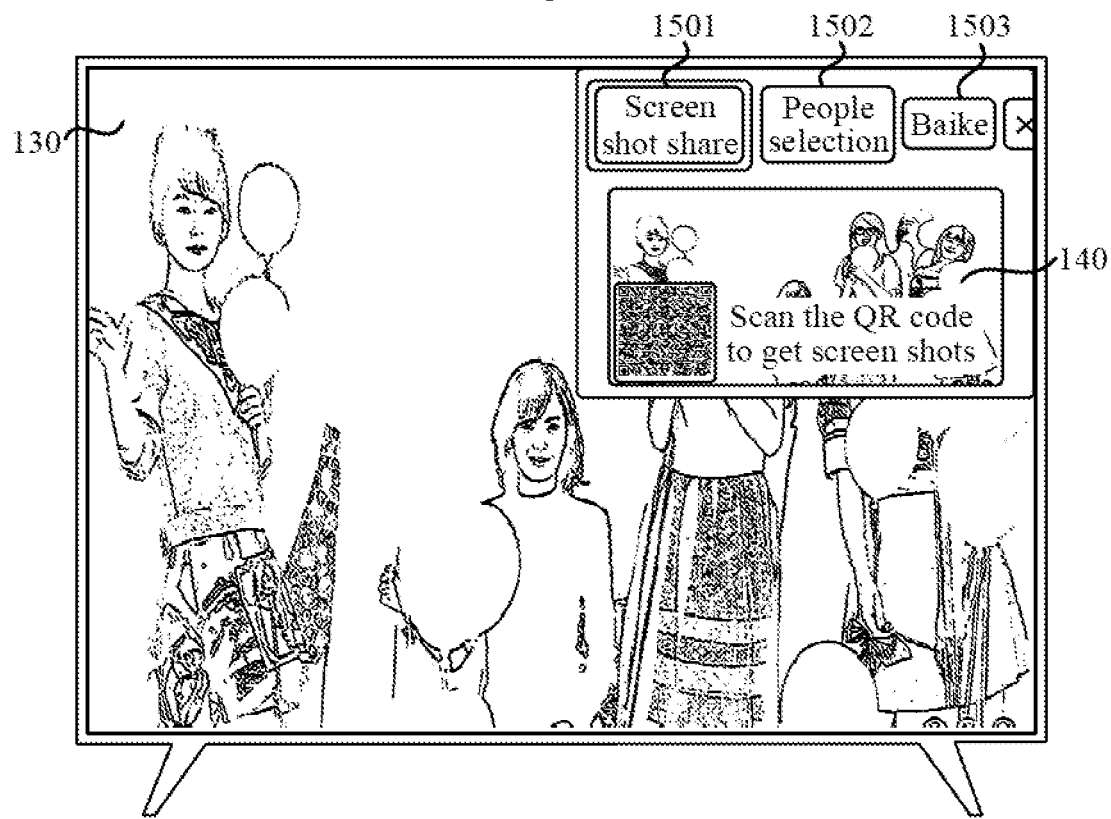
FIG. 42 illustrates an example GUI for displaying a QR code image and user prompt information.
Figure 43A:
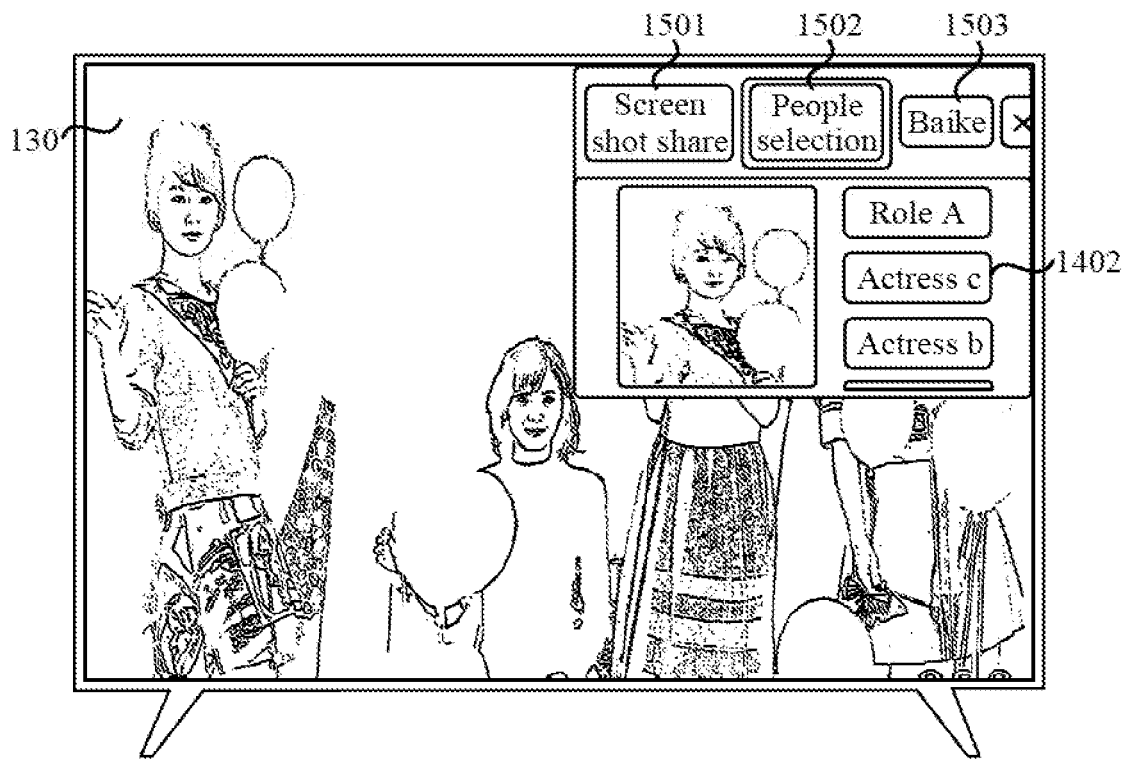
FIGS. 43A to 43C illustrate an example GUI of recommended content information windows displayed by selecting different function tabs in a function selection region.
Figure 43B:
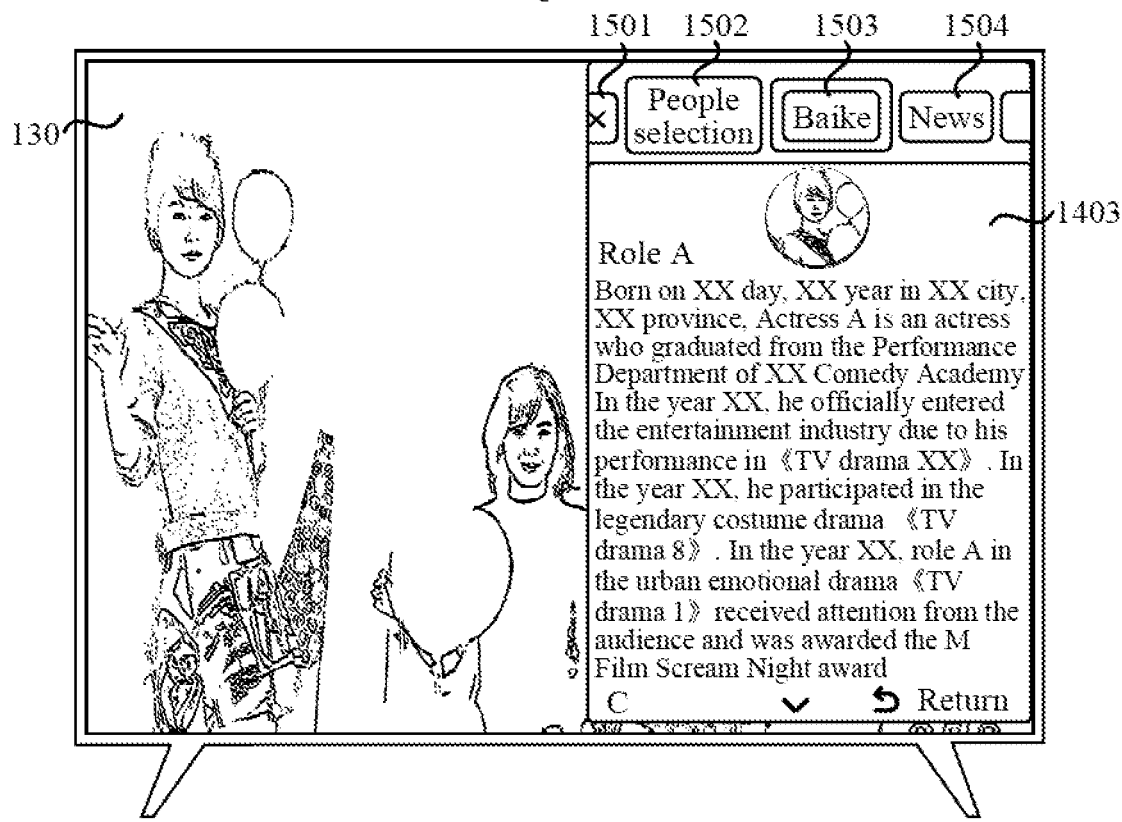
Figure 43C:
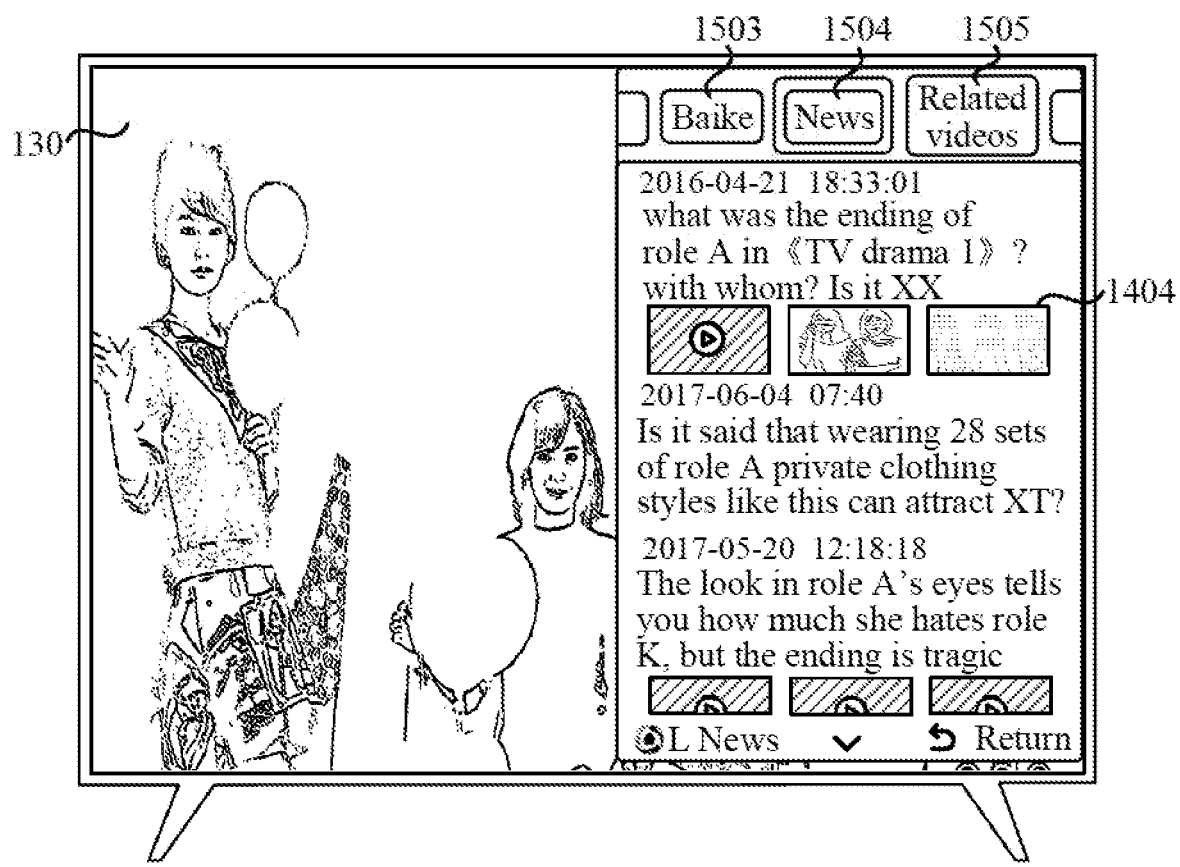

It should be further noted that FIGS. 41 to 43 illustrate an exemplary graphical user interface (GUI) I when a user triggers screen shot capturing. A difference from the GUI shown in FIGS. 37 to 40 is that in this example, the function selection region 150 and the screen shot content display layer 140 are arranged from top to bottom. Other content of this example are similar to those of the example shown in FIGS. 37 to 40, and relevant descriptions thereof are omitted herein.

FIG. 44 is a flow diagram illustrating a method 440 for displaying a GUI of a screen shot of a currently-played content on a TV screen according to some embodiments. The method 440 is performed by the smart TV, and some operations in the method 440 may be combined and/or the orders of some operations may be changed as needs.

In Step 4401, when a TV display is currently playing a content, upon receiving an instruction for capturing a screen shot input from a user, the display displays a GUI including a currently-played content display layer, a screen shot content display layer and a function selection region as a response.

The screen shot content display layer is to display a thumbnail image of a screen shot and recommended content related to content identified from the thumbnail image. The function selection region includes an object selection tab for providing an access to an object in the thumbnail image, at least one content recommendation tab for accessing the above recommended content, and/or a user input tab for control instructions in association with the screen shot capturing function.

Further, Step 4402 may be included, in which in response to a selection of the object selection tab in the function selection region, the screen shot content display layer displays the object in the thumbnail image and a keyword matched with the object.

In a case where at least one object has been recognized in the thumbnail image, when a user selects a specific keyword, in response to a selection of the specific keyword, an object matched with the keyword is displayed in the screen shot content display layer, and the at least one content recommendation tab in the function selection region provides an access to the recommended content related to the object. When a user selects a specific content recommendation tab, in response to a selection of the specific content recommendation tab, detailed content related to the content recommendation tab are displayed in the screen shot content display layer.

Here, an exemplary method for selecting a user input tab (such as the screen shot share tab) for control instructions in association with the screen shot capturing function refers to the method as shown in FIG. 23 in Embodiment I, and descriptions thereof are omitted here. Here, an exemplary method for selecting different kinds of option bars (such as the Baike option bar, the news option bar and the related video option bar) by a user to browse and select different kinds of recommended content refers to the method as shown in FIGS. 24 to 28 in Embodiment I, and descriptions thereof are omitted here.

FIG. 45 is a flow diagram illustrating a method 450 for displaying a GUI of a screen shot of a currently-played content on a TV display according to some embodiments.

In Step 4501, when a TV display is currently playing a content, upon receiving an instruction for capturing a screen shot input from a user, the display displays a GUI including a currently-played content display layer, a screen shot content display layer and a function selection region as a response.

The screen shot content display layer is to display a thumbnail image of a screen shot and recommended content related to the content identified from the thumbnail image. The function selection region includes an object selection tab for providing an access to an object in the thumbnail image, at least one content recommendation tab for accessing the above recommended content, and/or a screen shot share tab for sharing the thumbnail image.

In Step 4502, in response to a selection of an object selection tab in the function selection region, a sub-menu tab of the object selection tab is displayed in the function selection region, and shows a keyword of at least one object in the thumbnail image.

In a case where at least one object has been recognized in the thumbnail image, when the user selects an object selection tab, in response to a selection of the object selection tab, a sub-menu tab of the object selection tab is displayed in the function selection region, and shows keywords of different objects in the thumbnail image. When the user selects a certain keyword, in response to a selection of the keyword, a matched object with the keyword is displayed in the screen shot content display layer, and at this time, the at least one content recommendation tab in the function selection region provides an access to the recommended content related to the object. When a user selects a certain content recommendation tab, in response to a selection of the content recommendation tab, detailed content related to the content recommendation tab are displayed in the screen shot content display layer.

Here, an exemplary method for selecting the screen shot share tab by a user may refer to the method as shown in FIG. 23 in Embodiment I, and descriptions thereof are omitted here. Here, an exemplary method for selecting different kinds of option bars (such as the Baike option bar, the news option bar and the related video option bar) by a user to browse and select different kinds of recommended content may refer to the method as shown in FIGS. 24 to 28 in Embodiment I, and descriptions thereof are omitted here.

As described above, in the present embodiments, in order to meet the requirements for a more visual user interface and a seamless user interaction, when a display of smart TV is currently playing a content, in response to an input instruction for capturing a screen shot, a GUI including a currently-played content display layer, a screen shot content display layer and a function selection region is displayed. The screen shot content display layer is to display a thumbnail image of a screen shot and recommended content related to the content identified from the thumbnail image. The function selection region includes an object selection tab for providing an access to an object in the thumbnail image, at least one content recommendation tab for accessing the above recommended content, and/or a screen shot share tab for sharing the thumbnail image. In this way, when a user is watching video content, current video images are captured in real time and being recognized, so as to identify the content presented in the video images (such as commodities, movie stars, TV station logos and QR codes), and immediately recommend information related to the content of the video images.

The exemplary systems and methods of the present disclosure have been described with reference to an entertainment system. However, in order to avoid any unnecessary ambiguity with respect to the present disclosure, the foregoing description omits some known structures and devices. Such omissions shall not to be construed as limiting the scope of the claims. Specific details are particularly provided to facilitate understanding of the present disclosure. However, it should be understood that the present disclosure may be implemented in a variety of ways beyond the specific details described in the present disclosure.

Moreover, the exemplary aspects, examples, and/or configurations illustrated in the present disclosure show that various components of the system are arranged together, but some system components can be located at a remote end of a distributed network (such as an LAN and/or the Internet), or located in a dedicated system. Therefore, it should be understood that the components of the system may be combined into one or more devices, such as a set top box or a television, or other devices arranged on a particular node side by side of a distributed network (such as an analog and/or digital telecommunications network, a packet switched network, or a circuit switched network). In accordance with the above description and for the reason of computational efficiency, the components of the system may be located anywhere within the distributed component network without affecting the operation of the system. For example, different components may be located in switchboards (such as a PBX, a media server and a gateway), one or more communication devices, one or more user sites, or some combinations of the above. Similarly, one or more functional portions of the system may be distributed between a telecommunication device and an associated computing device.

Moreover, it should be understood that the various connections between these elements may be wired or wireless, or any combinations thereof, or any other known or later developed elements that are capable of providing data and/or communicating data with the connected elements. These wired or wireless connections may also be secure connections that may transmit encrypted information. A transmission medium for connection may be, for example, any suitable electronic signal carrier, including a coaxial cable, a copper wire and an optical fiber, and may be an acoustic wave or a light wave such as an acoustic wave or a light wave generated during radio wave and infrared data transmission.

In addition, although some flow diagrams have been discussed and illustrated in a particular order, it should be understood that such order may be changed, adding some steps and omitting some steps without substantially affecting the disclosed examples, configurations and aspects of operations.

A series of changes and modifications to the present disclosure may be obtained. It is possible to provide only certain features of the present disclosure without providing other features.

Furthermore, although the description above includes one or more aspects, examples and/or configurations, as well as certain variations and modifications, other variations, combinations and modifications are still within the scope of the present disclosure as if they are within the skill and knowledge scope of persons skilled in the art after the skilled understand the present disclosure. Applicants intend to cover an allowable scope including substitutive aspects, examples and/or configurations. Those aspects, examples and/or configurations in the claims include substitutive, interchangeable and/or equivalent structures, functions, scopes or steps, whether or not these substitutive, interchangeable and/or equivalent structures, functions, scopes or steps have been disclosed in the present disclosure and applicant has no intention to dedicate any patentable subject matter.

What is claimed is:

1. A method for a display apparatus, comprising:
    displaying an instructive icon over a playing-video on the display apparatus, the instructive icon being used for instructing a user to acquire information corresponding to a video content currently displayed;
    in response to an input instruction from the user, displaying a first user interface that includes:
        while a first display layer displays the video content, a second display layer for displaying a thumbnail image containing at least one target object in the video content and one or more keywords associated with the at least one target object, and
        a function selection region containing one or more items that are available for selection and associated with the at least one target object in the thumbnail image; and
    in response to a selection of an item in the function selection region, while the video content remains displaying on the first display layer, updating the first user interface to a second user interface which comprises information related to the at least one target object.

2. The method according to claim 1, wherein:
    the input instruction from the user includes an input instruction via a remote controller; and
    the at least one target object in the video content and the one or more keywords associated with the at least one target object are displayed to the user, after receiving the input instruction via the remote controller from the user.

3. The method according to claim 1, further comprising:
    in response to a keyword selected from the one or more keywords, displaying one or more content recommendations corresponding to the selected keyword associated with the at least one target object.

4. The method according to claim 1, wherein:
    the second display layer does not interfere with the first display layer.

5. The method according to claim 1, wherein:
    the second display layer comprises one or more access interfaces for the user to access information about the at least one target object, the one or more access interfaces comprising one or more interfaces for accessing one or more of a webpage application, video application or shopping application.

6. The method according to claim 5, further comprising:
    in response to displaying of recommended content from the shopping application, indicating an action triggered by information based on the displayed recommended content related to the at least one target object.

7. The method according to claim 6, wherein:
    the information includes shopping information from a third-party site; and
    the action indicated includes a purchase action.

8. The method according to claim 1, wherein:
    the second display layer comprises a set of option items about the at least one target objects which allows the user to browse forward or backward.

9. The method according to claim 1, further comprising:
    displaying a share tab for sharing an image captured from the playing-video.

10. The method according to claim 1, further comprising:
    obtaining a plurality of images at different time points; and
    storing the plurality of images in a preset image storage region.

11. A display apparatus, comprising:
    a display configured to display content from a broadcast system or network and/or a user interface;
    a memory storing computer instructions and data associated with the display; and
    one or more processors in communication with the memory and the display, wherein the one or more processors are configured to execute the computer instructions to cause the display apparatus to perform:
        displaying an instructive icon over a playing-video on the display, the instructive icon being used for instructing a user to acquire information corresponding to a video content currently displayed;
        in response to an input instruction from the user, displaying a first user interface that includes:
            while a first display layer displays the video content, a second display layer for displaying a thumbnail image containing at least one target object in the video content and one or more keywords associated with the at least one target object, and
            a function selection region containing one or more items that are available for selection and associated with the at least one target object in the thumbnail image; and
        in response to a selection of an item in the function selection region, while the video content remains displaying on the first display layer, updating the first user interface to a second user interface which comprises information related to the at least one target object.

12. The display apparatus according to claim 11, wherein:
    the input instruction from the user includes an input instruction via a remote controller; and
    the at least one target object in the video content and the one or more keywords associated with the at least one target object are displayed to the user, after receiving the input instruction via the remote controller from the user.

13. The display apparatus according to claim 11, wherein the one or more processors are further configured to execute the computer instructions to cause the display apparatus to perform:
    in response to a keyword selected from the one or more keywords, displaying one or more content recommendations corresponding to the selected keyword associated with the at least one target object.

14. The display apparatus according to claim 11, wherein the second display layer does not interfere with the first display layer.

15. The display apparatus according to claim 11, wherein: the second display layer comprises one or more access interfaces for the user to access information about the at least one target object, the one or more access interfaces comprising one or more interfaces for accessing one or more of a webpage application, video application or shopping application.

16. The display apparatus according to claim 15, wherein the one or more processors are further configured to cause the display apparatus to perform:
in response to displaying of recommended content from the shopping application, indicating an action triggered by information based on the displayed recommended content related to the at least one target object.

17. The display apparatus according to claim 16, wherein:
the information includes shopping information from a third-party site; and
the action indicated includes a purchase action.

18. The display apparatus according to claim 11, wherein:
the second display layer comprises a set of option items about the at least one target objects which allows the user to browse forward or backward.

19. The display apparatus according to claim 11, wherein the one or more processors are further configured to execute the computer instructions to cause the display apparatus to perform:
displaying a share tab for sharing an image captured from the playing-video.

20. The display apparatus according to claim 11, wherein the one or more processors are further configured to cause the display apparatus to perform:
obtaining a plurality of images at different time points; and
storing the plurality of images in a preset image storage region.

* * * * *